United States Patent
Isovitsch Parks et al.

(10) Patent No.: US 9,187,342 B2
(45) Date of Patent: Nov. 17, 2015

(54) METHOD FOR REMOVING DRUGS FROM WASTE WATER USING NEUTRALIZED BAUXITE RESIDUE

(75) Inventors: Shannon L. Isovitsch Parks, Sarver, PA (US); David Iwig, Greensburg, PA (US); John R. Smith, Pittsburgh, PA (US); Jaw K. Fu, Murrysville, PA (US); Rajat Ghosh, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 837 days.

(21) Appl. No.: 13/159,683

(22) Filed: Jun. 14, 2011

(65) Prior Publication Data

US 2011/0303609 A1    Dec. 15, 2011

Related U.S. Application Data

(60) Provisional application No. 61/354,448, filed on Jun. 14, 2010.

(51) Int. Cl.
*C02F 1/28* (2006.01)
*B01J 20/02* (2006.01)
(Continued)

(52) U.S. Cl.
CPC .............. *C02F 1/281* (2013.01); *B01J 20/0229* (2013.01); *B01J 20/06* (2013.01); *B01J 20/08* (2013.01); *B01J 20/12* (2013.01); *B01J 20/16* (2013.01); *B01J 20/28004* (2013.01); *B01J 20/28057* (2013.01); *B01J 2220/42* (2013.01); *B01J 2220/56* (2013.01); *C02F 1/288* (2013.01); *C02F 1/74* (2013.01); *C02F 3/327* (2013.01); *C02F 2101/103* (2013.01); *C02F 2101/16* (2013.01); *C02F 2101/20* (2013.01); *C02F 2101/30* (2013.01); *C02F 2101/305* (2013.01); *C02F 2209/003* (2013.01); *C02F 2209/06* (2013.01); *C02F 2209/08* (2013.01); *C02F 2209/10* (2013.01); *C02F 2209/14* (2013.01);
(Continued)

(58) Field of Classification Search
CPC ........ C02F 1/281; C02F 1/74; C02F 2101/30; C02F 2101/305; B01J 20/08
USPC .................................................... 210/669, 691
See application file for complete search history.

(56) References Cited

U.S. PATENT DOCUMENTS

| 515,895 A | 3/1894 | Bayer |
| 3,575,853 A | 4/1971 | Gaughan et al. |

(Continued)

FOREIGN PATENT DOCUMENTS

| AU | 661703 | 8/1995 |
| AU | 200154015 A1 | 1/2002 |

(Continued)

OTHER PUBLICATIONS

Patterson, Robert A., Temperal Variability of Septic Tank Effluent, Sep. 2003, Lanfax Laboratories Armidale, ISBN 0-9579438-4-1, pp. 305-312.*

(Continued)

*Primary Examiner* — Matthew O Savage
(74) *Attorney, Agent, or Firm* — Greenberg Traurig, LLP

(57) ABSTRACT

The instant disclosure relates to methods, systems, and apparatus for polishing wastewater (i.e. non-potable water) using filtration media. More particularly, the instant disclosure relates to wastewater polishing using a bed of mixed metal oxides under certain operating conditions to remove a plurality of contaminants from a wastewater stream.

7 Claims, 36 Drawing Sheets

(51) Int. Cl.
  B01J 20/06 (2006.01)
  B01J 20/08 (2006.01)
  B01J 20/12 (2006.01)
  B01J 20/16 (2006.01)
  B01J 20/28 (2006.01)
  *C02F 1/74* (2006.01)
  *C02F 3/32* (2006.01)
  *C02F 101/10* (2006.01)
  *C02F 101/16* (2006.01)
  *C02F 101/20* (2006.01)
  *C02F 101/30* (2006.01)

(52) U.S. Cl.
  CPC .......... *C02F2209/18* (2013.01); *C02F 2209/22* (2013.01); *C02F 2209/40* (2013.01); *C02F 2303/04* (2013.01)

(56) References Cited

U.S. PATENT DOCUMENTS

| | | |
|---|---|---|
| 3,728,439 A | 4/1973 | Urban |
| 3,764,652 A | 10/1973 | Morgan |
| 3,770,623 A | 11/1973 | Seidel |
| 3,922,224 A | 11/1975 | Lewandowski |
| 4,108,770 A | 8/1978 | Roy |
| 4,184,947 A | 1/1980 | Demisch |
| 4,218,318 A | 8/1980 | Niimi et al. |
| 4,267,038 A | 5/1981 | Thompson |
| 4,270,875 A | 6/1981 | Kainuma |
| 4,368,273 A | 1/1983 | Puskas |
| 4,443,337 A | 4/1984 | Otani et al. |
| 4,519,915 A | 5/1985 | George et al. |
| 4,548,718 A | 10/1985 | Muir |
| 4,555,992 A | 12/1985 | Dutu et al. |
| 4,565,633 A | 1/1986 | Mayenkar |
| 4,569,756 A | 2/1986 | Klein |
| 4,591,443 A | 5/1986 | Brown et al. |
| 4,668,485 A | 5/1987 | Cresswell et al. |
| 4,678,582 A | 7/1987 | Lavigne |
| 4,793,929 A | 12/1988 | Kickuth et al. |
| 4,810,385 A | 3/1989 | Hater et al. |
| 4,810,682 A | 3/1989 | Andrews |
| 4,839,051 A | 6/1989 | Higa |
| 4,855,040 A | 8/1989 | Kickuth |
| 4,906,359 A | 3/1990 | Cox, Jr. |
| 4,906,381 A | 3/1990 | Barbaro |
| 4,952,315 A | 8/1990 | Saab |
| 4,959,084 A | 9/1990 | Wolverton et al. |
| 5,030,424 A | 7/1991 | Fulford et al. |
| 5,078,882 A | 1/1992 | Northrop |
| 5,087,353 A | 2/1992 | Todd et al. |
| 5,091,315 A | 2/1992 | McCarty et al. |
| 5,106,797 A | 4/1992 | Allaire |
| 5,108,614 A | 4/1992 | Ross et al. |
| 5,156,741 A | 10/1992 | Morrison et al. |
| 5,160,632 A | 11/1992 | Kleefisch et al. |
| 5,174,897 A | 12/1992 | Wengrzynek |
| 5,200,081 A | 4/1993 | Stuth |
| 5,227,068 A | 7/1993 | Runyon |
| 5,266,213 A | 11/1993 | Gillham |
| 5,271,848 A * | 12/1993 | Smith et al. ................ 210/702 |
| 5,273,653 A | 12/1993 | Kickuth |
| 5,302,286 A | 4/1994 | Semprini et al. |
| 5,314,629 A | 5/1994 | Griese et al. |
| 5,318,699 A | 6/1994 | Robertson et al. |
| 5,322,629 A | 6/1994 | Stewart |
| 5,336,402 A | 8/1994 | Yamamoto et al. |
| 5,337,516 A | 8/1994 | Hondulas |
| 5,362,394 A | 11/1994 | Blowes et al. |
| 5,368,411 A | 11/1994 | Losack |
| 5,378,355 A | 1/1995 | Winkler |
| 5,407,572 A | 4/1995 | McGuire et al. |
| 5,411,665 A | 5/1995 | Scraggs et al. |
| 5,415,770 A | 5/1995 | Heskett |
| 5,451,325 A | 9/1995 | Herkenberg |
| 5,456,553 A | 10/1995 | Li et al. |
| 5,472,472 A | 12/1995 | Northrop |
| 5,486,291 A | 1/1996 | Todd et al. |
| 5,487,622 A | 1/1996 | Cherry et al. |
| 5,518,618 A | 5/1996 | Mulder et al. |
| 5,520,483 A | 5/1996 | Vigneri |
| 5,527,453 A | 6/1996 | Hachima |
| 5,534,154 A | 7/1996 | Gillham |
| 5,549,817 A | 8/1996 | Horsley et al. |
| 5,549,828 A | 8/1996 | Ehrlich |
| 5,554,289 A | 9/1996 | Grounds |
| 5,637,218 A | 6/1997 | Kickuth |
| 5,690,827 A | 11/1997 | Simmering |
| 5,702,593 A | 12/1997 | Horsley et al. |
| 5,736,047 A | 4/1998 | Ngo |
| 5,789,649 A | 8/1998 | Batchelor et al. |
| 5,837,145 A | 11/1998 | Dzombak et al. |
| 5,863,433 A | 1/1999 | Behrends |
| 5,893,975 A | 4/1999 | Eifert |
| 5,931,772 A | 8/1999 | Kirkpatrick et al. |
| 5,975,798 A | 11/1999 | Liskowitz et al. |
| 6,110,377 A | 8/2000 | Lamerant |
| 6,132,623 A | 10/2000 | Nikolaidis et al. |
| 6,159,371 A | 12/2000 | Dufay |
| 6,200,469 B1 | 3/2001 | Wallace |
| 6,207,114 B1 | 3/2001 | Quinn et al. |
| 6,214,607 B1 | 4/2001 | Logan |
| 6,242,663 B1 | 6/2001 | Ponder et al. |
| 6,248,302 B1 | 6/2001 | Barnett et al. |
| 6,387,276 B1 | 5/2002 | Nikolaidis et al. |
| 6,399,359 B1 | 6/2002 | Hofstede |
| 6,406,627 B1 | 6/2002 | Wallace |
| 6,413,432 B1 * | 7/2002 | Kumaoka ..................... 210/669 |
| 6,447,682 B1 | 9/2002 | Flowers |
| 6,576,130 B2 | 6/2003 | Wallace |
| 6,602,421 B2 | 8/2003 | Smith |
| 6,652,743 B2 | 11/2003 | Wallace et al. |
| 6,689,485 B2 | 2/2004 | Ponder et al. |
| 6,719,902 B1 | 4/2004 | Alvarez et al. |
| 6,758,896 B2 | 7/2004 | Kunbargi |
| 6,770,205 B1 | 8/2004 | Schroder et al. |
| 6,942,807 B1 | 9/2005 | Meng et al. |
| 7,008,964 B2 | 3/2006 | Clausen et al. |
| 7,037,946 B1 | 5/2006 | Reinhart et al. |
| 7,128,839 B1 | 10/2006 | Flowers et al. |
| 7,128,841 B2 | 10/2006 | Zhang |
| 7,445,717 B2 | 11/2008 | Cha et al. |
| 7,494,592 B2 | 2/2009 | Deskins |
| 7,635,236 B2 | 12/2009 | Zhao et al. |
| 7,718,062 B2 | 5/2010 | Bauer et al. |
| 7,754,079 B2 | 7/2010 | Bauer |
| 7,776,217 B2 | 8/2010 | Lucas |
| 7,799,232 B2 | 9/2010 | Hayashi et al. |
| 7,897,049 B2 | 3/2011 | Ghosh et al. |
| 7,998,267 B2 | 8/2011 | Gartner et al. |
| 8,048,303 B2 | 11/2011 | Lucas |
| 8,157,995 B2 | 4/2012 | Ghosh et al. |
| 8,206,586 B2 | 6/2012 | Smith et al. |
| 8,523,997 B2 | 9/2013 | Valentini et al. |
| 8,673,152 B2 | 3/2014 | Smith et al. |
| 8,696,907 B2 | 4/2014 | Rausch et al. |
| 2002/0070155 A1 | 6/2002 | Shiota et al. |
| 2003/0024874 A1 | 2/2003 | Wallace et al. |
| 2003/0089665 A1 | 5/2003 | Shaniuk |
| 2003/0173306 A1 | 9/2003 | Cha et al. |
| 2004/0031753 A1 | 2/2004 | Herman et al. |
| 2004/0040912 A1 | 3/2004 | McConchie et al. |
| 2005/0153118 A1 | 7/2005 | Licata |
| 2006/0016762 A1 | 1/2006 | Cha et al. |
| 2006/0021946 A1 | 2/2006 | Hensman et al. |
| 2006/0144797 A1 | 7/2006 | McConchie et al. |
| 2006/0230798 A1 | 10/2006 | McConchie et al. |
| 2006/0249465 A1 | 11/2006 | Jin et al. |
| 2007/0131145 A1 | 6/2007 | Biscan et al. |
| 2007/0181511 A1 | 8/2007 | Smith et al. |
| 2007/0246419 A1 | 10/2007 | Milosavljevic |
| 2008/0179253 A1 | 7/2008 | Clark et al. |
| 2008/0209968 A1 | 9/2008 | Drew et al. |

(56) References Cited

U.S. PATENT DOCUMENTS

| | | | |
|---|---|---|---|
| 2008/0264301 A1 | 10/2008 | Porat et al. | |
| 2009/0065412 A1 | 3/2009 | Mbarki et al. | |
| 2010/0276360 A1 | 11/2010 | Smith et al. | |
| 2011/0219668 A1 | 9/2011 | Cramwinckel et al. | |
| 2012/0160757 A1 | 6/2012 | Ghosh et al. | |
| 2012/0223029 A1 | 9/2012 | Smith et al. | |

FOREIGN PATENT DOCUMENTS

| | | | | |
|---|---|---|---|---|
| CN | 101948214 | | 1/2011 | |
| JP | 62-014984 A | * | 1/1987 | ............... C02F 1/28 |
| JP | 63264192 | | 11/1988 | |
| NZ | 516305 | | 12/2001 | |
| WO | 9728881 | | 8/1997 | |
| WO | 0177028 | | 10/2001 | |
| WO | 2004002605 | | 1/2004 | |
| WO | 2007092914 | | 8/2007 | |
| WO | 2009000845 | | 12/2008 | |
| WO | 2009/129406 | | 10/2009 | |

OTHER PUBLICATIONS

International Search Report and Written Opinion of the International Searching Authority dated Aug. 24, 2011 from corresponding International Application No. PCT/US2011/040300.

Goen E. Ho et al., Nitrogen and Phosphorus Removal from Sewage Effluent in Amended Sand Columns, Wat. Res., 1992, pp. 295-300, vol. 26, No. 3, Pergamon Press plc, Great Britain.

Yuansheng Hu et al., High Rate Nitrogen Removal in an Alum Sludge-Based Intermittent Aeration Constructed Wetland, Environmental Science & Technology, Jan. 31, 2012, pp. 1-34, ACS Paragon Plus Environment, Dublin, Ireland.

D.A. Kopec, Small Subsurface Flow Constructed Wetlands with Soil Dispersal System, Permit to Install 3 Final, Nov. 5, 2007, pp. 1-23, Ohio EPA, Division of Surface Water.

Draft Demo ESTCP, Tertiary Treatment and Recycling of Waste Water Environmental Restoration, Technology Demonstration Plan, Jan. 2011, pp. i-v & 6-41, United States Department of Defense ESTCP.

C. Klauber, Review of Bauxite Residue "Re-use" Options, CSIRO National Research Flagships Light Metals, May 2009, pp. i-viii & 1-66, Department of Resources, Energy and Tourism (DRET), Australia.

T. Bagshaw, Alumina Technology Roadmap, International Aluminium Institute Bauxite and Alumina Committee 2010 Update, 2011, pp. 1-24, International Aluminium Institute.

Website, http://virotec.com/solutions/industrial-wastewater-solids-treatment/, Retrieved from the internet on Feb. 7, 2013, 3 pages.

Sun et al., Treatment of Groundwater Polluted by Arsenic Compounds by Zero Valent Iron, Journal of Hazardous Materials 129 (1-3): 297-303 (2006).

S. Beveridge, $1.5 Billion in Reclamation Fund Untapped Despite Growing List of Abandoned Mines, Washington Observer-Reporter, pp. 1-3 (Sep. 23, 2002).

Ray, Treatment of Urban Stormwater for Dissolved Pollutants: A Comparative Study of Natural Organic Filter Media, Wiley Interscience, Autumn 2005, Wiley Periodicals, Inc., pp. 89-100, US government.

Henricus T. Hofstede, Use of Bauxite Refining Residue to Reduce the Mobility of Heavy Metals in Municipal Waste Compost, Doctoral Thesis presented by Henricus Theodorus Hofstede, Jan. 1994, School of Biological and Environmental Sciences, Murdoch University, Australia, 281 pages.

J.C. Novoa-Munoz et al, Changes in Soil Properties and in the Growth of Lolium Multiforum in an Acid Soil Amended with a Solid Waste from Wineries, Bioresource Technology 99 (2008), pp. 6771-6779.

Remy Albrecht et al., Changes in the Level of Alkaline and Acid Phosphatase Activties During Green Wastes and Sewage Sludge Co-composting, Bioresource Technology 101 (2010), pp. 228-233.

Jenn-Hung Hsu et al, Chemical and Spectroscopic Analysis of Organic Matter Transformations during Composting of Pig Manure, Environmental Pollution 104 (1999), pp. 189-196.

Susan Tandy et al., Remediation of Metal Polluted Mine Soil with Compost: Co-composting Versus Incorporation, Environmental Pollution 157 (2009) 690-697.

Meeussen et al., Dissolution Behavior of Iron Cyanide (Prussian Blue) in Contaminated Soils, Environ. Sci. Technol., 1992, pp. 1832-1838, vol. 26, No. 9, American Chemical Society.

Bauxite Geology, http://www.world-aluminum.org/production/mining/geology/html, 2 pages, retrieved from internet on Apr. 24, 2008.

S. Beveridge, Coal Mines Fuel PA Pollution Crisis, Washington Observer-Reporter, Sep. 23, 2002.

S. Beveridge, DEP Creates Fund to Treat Drainage at Closed LTV Sites, Washinton Observer-Reporter, Sep. 3, 2002.

S. Beveridge, DEP Orders Beth Energy Mines to Continue Water Cleanup, Washington Observer-Reporter, Nov. 26, 2002.

S. Beveridge, Study Predicts Old Mine Water Likely to Pollute Mon River Soon, Washington Observer-Reporter, Nov. 24, 2002, 1 page.

Cooper et al., An Investigation of Radionuclide Uptake into Food Crops Grown in Soils Treated with Bauxite Mining Residues, Journal of Radioanalytical and Nuclear Chemistry, vol. 194, No. 2, pp. 379-387 (1995).

Woodwell, Meeting on Monongahela Mine Pools, Alcoa Corporate Office, Pittsburgh, PA, Jan. 2, 2003, 1 page.

Article, Montana Mining Firms to Begin Huge Berkeley Pit Cleanup, Civil Engineering News, Jun. 2002, 2 pages.

J. Skousen, What is Acid Mine Drainage, WVU College of Agriculture and Forestry, Division of Plant and Soil Science, 1 page.

Article, Recycling and Reuse of Basic Oxygen Furnace (BOF)/Basic Operation Process (BOP) Steelmaking Slags, Steel Project Fact Sheet, Office of Industrial Technologies, Energy Efficiency and Renewable Energy, US Department of Energy, 1 page.

Skousen et al, Overview of Acid Mine Drainage Treatment with Chemicals, Center for Agriculture, Natural Resources and Community Development, West Virginia University Extension Services, http://www.wvu.edu/~agexten/landrec/chemtrt.htm, 15 pages.

US Filter et al., Final Design Report-Horseshoe Bend Water Treatment Facility, Appendix B, Treatability Studies Associated with the Horseshoe Bend Water Treatment Facility, Dec. 2001, 46 pages.

Wong et al, Cation Exchange Behavior of Bauxite Refining Residues from Western Australia, Journal of Environmental Quality, vol. 24, No. 3, pp. 461-466 (1995).

Ziemkiewicz et al., Abandoned Mine Pool Flooding of the Pittsburgh, Ohio, and Irwin Basins, submitted to Parsons Infrastructure & Technology Group, Inc., National Mine Reclamation Center, WV173 Phase II, Feb. 2002, 4 pages.

R. Apak et al., Sorptive Removal of Cesium-137 and Strontium-90 from Water by Unconventional Sorbents, Journal of Nuclear Science and Technology, 1995, 32(10), 1008-1017.

Gid Roach et al., Zeolite Production from DSP in Red Mud Feedstock, Light Metals 1993, 51-57.

J. Skousen et al., Effect of Digestion Method, Siderite Content, and Fizz Rating on Neutralization Potential of Overburden Samples, Center for Agriculture, Natural Resources & Community Development, West Virginia University, Extension Service, http://www.wvu.edu/~agexten/landrec/nppapjeq.htm, downloaded from the internet on Apr. 9, 2013, 17 pages.

Ghosh et al., Equilibrium Precipitation and Dissolution of Iron Cyanide Solids in Water, Environmental Engineering Science, 1999, pp. 293-312, vol. 16, No. 4.

Dollhopf, Suitability of Bauxite Residue for Neutralization of Acid Producing Mine Wastes, pp. 1-16, Montana State University Reclamation Research Unit for Aluminum Company of America.

http://libertyhydro.net/treatment-systems/selenium-treatment/, retrieved from internet on Jul. 11, 2011.

Article, Liberty Hydro, Selenium Remediation, 2 pages.

Fu et al., Adsorption of Disperse Blue 2BLN by Microwave Activated Red Mud, Environmental Progress and Sustainable Energy, Dec. 2011, vol. 30, No. 4, pp. 558-566.

Ramaswami et al., Batch mixed Iron Treatment of High Arsenic Waters, Water Research 35(18): 4474-4479, 2001.

(56) References Cited

OTHER PUBLICATIONS

Bang et al., Chemical Reactions Between Arsenic and Zero Valent Iron in Water, Water Research 39(5): 763-760, 2005.
Lu et al, Dechlorination of Hexachlorobenzene by Zero Valent Iron, Pract. Periodical of Haz., Toxic, and Radioactive Waste Mgmt., vol. 8, Issue 2, Apr. 2004, pp. 136-140 (Abstract only).
Gavaskar et al, Design Guidance for Application of Permeable Barriers to Remediate Dissolved Chlorinated Solvents, Feb. 1997, pp. 1-192.
Greenway et al., Media Amendments for Enhancing Phosphorous Retention in Intermittently Loaded Vertical Flow Wetlands, Griffith University, Brisbane, Australia, Nov. 2012.
Article, University of Cape Town, South Africa Presentation on pe-PH Diagrams, retrieved from http://web.uct.ac/za/depts/geolsci/roy/lectures/lec10.pdf in May 2006, pp. 1-15.
Durant et al., Remediation of Perchlorate, NDMA, and Chlorinated Solvents Using Nanoscale ZVI, RTDF PRB Workshop Niagra Falls, New York, Oct. 16, 2003, pp. 1-31.
Zhang et al., Removal of Selenate from Water by Zerovalent Iron, J. Environ. Qual. 34, pp. 487-495, 2005 (abstract only), http://jeq.scijournals.org/cgi/content/abstract/34/2/487.
Ghosh, State of SERDP/ESTCP Funded Zero Valent Iron (ZVI) Research and Technology, SERDP, 21 pp., retrieved from the Internet Apr. 2, 2008 at http:///www.frtr.gov/pdf/meetings/k--ghosh_09jun04.pdf.
E. Lopez et al., Adsorbent Properties of Red Mud and Its Use for Wastewater Treatment, Wat. Res., 1998, pp. 1314-1322, vol. 32, No. 4, Elsevier Science Ltd., Great Britain.
J. Pradhan et al., Adsorption of Hexavalent Chromium from Aqueous Solution by Using Activated Red Mud, Journal of Colloid and Interface Science, 1999, pp. 137-141, vol. 217, Academic Press.
J. Pradhan et al., Adsorption of Phosphate from Aqueous Solution Using Activated Red Mud, Journal of Colloid and Interface Science, 1998, pp. 169-172, vol. 204, Academic Press.
W.R. Pinnock et al., Assessment of Strength Development in Bayer-Process Residues, Journal of Materials Science, 1992, pp. 692-696, vol. 27, Chapman and Hall.
R.N. Summers et al., Bauxite Reside (Red Mud) Increases Phosphorus Retention in Sandy Soil Catchments in Western Australia, Fertilizer Research, 1993, pp. 85-94, vol. 34, Kluwer Academic Publishers, the Netherlands.
Article, Camris, New Innovative Water Treatment Technology, 2 pages.
P. Vachon et al., Chemical and Biological Leaching of Aluminum from Red Mud, Environ. Sci. Technol., 1994, pp. 26-30, vol. 28, American Chemical Society.
I. Doye et al., Column Leaching Test to Evaluate the Beneficial Use of Alkaline Industrial Wastes to Mitigate Acid Mine Drainage, Tailings and Mine Waste 02, 2002, pp. 271-282, Swets & Zeitlinger.
L. Qiao et al., The Effects of Clay Amendment on Composting of Digested Sludge, Elsevier Science Ltd., 1997, pp. 1056-1064, vol. 31, No. 5, Wat. Res., Great Britain.
P. Kasliwal, Enrichment of Titanium Dioxide in Red Mud: A Kinetic Study, Hydrometallurgy, 1999, pp. 73-87, vol. 53, Elsevier Science B.V.
D. McConchie et al., An Environmental Assessment of the Use of Seawater to Neutralise Bauxite Refinery Wastes, Second International Symposium on Extraction and Processing for the Treatment and Miinimization of Wastes, 1996, pp. 407-416, The Minerals, Metals & Materials Society.
T. Mahata et al., Formation of Aluminum Titanate-Mullite Composite from Bauxite Red Mud, Metallurgical and Materials Transactions B, Jun. 2000, pp. 551-553, vol. 31B.
E. Ercag et al., Furnace Smelting and Extractive Metallurgy of Red Mud: Recovery of TiO2, Al2O3 and Pig Iron, J. Chem. echnol. Biotechnol., 1997, pp. 241-246, vol. 70.
R. Apak et al., Heavy Metal Cation Retention by Unconventional Sorbents (Red Muds and Fly Ashes), Wat. Res., 1998, pp. 430-440, vol. 32, No. 2, Elsevier Science Ltd., Great Britain.

S.C. Ward et al., Modifying Sandy Soils with the Fine Residue from Bauxite Refining to Retain Phosphorus and Increase Plant Yield, Fertilizer Research 36, 1993, pp. 151-156, vol. 36, Kluwer Academic Publishers, the Netherlands.
S. Wang et al., Natural Zeolites as Effective Adsorbents in Water and Wastewater Treatment, Chemical Engineering Journal, 2010, pp. 11-24, vol. 156, Elsevier B.V.
S. Pilurzu et al., New Research Proposals for Utilisation and Disposal of Bauxitic Red Mud from Bayer Process, pp. 471-480, Nov. 29.
S. Wang et al., Novel Applications of Red Mud as Coagulant, Adsorbent and Catalyst for Environmentally Benign Processes, Chemosphere, 2008, pp. 1621-1635, vol. 72, Elsevier Ltd.
M. Bowman, On-site Tertiary Treatment Using Ecomax Systems, Desalination, 1996, pp. 305-310, vol. 106, Elsevier Science B.V.
S.J. Shiao et al., Phophate Removal from Aqueous Solution from Activated Red Mud, Journal WPCF, Feb. 1977, pp. 280-285.
B. Koumanova, Phophate Removal from Aqueous Solutions Using Red Mud Wasted in Bauxite Bayer's Process, Resources, Conservation and Recycling, 1997, pp. 11-20, vol. 19, Elsevier Science B.V.
B. Mishra et al., Pyrometallurgical Extraction of Alumina and Iron from Red Mud, The Minerals, Metals & Materials Society, 2000, pp. 369-381.
G.I.D. Roach, Recovering Value from Bauxite Tailings, An International Bauxite Tailings Workshop, Nov. 2-6, 1992, pp. 409-418, The Australian Bauxite and Alumina Producers, Perth, Western Australia.
J. Kumpiene et al., Stabilization of As, Cr, Cu, Pb and Zn in Soil Using Amendments—A Review, Science Direct Waste Management, 2008, pp. 215-225, vol. 28, Elsevier Ltd.
G. Atun et al., A Study of Surface Properties of Red Mud by Potentiometric Method, Journal of Colloid and Interface Science, 2000, pp. 40-45, vol. 228, Academic Press.
L.R. Nissen et al., Synthetic Zeolites as Amendments for Sewage Sludge-Based Compost, Chemosphere, 2000, pp. 265-269, vol. 41, Elsevier Science Ltd.
C. Namasivayam et al., Treatment of Dairy-Waste Water using Waste Red Mud, Research and Industry, Sep. 1992, pp. 165-167, vol. 37.
D. McConchie et al., The Use of Seawater Neutralised Bauxite Refinery Residues (Red Mud) in Environmental Remediation Programs, pp. 391-400.
D. McConchie et al., The Use of Seawater-Neutralised Bauxite Refinery Residues in the Management of Acid Sulphate Soils, Sulphidic Mine Tailings and Acid Mine Drainage, Third Queensland Environmental Conference, May 25-26, 2000, pp. 201-208.
R. Phillips, Use of Soil Amendments to Reduce Nitrogen, Phosphorus and Heavy Metal Availability, Journal of Soil Contamination, 1998, pp. 191-211, vol. 7(2), AEHS.
P.J.A. Fowlie et al., Utilization of Industrial Wastes and Waste By-Products for Phophorus Removal: An Inventory and Assessment, Environment Canada Environmental Protection Service, Jun. 1973, pp. i-xii & 1-87, Project No. 72-3-5, Ontario Ministry of the Environment, Canada.
D. McConchie et al., The Use of Seawater Neutralised Red Mud from Bauxite Refineries to Control Acid Mind Drainage and Heavy Metal Leachates, 14th Australian Geological Convention, Jul. 1998, p. 298, Geological Society of Australia, Abstracts No. 49.
O.C. Fursman et al., Utilization of Red Mud Residues from Alumina Production, U.S. Bureau of Mines Report of Investigations 7454, Nov. 1970, pp. 1-32, U.S. Department of the Interior.
E.E. Shannon et al., Utilization of Alumized Red Mud Solids for Phophorus Removal, Journal WPCF, Aug. 1976, pp. 1948-1954, vol. 48, No. 8.
Website, http://www.walliswater.com.au, Retrieved from internet Mar. 20, 2012, 2 pp.
Website, http://www.aews.com.au/our-brands/wadi, Retrieved from Internet Apr. 6, 2013, 2pp.
Website, http://www.aews.com.au/our-brands/ecomax, Retrieved from internet Apr. 6, 2013, 4pp.
Website, http://www.aews.com.au/our-brands/reo-drain, Retrieved from internet Apr. 6, 2013, 2pp.
D. Austin, Advanced Treatment Wetlands: A 4th Generation Technology, North American Wetland Engineering, White Bear Lake, Minnesota, 7 pages.

(56) References Cited

OTHER PUBLICATIONS

S. Wallace et al., High Rate Ammonia Removal in Aerated Engineered Wetlands, Presented at the 10th International Conference on Wetland Systems for Water Pollution Control, Sep. 23-29, 2006, Lisbon, Portugal.
T.S. Jamieson et al., The Use of Aeration to Enhance Ammonia Nitrogen Removal in Constructed Welands, Canadian Biosystems Engineering, 2003, pp. 1.9-1.14, vol. 45, Department of Environmental Sciences and Department of Engineering, Nova Scotia Agricultural College, Nova Scotia, Canada.
S. Wallace et al., Design and Performance of the Wetland Treatment System at the Buffalo Niagara International Airport, Naturally Wallace Consulting, Vadnais Heights, Minnesota, 6 pages.
A. Kantardjieff et al., Practical Experiences with Aerobic Biofilters in TMP (Thermomechanical Pulping), Sulfite and Fine Paper Mills in Canada, Wat. Sci. Tech., 1997, pp. 227-234, vol. 35, Elsevier Science Ltd., Great Britain.
A.T. Mann et al., Modelling Biological Aerated Filters for Wastewater Treatment, Wat. Res., 1997, pp. 2443-2448, vol. 31, Elsevier Science Ltd., Great Britain.
Article "The Edmonton (Alberta) International Airport (EIA)", www.wef.org/magazine, Feb. 2011, p. 50, BCR Environmental.
R.H. Kadlec, Hydrologic Factors in Wetland Water Treatment, Constructed Wetlands for Wastewater Treatment, General Principles, pp. 21-40.
Ni-Bin Chang et al., New Performance Based Passive Septic Tank Underground Drainfield for Nutrient and Pathogen Removal using Sorption Media, Environmental Engineering Science, 2010, pp. 469-482, vol. 27, copyright Mary Ann Liebert, Inc.
J.S. Han et al., Removal of Phosphorus using Chemically Modified Lignocellulosic Materials, 6th Inter Regional Conference on Environment-Water "Land and Water Use Planning and Management", Sep. 3-5, 2003, pp. 1-11, Albacete, Spain.
G. Roberge et al., Enlevement du phoosphore des eaux usees par traitement a base de tourbe dopee aux boues rouges, The Canadian Journal of Chemical Engineering, Dec. 1999, pp. 1185-1194, vol. 77, Canada.
Goen E. Ho et al., Groundwater Recharge of Sewage Efffluent Through Amended Sand, Wat. Res., 1992, pp. 285-293, vol. 26, No. 3, Pergamon Press, Great Britain.
K.M. Foxon et al., The evaluation of the Anaerobic Baffled Reactor for Sanitation in Dense Peri-Urban Settlements, Report to the Water Research Commission, WRC Report No. 1248/01/06, Feb. 2006.
R.L. Knight et al., The Use of Treatment Wetlands for Petroleum Industry Effluents, Environmental Science & Technology, vol. 33, No. 7, 1999, pp. 973-980.
R. Crites et al., Small and Decentralized Wastewater Management Systems, McGraw-Hill, pp. 52, 587, 606, 663, 682, 692.
K. Kitzman et al., Overview of Alcoa's Enhanced Natural Systems (ENS) Project, International Applied Phytotechnologies Conference, Chicago, Illinois, Mar. 3-5, 2003, 39 pp.
International Search Report and Written Opinion of the International Searching Authority dated May 2, 2014 from International Application No. PCT/US2014/011109.
Robert H.L. Howe, "Recent Advance in Cyanide Waste Reduction Practice", 18th Industrial Waste Conference, pp. 690-705, Purdue University, 1963.
International Search Report and Written Opinion of the International Searching Authority dated Jan. 23, 2008 from International Application No. PCT/US2007/061821.
International Preliminary Report on Patentability dated Aug. 12, 2008 from International Application No. PCT/US2007/061821.
Communication Relating to the Results of the Partial International Search from International Application No. PCT/US2007/061821.
U.S. Environmental Protection Agency, Office of Research and Development, Center for Environmental Research Information, Cincinnati, OH 45268, Design Manual, Constructed Wetlands and Aquatic Plant Systems for Municipal Wastewater Treatment, EPA/625/1-88-022, Sep. 1988, 92 pp.

Barbieri, J.M., et al., Paris Improves Its Drinking Water Treatment Plants, Journal of the Institution of Water & Environmental Management, pp. 2-12, Mar. 1992.
Panswad, Thongchai, et al., Water Quality and Occurrences of Protozoa and Metazoa in Two Constructed Wetlands Treating Different Wastewaters in Thailand, Water Science & Technology, pp. 183-188, 1997, vol. 36, No. 12.
Anonymous, Tertiary Filtration of Wastewaters, Journal of Environmental Engineering, Dec. 1986, pp. 1008-1026, vol. 112, No. 6.
Reddy, K.R., et al., State-of-the-Art Utilization of Aquatic Plans in Water Pollution Control, Water Science & Technology, 1987, vol. 19, No. 10, 19 pp.
Zachritz, Walter H., II, et al., Performance of an Artificial Wetlands Filter Treating Faculative Lagoon Effluent at Carville, Louisiana, Water Environment Research, pp. 46-52, Jan.-Feb. 1993, vol. 65, No. 1.
Tyre, Bryan W., et al., On-Site Sewage Disposal for a Subdivision in a High Groundwater Area, Proceedings of the 1997 Symposium on-Site Characterization and Design of On-Site Septic Systems, pp. 283-293, Nov. 1997, vol. 1324, ASTM, Conshohocken, PA.
Stockdale, Erik C., et al., Prospects for Wetlands Use in Stormwater Management, Coastal Zone 87, Proceedings of the Fifth Symposium on Coastal and Ocean Management, pp. 3701-3714, vol. 4, ASCE, New York, N.Y.
W.C. Lucas, Design of Integrated Bioinfiltration-Detention Urban Retrofits with Design Storm and Continuous Simulation Methods, Journal of Hydrologic Engineering, vol. 15, No. 6, Jun. 1, 2010, pp. 486-498.
W.C. Lucas et al., Hydraulic Response and Nitrogen Retention in Bioretention Mesocosms with Regulated Outlets: Part I-Hydraulic Response, Water Environment Research, Aug. 2011, vol. 83, No. 8, pp. 692-702.
W.C. Lucas et al., Hydraulic Response and Nitrogen Retention in Bioretention Mesocosms with Regulated Outlets: Part II—Nitrogen Retention, Water Environment Research, Aug. 2011, vol. 83, No. 8, pp. 703-713.
W.C. Lucas et al., Phosphorus Retention by Bioretention Mesocosms Using Media Formulated for Phosphorus Sorption: Response to Accelerated Loads, Journal of Irrigation and Drainage Engineering, Mar. 1, 2011, vol. 137, No. 3, pp. 144-153.
Virotec, Treatment of Pesticide Contaminated Wastewater and Soil, Technical Report, Virotec Global Solutions, 9 pp., Mar. 2012.
Virotec, Treating Contaminated Stormwater Using ViroflowTM Technology, Technical Paper, Virotec Global Solutions, 18 pp., Oct. 2011.
Westerhoff, Paul, "Removal of Endocrine Disruptors, Pharmaceuticals, and Personal Care Products During Water Treatment", Southwest Hydrology, Nov./Dec. 2003, pp. 18-19.
International Search Report and the Written Opinion of the International Searching Authority dated Oct. 30, 2007 from International Application No. PCT/US2007/069016.
W. Huang et al., Phosphate Removal from Wastewater Using Red Mud, Journal of Hazardous Materials, 158, 2008, Elsevier B.V., pp. 35-42.
Goen Ho et al., Phosphorus Removal Using Bauxite Refining Residue (Red Mud), Institute for Environmental Science, Murdoch University, Perth, Western Australia, Technical Papers, Apr. 18-23, 1993, vol. 3, pp. 607-613.
K. Mathew et al., Small Scale Treatment Systems, Environmental Science, Murdoch University, Murdoch, Western Australia, Aug. 1993, pp. 149-159.
D.M. Weaver et al., The Effectiveness of Lime-based Amendments and Bauxite Residues at Removing Phosphorus from Piggery Effluent, Environmental Pollution, vol. 46, Issue 3, 1987, pp. 163-175.
G. Ho et al., Bacteria and Virus Removal from Secondary Effluent in Sand and Red Mud Columns, Water Science & Technology, vol. 23 (1-3), 1991, pp. 261-270.
Anonymous, Microstrainers Aid Pollution Control, European Water & Sewage, vol. 90, No. 1088, Oct. 1986, pp. 440, 442-443.
F. Rojo, Minireview, Degradation of Alkanes by Bacteria, Environmental Microbiology, 11 (10), 2009, pp. 2477-2490.

(56) References Cited

OTHER PUBLICATIONS

B. Gargouri et al., Application of a Continuously Stirred Tank Bioreactor (CSTR) for Bioremediation of Hydrocarbon-Rich Industrial Wastewater Effluents, Journal of Hazardous Materials, 189, 2011, pp. 427-434.

P.G. Nix et al., A Constructed Wetland for the Treatment of Stormwater Contaminated with Diesel Fuel, Proceedings, 17th Arctic and Marine Oilspill Program Technical Seminar, 1994, vol. 17, pp. 439-464.

R. Bartha, Biotechnology of Petroleum Pollutant Biodegradation, Microbial Ecology, 1986, vol. 12, pp. 155-172.

F. Widdel, Cultivation of Anaerobic Microorganisms with Hydrocarbons as Growth Substrates, K. N. Timmis (ed.), Handbook and Lipid Microbiology, Springer-Verlag Berlin Heidelberg, 2010, pp. 3787-3798.

R.J. Watkinson et al., Physiology of Aliphatic Hydrocarbon-Degrading Microorganisms, Biodegradation, 1990, 1, pp. 79-92.

R.A. Patterson et al., Temporal Variability of Septic Tank Effluent in Future Directions for On-site Systems: Best Management Practice. Proceedings of On-site '03 Conference. Held at University of New England, Armidale, Sep. 30-Oct. 2, 2003. Published by Lanfax Laboratories Armidale, pp. 305-312.

M.A. Gomez et al., Influence of Carbon Source on Nitrate Removal of Contaminated Groundwater in a Denitrifying Submerged Filter, Journal of Hazardous Materials, 2000, B80, pp. 69-80.

G. Maltais-Landry et al., Nitrogen Transformations and Retention in Planted and Artificially Aerated Contructed Wetlands, Water Research 43, 2009, pp. 535-545.

W.D. Robertson et al., Wood-Based Filter for Nitrate Removal in Septic System, Transactions of the ASABE, vol. 48, pp. 121-128.

B.B. Storey et al., Water Quality Characteristics and Performance of Compost Filter Berms, Texas Department of Transportation, 2004, 119 pp.

U.S. Environmental Protection Agency, Wastewater Technology Fact Sheet Wetlands: Subsurface Flow, Sep. 2000, 9 pp.

U.S. Environmental Protection Agency, Wastewater Management Fact Sheet: Denitrifying Filters, Sep. 2007, 7 pp.

Z. Yousefi et al., Nitrogen and Phosphorus Removal from Wastewater by Subsurface Wetlands Planted with Iris pseudacorus, Ecological Engineering, 36, 2010, pp. 777-782.

K. Abe et al., Efficiency of Removal of Nitrogen, Phosphorus, and Zinc From Domestic Wastewater by a Constructed Wetland System in Rural Areas: A Case Study, Water Science & Technology, 2008, pp. 2427-2433.

A.N. Bezbaruah et al., Incorporation of Oxygen Contribution by Plant Roots into Classical Dissolved Oxygen Deficit Model for a Subsurface Flow Wetland, Water Scient & Technology, 2009, pp. 1179-1184.

P. Champagne, Wetlands, Natural Processes and Systems for Hazardous Waste Treatment, Environmental and Water Resources Institute (EWRI) of the American Society of Civil Engineers, 2008, pp. 189-256.

M. Healy et al., Nutrient Processing Capacity of a Constructed Wetland in Western Ireland, Journal of Environmental Quality, vol. 31, Sep.-Oct. 2002, pp. 1739-1747.

P. Kuschk et al., Annual Cycle of Nitrogen Removal by a Pilot-Scale Subsurface Horizontal Flow in a Constructed Wetland Under Moderate Climate, Water Research, 2003, pp. 4236-4242.

N. Tam et al., Mass Balance of Nitrogen in Constructed Mangrove Wetlands Receiving Ammonium-Rich Wastewater: Effects of Tidal Regime and Carbon Supply, 2009, Ecological Engineering, pp. 453-462.

J. Vymazal, Constructed Wetlands for Wastewater Treatment: Five Decades of Experience, Environmental Science & Technology, 2011 vol. 45, No. 1, pp. 61-69.

C.S. Lee, Thesis: Biodegradation of Oil and Grease in Upflow Anaerobic Sludge Blanket Reactor for Palm Oil Mill Effluent Treatment, Universiti Teknologi Malaysia (UTM), 2006.

Dod, Water Conservation: Tertiary Treatment and Recycling of Waste Water, (ER-201020), Fact Sheet, Jan. 2011, 2 pp.

\* cited by examiner

| Test Number | Residue | Hydraulic Conductivity, Downflow (cm/sec at 20C) |
|---|---|---|
| 4a | 4-200 mesh unwashed | 0.002 |
| 4b | 4-200 mesh mild backwash | 0.067 |
| 4c | 4-200 mesh vigorous backwash | 0.111 |
| 4d | 4-200 mesh air-dried twice | 0.000 |
| 4e | 4-200 mesh backwashed again | 0.029 |
| 5 | 4-100 mesh without backwash | 0.007 |
| 6a | 4-60 mesh without basckwash | 0.025 |
| 6b | 4-60 mesh washed | 0.004 |
| 6c | 4-60 mesh washed, upflow | 0.010 |
| 6d | 4-60 mesh backwashed, upflow | 0.190 |
| 6e | 4-60 mesh backwashed | 0.089 |
| 7a | 4-80 mesh unwashed | 0.028 |
| 7b | 4-80 mesh air-dried, rehydrated | 0.000 |
| 7c | 4-80 mesh backwashed waiting for data | waiting for data |
| 8a | 4-80 mesh hydrated overnight, without backwash | 0.000 |
| 8b | 4-80 mesh backwashed test 8 media | 0.033 |
| 9a | 4-80 mesh hydrated in column, without backwash | 0.004 |
| 9b | 4-80 backwashed test 9 media | waiting for data |
| 10a | 4-80 mesh hydrated in column & sloshed | 0.000 |
| 10b | 4-80 mesh hydrated in column, sloshed & upflow | 0.135 |
| 10c | 4-80 mesh, hydrated, sloshed backwashed & downflow | 0.117 |
| 11a | 50-80 mesh Unwashed | 0.010 |
| 11a- dup | 50-80 mesh Unwashed | 0.010 |
| 11b | 50-80 mesh Unwashed, Upflow | 0.045 |
| 11c | 50-80 Washed | 0.006 |
| 12 | 60-80 mesh, Unwashed | 0.012 |
| 12b | 60-80 mesh, Unwashed | 0.007 |
| 12c | 60-80 mesh, Washed, Upflow | 0.022 |
| 13a | 4-30 mesh,Unwashed | 0.166 |
| 13b | 4-30 mesh, Washed, Upflow | 0.172 |
| 14 | 4-80 mesh, Upflow | 0.021 |
| 15 | <4 mesh, Upflow | 0.007 |
| 16 | 4-80 mesh, Upflow hydrated at 6 ml/min | 0.016 |
| 17 | <4 mesh, Upflow hydrated at 6 ml/min | 0.041 |
| 17- dup | <4 mesh, Upflow hydrated at 6 ml/min | 0.050 |
| | max | 0.190 |
| | min | 0.000 |

FIG. 26

METHOD FOR REMOVING DRUGS FROM WASTE WATER USING NEUTRALIZED BAUXITE RESIDUE

CROSS-REFERENCE TO RELATED APPLICATION

This patent application is a non-provisional of and claims priority to U.S. Provisional Patent Application No. 61/354,448 filed Jun. 14, 2010; which is incorporated herein by reference in its entirety.

BACKGROUND

Prior to discharge into the environment, wastewater must generally be within certain prescribed limits for various contaminant levels. To properly discharge treated water, a polishing step may be employed. Wastewater polishing generally includes removing trace impurities from the water prior to discharge. Conventional wastewater polishing methods and systems may be onerous, costly, and time consuming.

SUMMARY OF THE DISCLOSURE

Broadly, the present disclosure relates to methods and systems for polishing wastewater (i.e. non-potable water) using filtration media. More particularly, the instant disclosure relates to wastewater polishing using a bed of mixed metal oxides under certain operating conditions to remove a plurality of contaminants from a wastewater stream. These systems, methods, apparatus and/or compositions may be applied to the treatment of sanitary wastewater, drinking water, storm water, surface water, groundwater, irrigation water, medical wastewater, pharmaceutical wastewater, leachate, laboratory wastewater, or other aqueous waste.

In one aspect, a wastewater treatment system is disclosed. The wastewater treatment system may include a disinfection system (sometimes called a contaminant removal system) containing a mixed metal oxide bed (MMOB). When used in conjunction with a wastewater stream containing at least about 5 ppm dissolved oxygen, the wastewater treatment system is capable of removing significant amounts of contaminants, such as microorganisms (e.g. fecal coliform) or pharmaceutical and/or personal care products (PPCPs), as described in further detail below. For example, when the MMOB has the particulate characteristics described below and the wastewater stream is properly oxygenated, the wastewater treatment system may remove at least about 90% removal of fecal coliform from the wastewater stream. Similarly, the system may be capable of removing at least about 10% of a PPCP from the wastewater stream.

It has been found that the combination of an MMOB with an oxygenated wastewater stream increases the removal rate of contaminants. It is believed that, by aerating the wastewater stream, the metal oxides present in the MMOB are regenerated and/or activated. It is further believed that the MMOB may regenerate its oxides in the presence of the dissolved oxygen brought in via the wastewater stream, thus improving bed life and functionality. This increases the contaminant removal rate of the system. Indeed, with continued flow-through of oxygenated water, the MMOB may last indefinitely.

Though no particular mechanism is subscribed to in the instant disclosure, the MMOB may operate to remove contaminants from and consistently disinfect the wastewater through one or more mechanisms. It is believed that aerating the MMOB may aid or contribute to the effectiveness of one or more of the mechanisms. Some non-limiting examples of removal processes and/or mechanisms include: reactive oxidation by reactive oxygen species, adsorption, absorption, degradation (including bio-degradation and chemical degradation), entrainment, filtration, predation, and combinations thereof. Through one or more of these mechanisms, contaminants may be removed from the wastewater stream. The wastewater streams treated according to the systems and methods of the instant disclosure may include more than one contaminant, in a contaminant profile. The aerated MMOB is believed to remove various classes and categories of contaminants from the wastewater stream, improving removal efficiency for some classes while allowing for the removal of others.

The MMOB generally includes a plurality of mixed metal oxides, including iron oxide. In one embodiment, the MMOB may contain one or more of alumina, silica, titanium dioxide, and other mixed metal oxides. Additionally, in one embodiment, the mixed metal oxide bed may include natural zeolites. Natural zeolites may generally refer to hydrated aluminosilicate minerals of a porous structure with certain physico-chemical properties, such as cation exchange, molecular sieving, catalysis, and sorption. For example, natural zeolites may generally include materials which are generally present in alkaline clay, bauxite ore, bauxite residue, red mud, and combinations thereof. As depicted in the examples section, experimental analysis identified at least two natural zeolites present in alkaline clay used in a MMOB in one embodiment. In addition to mixed metal oxides, natural zeolite materials may also be an effective media in water treatment and/or water polishing.

In one embodiment, the MMOB includes an alkaline clay in a particulate form. In one embodiment, the MMOB is produced from bauxite residue which is in the form of particulate alkaline clay. The alkaline clay which may be employed in one embodiment of the MMOB may refer to aged bauxite residue or "red mud" which has been altered. For example, raw alkaline clay includes alkaline clay which has undergone a transformation or change due to the prolonged exposure to atmospheric carbon dioxide and/or contact with anthropogenic carbon dioxide as a result of being in a residue disposal area. For example, the alkaline clay is generally free from draining liquids and is neutralized from its original form. In some embodiments, alkaline clay has a pH in the range of 9-11, whereas raw bauxite residue or "red mud" is highly caustic, with a pH of 13. In one embodiment, the alkaline clay is used in raw form, once residual caustic is flushed from the system so that wastewater treated remains within the neutral pH range (pH 6-9). Raw, as used herein, may refer to unprocessed and untreated alkaline clay. For example, raw alkaline clay may be broken apart, however, no chemical reactions occur. In one embodiment, bauxite ore may be used as the MMOB. Bauxite ore has similar properties to alkaline clay, including the high iron oxide content. Thus, it may be used in independently or in combination with alkaline clay pursuant to the instant disclosure. In one embodiment, silicon oxide (e.g. red sand) may be used as the MMOB. Silicon oxide has similar properties to alkaline clay and, in some embodiments, includes higher percentages of iron oxide than alkaline clay. Thus, it may be used in independently or in combination with alkaline clay pursuant to the instant disclosure.

Through certain characteristics attributed to the MMOB, it is believed that there is an increased affinity for removing one or more contaminants from the wastewater stream. For example, parameters may include: concentration of dissolved oxygen within the MMOB and/or wastewater stream; average particle size, hydraulic loading rate, hydraulic conductivity, pH, contact time (hydraulic retention time), field capacity of the MMOB, and/or ratio of metal oxide components within the MMOB.

In one embodiment, the wastewater stream includes a dissolved oxygen concentration of at least about 1 ppm as it enters the MMOB. In one embodiment, the wastewater stream includes a dissolved oxygen concentration of at least about 2 ppm as it enters the MMOB. In one embodiment, the wastewater stream includes a dissolved oxygen concentration of at least about 3 ppm as it enters the MMOB. In one embodiment, the wastewater stream includes a dissolved oxygen concentration of at least about 4 ppm as it enters the MMOB. In one embodiment, the wastewater stream includes a dissolved oxygen concentration of at least about 5 ppm as it enters the MMOB. In one embodiment, the wastewater stream has a dissolved oxygen concentration of at least about 6 ppm as it enters the MMOB. In one embodiment, the wastewater stream has a dissolved oxygen concentration of at least about 7 ppm as it enters the MMOB. In one embodiment, the wastewater stream has a dissolved oxygen concentration of at least about 8 ppm as it enters the MMOB. In one embodiment, the wastewater stream has a dissolved oxygen concentration of at least about 9 ppm as it enters the MMOB. In one embodiment, the wastewater stream has a dissolved oxygen concentration of at least about 10 ppm as it enters the MMOB. Dissolved oxygen levels may vary, in accordance with the instant disclosure.

In one embodiment, the wastewater stream includes a dissolved oxygen concentration of not greater than about 1 ppm as it enters the MMOB. In one embodiment, the wastewater stream includes a dissolved oxygen concentration of not greater than about 2 ppm as it enters the MMOB. In one embodiment, the wastewater stream includes a dissolved oxygen concentration of not greater than about 3 ppm as it enters the MMOB. In one embodiment, the wastewater stream includes a dissolved oxygen concentration of not greater than about 4 ppm as it enters the MMOB. In one embodiment, the wastewater stream includes a dissolved oxygen concentration of not greater than about 5 ppm as it enters the MMOB. In one embodiment, the wastewater stream has a dissolved oxygen concentration of not greater than about 6 ppm as it enters the MMOB. In one embodiment, the wastewater stream has a dissolved oxygen concentration of not greater than about 7 ppm as it enters the MMOB. In one embodiment, the wastewater stream has a dissolved oxygen concentration of not greater than about 8 ppm as it enters the MMOB. In one embodiment, the wastewater stream has a dissolved oxygen concentration of not greater than about 9 ppm as it enters the MMOB. In one embodiment, the wastewater stream has a dissolved oxygen concentration of not greater than about 10 ppm as it enters the MMOB. Dissolved oxygen levels may vary, in accordance with the instant disclosure.

In some embodiments, particle size of the MMOB impacts the surface area available to the wastewater stream as it passes through the MMOB. Thus, other parameters, including retention time, and processes and/or mechanisms that depend upon surface area interaction may also vary in accordance with average particle size (or mesh size) of the MMOB. In one embodiment, the MMOB has a particle size range from about 0.005 inch to about 2 inch in diameter (e.g. average particle size). In one embodiment, the MMOB has an average particle size of less than about 0.2 inches. In one embodiment the MMOB has an average particle size of less than about 0.5 inch. In one embodiment, the MMOB has an average particle size of greater than about 0.5 inch.

In one embodiment, the MMOB may include a layer having an average diameter ranging from about 0.05 to about 2 inches. In one embodiment, the average particle size does not exceed 2 inches. In one embodiment, the average particle size does not exceed 1.8 inches. In one embodiment, the average particle size does not exceed 1.5 inches. In one embodiment, the average particle size does not exceed 1.3 inches. In one embodiment, the average particle size does not exceed 1.1 inches. In one embodiment, the average particle size does not exceed 1.0 inches. In one embodiment, the average particle size does not exceed 0.8 inches. In one embodiment, the average particle size does not exceed 0.6 inches. In one embodiment, the average particle size does not exceed 0.4 inches. In one embodiment, the average particle size does not exceed 0.3 inches. In one embodiment, the average particle size does not exceed 0.2 inches. In one embodiment, the average particle size does not exceed 0.1 inches. In one embodiment, combinations of various sized particles may be used.

In one embodiment, the average particle size is not less than 2 inches. In one embodiment, the average particle size is not less than 1.8 inches. In one embodiment, the average particle size is not less than 1.5 inches. In one embodiment, the average particle size is not less than 1.3 inches. In one embodiment, the average particle size is not less than 1.1 inches. In one embodiment, the average particle size is not less than 1.0 inches. In one embodiment, the average particle size is not less than 0.8 inches. In one embodiment, the average particle size is not less than 0.6 inches. In one embodiment, the average particle size is not less than 0.4 inches. In one embodiment, the average particle size is not less than 0.3 inches. In one embodiment, the average particle size is not less than 0.2 inches. In one embodiment, the average particle size is not less than 0.1 inches.

In one embodiment, the MMOB includes a hydraulic conductivity of the wastewater stream through the MMOB of at most about 0.19 cm/s. Thus, the MMOB is able to accept a large amount of wastewater for treatment relative to the amount of time for the water to travel through a given distance of the MMOB. Hydraulic conductivity refers to the quantitative measure of a saturated material's ability to transmit water when subjected to a hydraulic gradient. The hydraulic gradient refers to the difference in total hydraulic head per unit distance. For example, hydraulic conductivity can be thought of as the ease with which pores of a saturated material permit water movement. In some embodiments, hydraulic conductivity is a function of the materials or the mixture of materials, and it relates to the permeability characteristics of the material. For example, the hydraulic conductivity relates to the particle size in the MMOB. Also, hydraulic conductivity is a function of velocity and pressure drop across the MMOB. For example, gravel or coarse sand will have a higher hydraulic conductivity than silt or clay. In some embodiments, the maximum hydraulic conductivity seen for alkaline clay is about 0.190 cm/see at 20° C.

In some embodiments, the hydraulic loading rate may vary for different contaminants being removed from the wastewater stream. Also, the hydraulic loading rate is a function of particle size in the MMOB. In one embodiment, the MMOB includes a hydraulic loading rate of the wastewater stream onto the MMOB of at most about 0.5 gal/min/ft$^2$. In other embodiments, the hydraulic loading rate may be: at most about 1.0 gal/min/ft$^2$, at most about 0.8 gal/min/ft$^2$, at most about 0.6 gal/min/ft$^2$, at most about 0.5 gal/min/ft$^2$, at most about 0.4 gal/min/ft$^2$, at most about 0.3 gal/min/ft$^2$, at most about 0.2 gal/min/ft$^2$, at most about 0.19 gal/min/ft$^2$, at most about 0.17 gal/min/ft$^2$, at most about 0.15 gal/min/ft$^2$, at most about 0.1 gal/min/ft², at most about 0.08 gal/min/ft², at most about 0.06 gal/min/ft², and at most about 0.05 gal/min/ft².

In one embodiment, the MMOB includes a hydraulic loading rate of the wastewater stream onto the MMOB of not less than about 0.5 gal/min/ft². In other embodiments, the hydraulic loading rate may be: not less than about 1.0 gal/min/ft², not less than about 0.8 gal/min/ft², not less than about 0.6 gal/min/ft², not less than about 0.5 gal/min/ft², not less than about 0.4 gal/min/ft², not less than about 0.3 gal/min/ft², not less than about 0.2 gal/min/ft², not less than about 0.19 gal/min/ft², not less than about 0.17 gal/min/ft², not less than about 0.15 gal/min/ft², not less than about 0.1 gal/min/ft², not less than about 0.08 gal/min/ft², not less than about 0.06 gal/min/ft², and not less than about 0.05 gal/min/ft².

In one embodiment, with a hydraulic loading rate of up to 1 gpm/ft², the fecal coliform removal is less than 50% from the MMOB. In one embodiment, a hydraulic loading rate between 0.1 to 0.15 gal/min/ft² will effect the removal of the fecal coliform removal is at least about 90%. In one embodiment, the 0.15 gal/min/ft² hydraulic loading rate corresponded to a residence time (or retention time) of about 100 minutes.

The hydraulic retention time refers to the amount of time the water spends moving through a depth of material. In one embodiment, the hydraulic retention time is about 4 hours or greater. In one embodiment, the retention time in the MMOB is not less than about 4 hours. In one embodiment, the retention time in the MMOB is not less than about 3.5 hours. In one embodiment, the retention time in the MMOB is not less than about 3 hours. In one embodiment, the retention time in the MMOB is not less than about 2.5 hours. In one embodiment, the retention time in the MMOB is not less than about 2 hours. In one embodiment, the retention time in the MMOB is not less than about 1.5 hours. In one embodiment, the retention time in the MMOB is not less than about 1 hour. In one embodiment, the retention time in the MMOB is not less than about 45 minutes. In one embodiment, the retention time of the MMOB is not less than about 30 minutes.

In one embodiment, the retention time in the MMOB is not greater than about 4 hours. In one embodiment, the retention time in the MMOB is not greater than about 3.5 hours. In one embodiment, the retention time in the MMOB is not greater than about 3 hours. In one embodiment, the retention time in the MMOB is not greater than about 2.5 hours. In one embodiment, the retention time in the MMOB is not greater than about 2 hours. In one embodiment, the retention time in the MMOB is not greater than about 1.5 hours. In one embodiment, the retention time in the MMOB is not greater than about 1 hour. In one embodiment, the retention time in the MMOB is not greater than about 45 minutes. In one embodiment, the retention time of the MMOB is not greater than about 30 minutes.

In one embodiment, the MMOB includes a hydraulic time of the wastewater stream in the MMOB of at least about 33 minutes. Thus, the MMOB is able to treat a large amount of wastewater and remove contaminants in a relatively small amount of time. It is believed that comparable wastewater treatment systems may require much longer time periods, up to several days, or more, to achieve similar results.

Field capacity may refer to how much moisture a particulate material can hold, or in-situ moisture content. In one embodiment, the MMOB has a field capacity of at least about 50% (e.g. a water holding capacity). In one embodiment, alkaline clay has a field capacity of at least about 54%. In one embodiment, the MMOB has a field capacity of at least about 60%. In one embodiment, the MMOB has a field capacity of at most about 50%. In one embodiment, alkaline clay has a field capacity of at most about 54%. In one embodiment, the MMOB has a field capacity of at most about 60%. It is believed that the MMOB having this field capacity may have an increased affinity for holding and treating the wastewater before the bed reaches a point of saturation and/or overflow.

In one embodiment, the pH is maintained in the range of from about 6 to about 9. In some embodiments, by maintaining the pH in this range, the effectiveness of the system is improved and/or increased. In one embodiment, the wastewater inlet stream has a pH within the range of from about 6 to about 9. In one embodiment, the wastewater inlet stream has a pH within the range of from about 6.5 to about 8.5. In one embodiment, the wastewater inlet stream has a pH within the range of from about 7 to about 8.

In one embodiment, the wastewater inlet stream has a pH of: not greater than about 4: not greater than about 5; not greater than about 6; not greater than about 7; not greater than about 8; not greater than about 9; not greater than about 10. In one embodiment, the wastewater inlet stream has a pH of: not less than about 4: not less than about 5; not less than about 6; not less than about 7; not less than about 8; not less than about 9; not less than about 10. In one embodiment, the wastewater outlet stream has a pH of: not greater than about 4: not greater than about 5; not greater than about 6; not greater than about 7; not greater than about 8; not greater than about 9; not greater than about 10. In one embodiment, the wastewater outlet stream has a pH of: not less than about 4: not less than about 5; not less than about 6; not less than about 7; not less than about 8; not less than about 9; not less than about 10.

In one embodiment, the MMOB includes a plurality of layers. With multiple layers, the characteristics of the MMOB may vary in each layer to modify the bed's additive effect/combination of characteristics in treating the wastewater stream. There may be 2, 3, 4, 5, 6, or more individual layers within the MMOB. In one embodiment, the first layer includes an average particulate size of less than about 0.5 inch while the second layer includes an average particulate size of greater than about 0.5 inch. By using different layers with different mesh sizes, the removal of contaminants may be optimized through the various mechanisms and processes of removal and/or disinfection, while the operating conditions remain optimized. As some non-limiting examples, the bed residence time or bed contact time may be reduced, the hydraulic loading rate may be increased, and a steady supply of dissolved oxygen may be directed into the MMOB via the wastewater stream, while contaminant removal is maintained. In one embodiment, a multi-layered MMOB may include different volume ratios. For example, the larger diameter particles (>0.5 inch) layer may comprise approximately 75% of the total depth of the MMOB, with the smaller diameter particle (<0.5 inch) layer being the top 25% of the MMOB.

In one aspect, the wastewater treatment system includes: a pretreatment system and a disinfection system (e.g. removes microorganisms). The pretreatment system may include, an aeration device for directing air into a wastewater stream. Thus, oxygen gas is dissolved into the wastewater stream. The disinfection system may include a vessel having a MMOB therein. The MMOB is saturated with the wastewater stream which includes a dissolved oxygen concentration of at least about 5 ppm. The MMOB includes a hydraulic loading rate of the wastewater stream onto the MMOB of at most about 0.5 gal/min/ft². The MMOB includes a hydraulic conductivity of the wastewater stream through the MMOB of at most about 0.19 cm/s. The MMOB includes a hydraulic residence time of the wastewater stream in the MMOB of at least about 33 minutes. The MMOB disinfects the wastewater stream to remove at least about 90% of a fecal coliform concentration from the wastewater stream.

In another aspect of the instant disclosure, the wastewater treatment system includes: a pretreatment system and a contaminant removal system (e.g. removes contaminants). The contaminant removal system may include a vessel having an MMOB therein. The MMOB may be saturated with the wastewater stream which includes a dissolved oxygen concentration of at least about 5 ppm. The MMOB includes a hydraulic loading rate of the wastewater stream onto the MMOB of at most about 0.5 gal/min/ft$^2$. The MMOB includes a hydraulic conductivity of the wastewater stream through the MMOB of at most about 0.19 cm/s. The MMOB includes a hydraulic residence time of the wastewater stream in the MMOB of at least about 33 minutes. The MMOB may remove at least about 10% of the PPCPs concentration of the wastewater stream.

In some embodiments, the MMOB is both a disinfection system and a contaminant removal system, since both microorganisms and contaminants are removed from wastewater as it passes through the MMOB.

In another aspect of the instant disclosure, methods of treating and/or polishing wastewater are provided. In one embodiment, the method includes: (a) dissolving oxygen into a wastewater stream; (b) flowing the wastewater stream into an MMOB; (c) removing at least some of the contaminants from the wastewater stream; and (d) discharging the cleaned water from the vessel. In some embodiments, dissolving oxygen into the wastewater means dissolving at least about 5 ppm oxygen into the wastewater stream. In some embodiments, as the aerated wastewater is fed onto the MMOB, the MMOB removes at least a portion of the contaminant from the wastewater stream. The wastewater stream may include different classes of contaminants, which may be referred to as the initial contaminant profile. In some embodiments, as a result of directing the aerated wastewater stream through the MMOB, the final contaminant concentration of the discharged cleaned water stream is less than the initial contaminant concentration.

In some embodiments, the contaminants may be in the wastewater stream (termed the "wastewater profile") at a predetermined level or concentration which may exceed legal limits of government, local municipalities, or state regulations. Also, the contaminants may include materials which are not subject to regulated levels in drinking water, but may cause unknown issues or health effects if consumed (e.g. endocrine disruptors). For example, microorganisms may include bacteria, viruses, and/or other microorganisms which may cause illness if consumed. Pathogens may include, for example, fecal conform, *E. coli*, fecal streptococcous, viruses, protozoa including *Giardia* and *Cryptosporidium*, and others.

In one embodiment, the MMOB removes at least about 50% of the microorganisms from the wastewater stream. In one embodiment, the MMOB removes at least about 60% of the microorganisms from the wastewater stream. In one embodiment, the MMOB removes at least about 70% of the microorganisms from the wastewater stream. In one embodiment, the MMOB removes at least about 75% of the microorganisms from the wastewater stream. In one embodiment, the MMOB removes at least about 80% of the microorganisms from the wastewater stream. In one embodiment, the MMOB removes at least about 90% of the microorganisms from the wastewater stream. In one embodiment, the MMOB removes at least about 95% of the microorganisms from the wastewater stream. In one embodiment, the MMOB removes at least about 98% of the microorganisms from the wastewater stream. In one embodiment, the MMOB removes at least about 99% of the microorganisms from the wastewater stream.

In one embodiment, the MMOB removes not greater than about 50% of the microorganisms from the wastewater stream. In one embodiment, the MMOB removes not greater than about 60% of the microorganisms from the wastewater stream. In one embodiment, the MMOB removes not greater than about 70% of the microorganisms from the wastewater stream. In one embodiment, the MMOB removes not greater than about 75% of the microorganisms from the wastewater stream. In one embodiment, the MMOB removes not greater than about 80% of the microorganisms from the wastewater stream. In one embodiment, the MMOB removes not greater than about 90% of the microorganisms from the wastewater stream. In one embodiment, the MMOB removes not greater than about 95% of the microorganisms from the wastewater stream. In one embodiment, the MMOB removes not greater than about 98% of the microorganisms from the wastewater stream. In one embodiment, the MMOB removes not greater than about 99% of the microorganisms from the wastewater stream.

In one embodiment, the PPCPs which may be termed "contaminants" in accordance with the instant disclosure may include those materials which are reported as absorbed or metabolized by multi-celled organisms (including mammals, or humans), materials of regulatory interest, and/or materials which are not sufficiently removed by conventional wastewater treatment means. The types of pharmaceuticals which may be reduced from a wastewater stream may include one or more examples from various categories and/or classes of medications. The types of medications may be broken down into their area of operation in the body, including, for example: the gastrointestinal tract (digestive system); the cardiovascular system; the central nervous system; general pain & consciousness (analgesic drugs); musculo-skeletal disorders; the eye; the ears, nose and oropharynx; the respiratory system; the endocrine system (problems and related issues); the reproductive system or urinary system; contraception; obstetrics and gynecology; the skin; infections and infestations; the immune system; allergic disorders; nutrition; neoplastic disorders; diagnostics, and the like. Pharmaceuticals and personal care products may include prescription medications, supplements, including but not limited to: antibiotics, antidepressants, antihyperlipidemics, analgesics, antidiruetics, antibacterials, antifungals, cholesterol drugs, neutraceuticals, supplements, and combinations thereof. A pharmaceutical drug, also referred to as medicine, medication or medicament, can be loosely defined as any chemical substance intended for use in the medical diagnosis, cure, treatment, or prevention of disease. The pharmaceuticals which may be part of the wastewater stream may be in a soluble salt form, a bioactive form, a partially metabolized form, an intermediate form, and combinations thereof.

In one embodiment, the MMOB removes at least about 10% of the PPCP concentration of the wastewater stream. In one embodiment, the MMOB removes at least about 20% of the PPCP concentration of the wastewater stream. In one embodiment, the MMOB removes at least about 30% of the PPCP concentration of the wastewater stream. In one embodiment, the MMOB removes at least about 40% of the PPCP concentration of the wastewater stream. In one embodiment, the MMOB removes at least about 50% of the PPCP concentration of the wastewater stream. In one embodiment, the MMOB removes at least about 60% of the PPCP concentration of the wastewater stream. In one embodiment, the MMOB removes at least about 70% of the PPCP concentration of the wastewater stream. In one embodiment, the MMOB removes at least about 80% of the PPCP concentration of the wastewater stream. In one embodiment, the MMOB removes at least about 90% of the PPCP concentration of the wastewater stream. In one embodiment, the MMOB removes at least about 95% of the PPCP concentration of the wastewater stream. In one embodiment, the MMOB removes at least about 98% of the PPCP concentration of the wastewater stream.

In one embodiment, the MMOB removes not greater than about 10% of the PPCP concentration of the wastewater stream. In one embodiment, the MMOB removes not greater than about 20% of the PPCP concentration of the wastewater stream. In one embodiment, the MMOB removes not greater than about 30% of the PPCP concentration of the wastewater stream. In one embodiment, the MMOB removes not greater than about 40% of the PPCP concentration of the wastewater stream. In one embodiment, the MMOB removes not greater than about 50% of the PPCP concentration of the wastewater stream. In one embodiment, the MMOB removes not greater than about 60% of the PPCP concentration of the wastewater stream. In one embodiment, the MMOB removes not greater than about 70% of the PPCP concentration of the wastewater stream. In one embodiment, the MMOB removes not greater than about 80% of the PPCP concentration of the wastewater stream. In one embodiment, the MMOB removes not greater than about 90% of the PPCP concentration of the wastewater stream. In one embodiment, the MMOB removes not greater than about 95% of the PPCP concentration of the wastewater stream. In one embodiment, the MMOB removes not greater than about 98% of the PPCP concentration of the wastewater stream.

Various ones of the inventive aspects noted hereinabove may be combined to yield wastewater treatment and/or polishing systems and methods which can remove regulated and/or unregulated contaminants from a wastewater stream. These and other aspects, advantages, and novel features of the disclosure are set forth in part in the description that follows and will become apparent to those skilled in the art upon examination of the following description and figures, or may be learned by practicing the disclosure.

BRIEF DESCRIPTION OF THE DRAWINGS

FIG. 6 depicts that the decrease in dissolved oxygen appears to correlate with an increase in fecal coliform.

FIG. 24A is over a period of 112 days. FIGS. 24B, 24C, and 24D are over a period of 80 days.

FIG. 26 depicts experimental data of the hydraulic conductivity of alkaline clay under various pre-processing conditions.

DETAILED DESCRIPTION

The systems and methods of the instant disclosure are directed to wastewater treatment. More particularly, the present disclosure provides systems and methods of effectively treating a wastewater stream to disinfect the water and remove other contaminants from the water. Removal of contaminants, other than microorganisms, may include the removal of ammonia, phosphorus, metals, pharmaceuticals and personal care products.

Pharmaceuticals and personal care products are likely to be regulated in drinking water and wastewater treatment system discharges in the near future in one or more countries, due to the effects already seen in fish, and thus, possible effects in humans. Existing technologies are either ineffective at removing the host of the compounds to adequate levels (chlorine) or are costly and impractical to implement (reverse osmosis). Disinfection of wastewater has been regulated for decades, but increasing concerns of human health effects from disinfection byproducts produced from conventional technologies (chlorine), indicate a need for a more environmentally friendly disinfection technology.

Figure 1A:
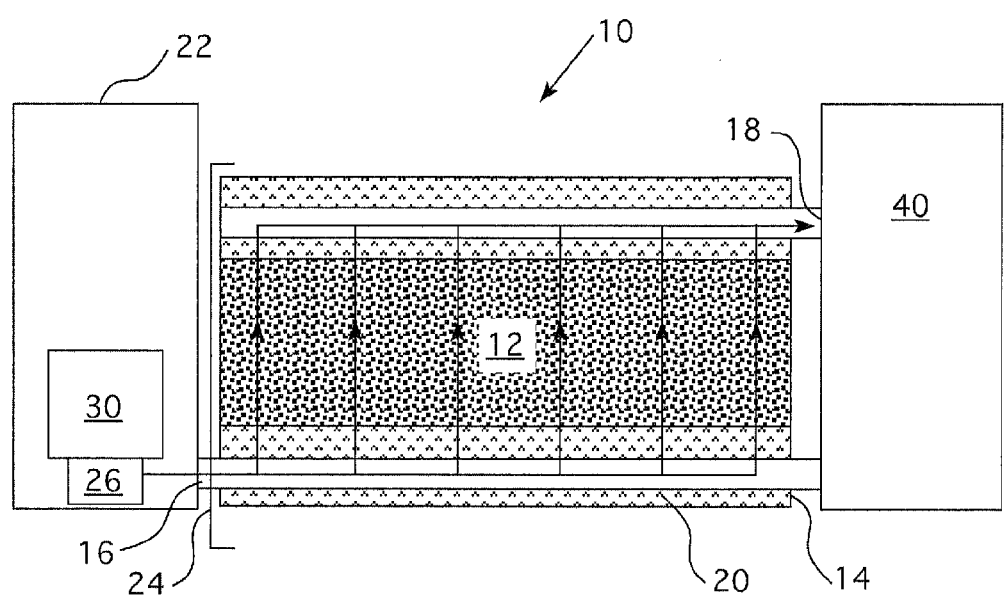
FIG. 1A depicts an embodiment of a wastewater treatment system in accordance with the instant disclosure, with multiple inlets and outlets into and out of the MMOB.
Figure 1B:
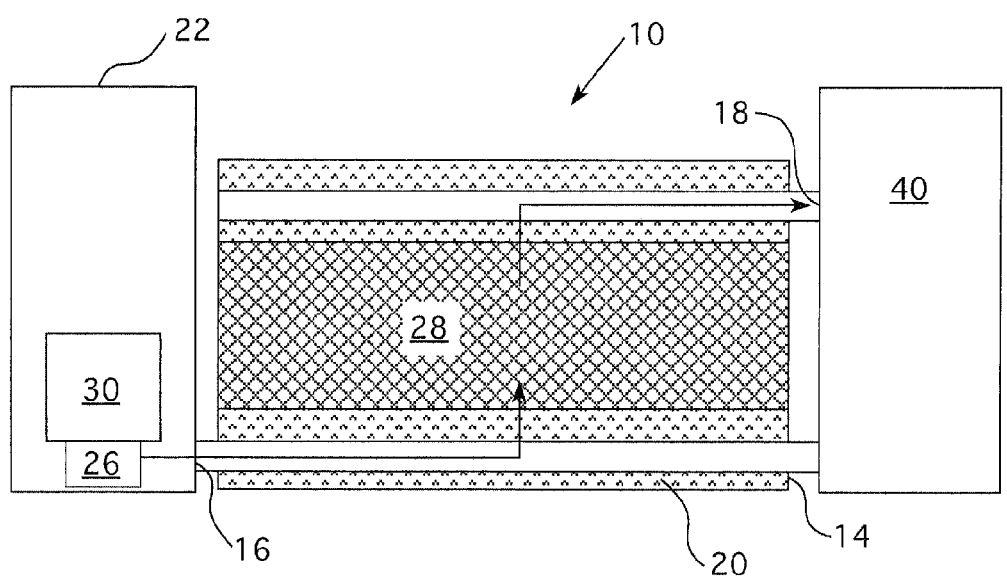
FIG. 1B depicts an embodiment of a wastewater treatment system in accordance with the instant disclosure, with a single inlet and outlet into the MMOB.
Figure 1C:
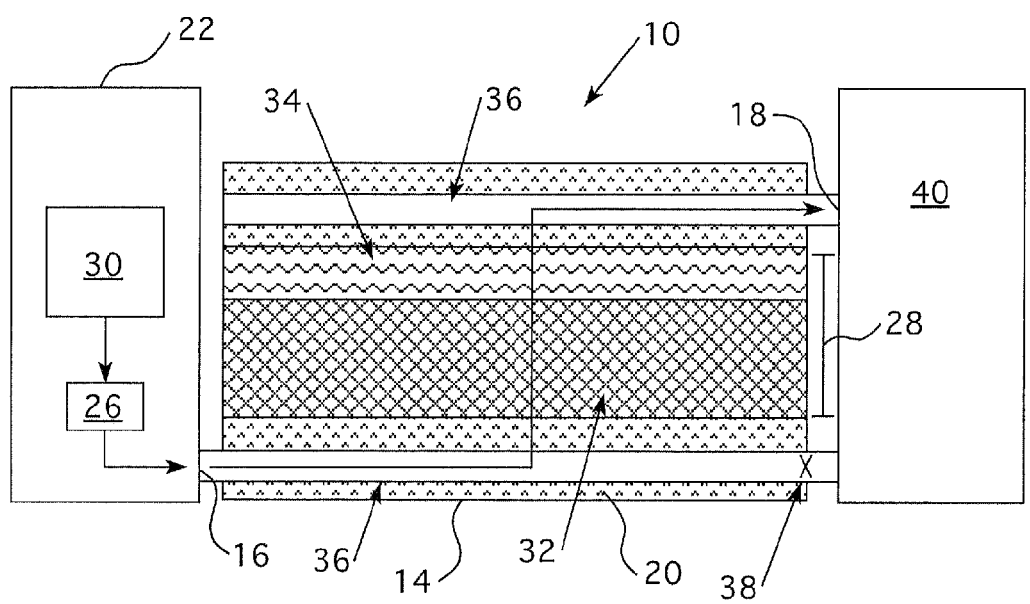
FIG. 1C depicts an embodiment of a wastewater treatment system in accordance with the instant disclosure.

Reference will now be made in detail to the accompanying drawings, which at least assist in illustrating various pertinent embodiments of the instant disclosure. Referring to FIG. 1A-1C, embodiments of a system 10 for wastewater treatment is depicted. In some embodiments, the system 10 includes a pretreatment system 22 and a disinfection system 24 having a mixed metal oxide bed (MMOB) 12. In some embodiments, the MMOB may be held within a vessel 14, which is at least partially enclosed to retain the MMOB 12 therein. In some embodiments, the vessel 14 includes an inlet 16 and an outlet 18, which direct wastewater 30 into the MMOB 12 of the vessel 14 and out of the vessel 14, respectively. In some embodiments, the inlet 16 and outlet 18 may communicate with the vessel 14 and/or MMOB 12 by piping 36. In one embodiment, the vessel and associated piping may have bypass valve 38. Optionally, the cleaned wastewater may exit the system to be kept in a tank or holding vessel 40.

In some embodiments, the pretreatment system 22 may include an aeration device 26. In some embodiments, the aeration device is located at the inlet 16 of the MMOB. In some embodiments, the aeration is located at one or more points in the MMOB, at various locations. In some embodiments, wastewater is aerated with an aeration device 26 prior to entry into the MMOB. In some embodiments, wastewater is aerated as it enters the MMOB 12, as in FIG. 1A, where the aeration device inputs air into conduit by inlet 16, such that water (e.g. aerated water) and/or air are introduced into the MMOB. In some embodiments, the aeration device 26 aerates the wastewater 30 in order to impart dissolved oxygen into the wastewater stream. In one embodiment, the aeration device 26 may include at least one blower attached to the wastewater stream inlet 16. In one embodiment, the aeration device 26 may include a gas permeation membrane which facilitates the gas dissolution into the wastewater stream 30. Thus, the aeration device 26 aerates the wastewater stream 30 as it is fed via the inflow piping 16 into the MMOB 12. In one embodiment, the aeration device 12 may direct air into the wastewater 30, while the wastewater 30 is in the MMOB 12 within the vessel 14.

In some embodiments, the pretreatment system 22 incorporates (e.g. dissolves) at least about 5 ppm of dissolved oxygen (DO) into the wastewater stream 30. In some embodiments, the dissolved oxygen may vary in accordance with the instant disclosure, provided that a threshold amount of dissolved oxygen is incorporated into the wastewater stream 30 to assist the wastewater treatment system 10 to remove one or more contaminants from a wastewater stream 30.

In some embodiments, the wastewater stream 30 may enter the wastewater disinfection system 24 via the inlet 16 into the MMOB 12. In certain embodiments, the wastewater may be gravity fed or reverse gravity fed through the MMOB. In some embodiments, a MMOB 12 is depicted within the vessel 14 (e.g. FIG. 1A). In one embodiment, the MMOB is alkaline clay 28. In one embodiment, the alkaline clay includes naturally zeolites. In one embodiment, alkaline clay is used with silicon oxide, bauxiteone and/or red mud. Referring to FIG. 1B, a MMOB 12 having one layer of alkaline clay 28 is depicted.

In one embodiment, the MMOB 12 may include a plurality of beds of alkaline clay. In this embodiment, each layer of alkaline clay 28 within the MMOB 12 may be defined by a specific average range (or mesh) of particle size, or other measurable characteristics, including, for example, the relative ratio of various metal oxides in the alkaline clay.

Referring to FIG. 1C, in other embodiments the MMOB 12 includes two distinct layers of alkaline clay having different average particle sizes (or range or particle sizes). For example, the first bed 32 includes a smaller average diameter, while the second bed 34 includes a larger average diameter so that the wastewater stream 30 is directed through the MMOB 12 reverse gravity fed through the MMOB 12, the wastewater stream 30 may first travel through the smaller diameter alkaline clay, then travel through the larger diameter alkaline clay.

In one embodiment, a natural media may be employed with the MMOB in order to maintain bed integrity and protect the bed from the environment, and vice versa. Examples of natural media may include, for example, aggregate, including rock and or stones. In one embodiment, the MMOB may be admixed with one or more additional materials in order to increase the effectiveness and flow of the system. In one embodiment, the MMOB may be a 50/50 weight ratio with a filler material 20 (e.g. aggregate and/or gravel). In one embodiment, the MMOB may be a 50/50 weight ratio with a filler material 20 (e.g. aggregate and/or gravel). In one embodiment, the MMOB may be a 60/40 weight ratio with a filler material 20 (e.g. aggregate and/or gravel). In one embodiment, the MMOB may be a 70/30 weight ratio with a filler material 20 (e.g. aggregate and/or gravel). In one embodiment, the MMOB may be a 80/20 weight ratio with a filler material 20 (e.g. aggregate and/or gravel). In one embodiment, the MMOB may be a 90/10 weight ratio with a filler material 20 (e.g. aggregate and/or gravel). In one embodiment, the MMOB may be a 95/5 weight ratio with a filler material 20 (e.g. aggregate and/or gravel). In some embodiments, the MMOB consists essentially of alkaline clay. In some embodiments, the MMOB includes alkaline clay, with a cover of aggregate and/or gravel over the top of the bed.

In one embodiment, the MMOB may be in-ground. In one embodiment, the MMOB may be above ground. In one embodiment, the MMOB may be a combination of partly above ground and partly in ground.

In some embodiments, as the wastewater stream 30 travels through the MMOB 12, the contaminants and/or waste suspended and/or dissolved in the wastewater stream 30 are at least partially removed by the MMOB. In some embodiments, after the wastewater stream 30 travels through the MMOB, the wastewater 30 exits the MMOB 12 through the outlet 16.

Figure 3:
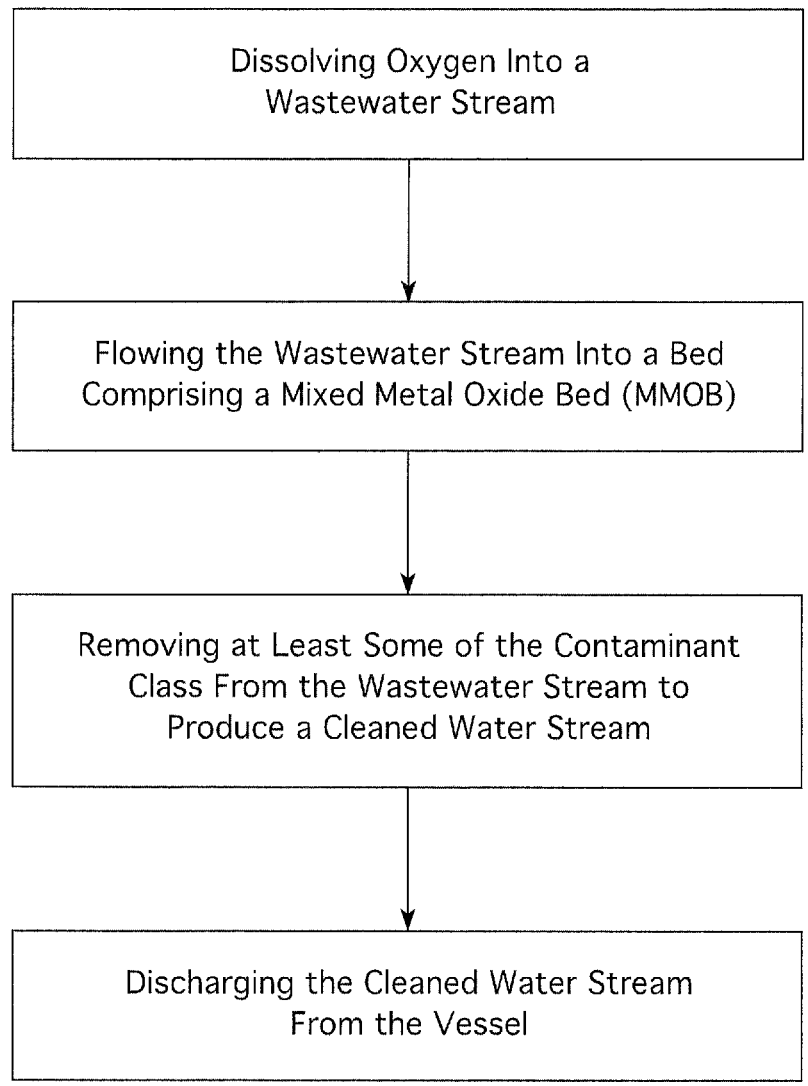
FIG. 3 depicts a flow chart of an exemplary method of treating wastewater in accordance with the instant disclosure.

In another aspect of the instant disclosure, a method of treating wastewater is provided. Referring to FIG. 3, the method may include the following steps: dissolving oxygen into a wastewater stream; flowing the wastewater stream into a bed comprising a mixed metal oxide bed; removing at least some of the contaminant class from the wastewater stream to produce a cleaned water stream; and discharging the cleaned water stream from the vessel.

In some embodiments, the dissolving step includes aerating the wastewater stream with air, including oxygen, as previously discussed. In some embodiments, the flowing step includes directing the wastewater stream over an MMOB, where the wastewater travels through the MMOB to the outlet from the vessel. In some embodiments, the removing step includes removing at least a concentration of the contaminants from the wastewater stream. As examples, the removing step may include disinfection, sterilization, adsorption, absorption, filtration, chemical degradation/breakdown, and or entrainment of contaminants. Aeration through dissolving oxygen into the wastewater stream was discussed previously.

In one embodiment, the method further includes the step of maintaining the pH of the wastewater stream within the range of from about 6 to about 9. In one embodiment, the method further comprises the step of maintaining the level of dissolved oxygen to at least about 5 ppm. In additional embodiments, one or more parameters previously discussed may be maintained within certain ranges or values during wastewater treatment. In one embodiment, the method may include the step of regenerating the MMOB.

Figure 20:
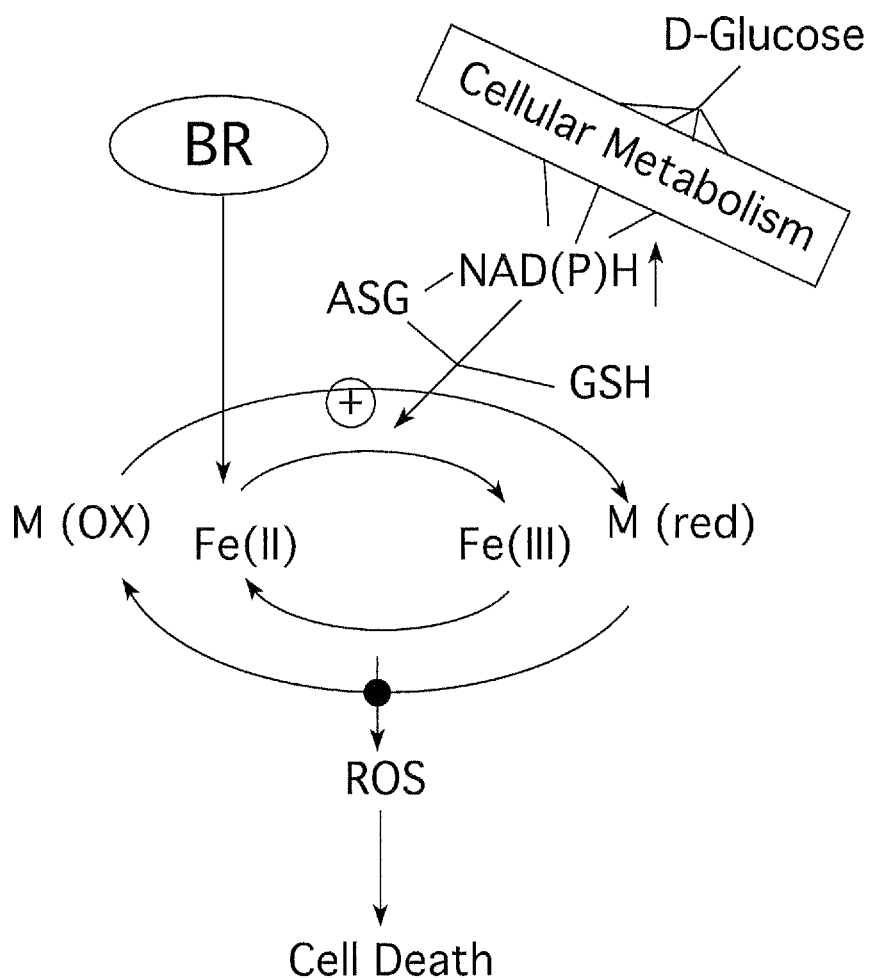
FIG. 20 depicts an example of the proposed mechanism of the reactive oxygen species in the MMOB.
Figure 21:
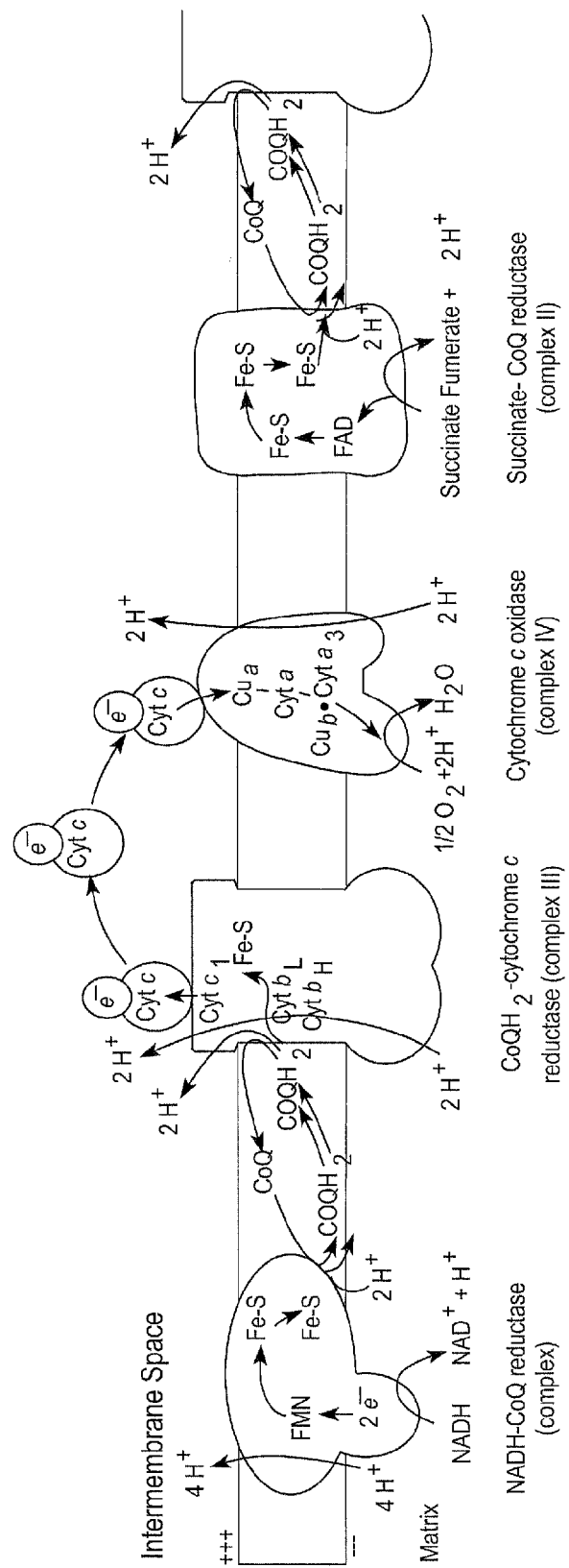
FIG. 21 depicts an example of an overview of multi-protein complexes, bound prosthetic groups, and associated mobile carriers in the respiratory chain.
Figure 22:
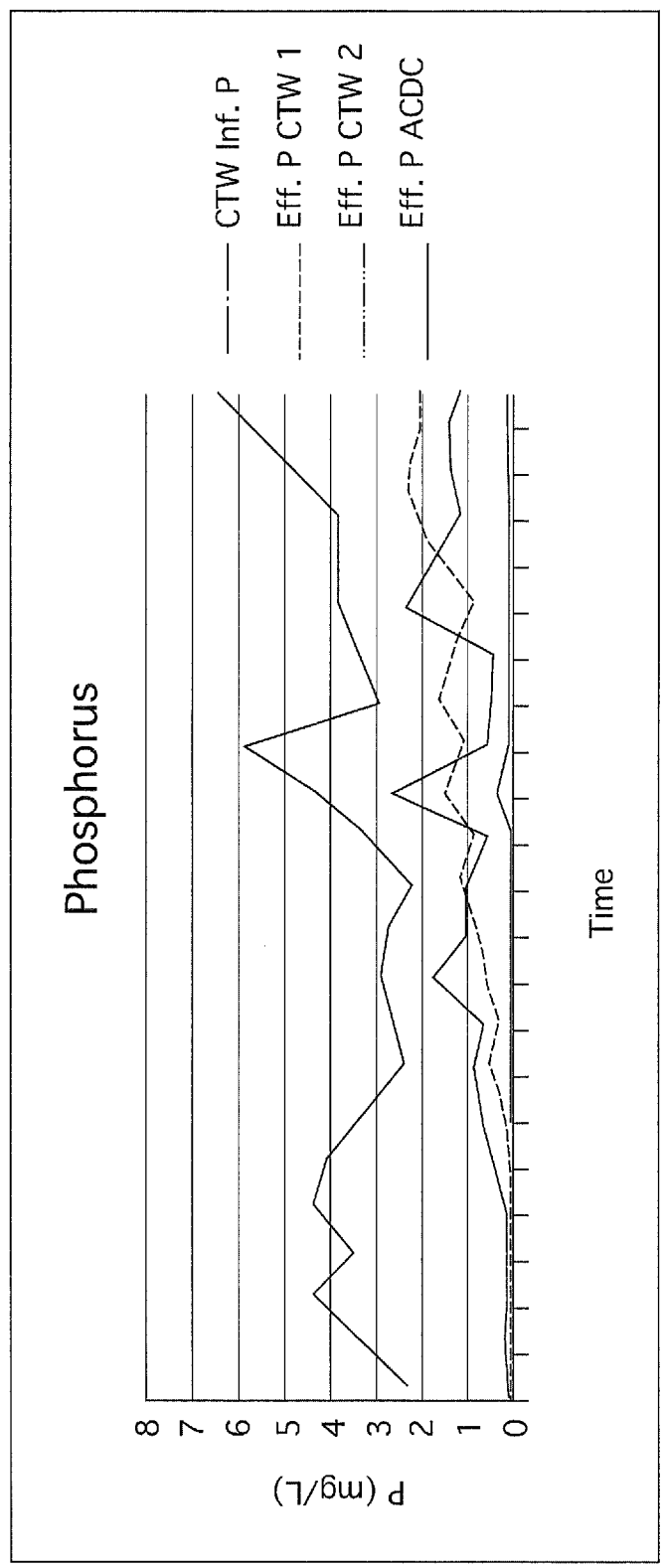
FIG. 22 depicts experimental data of phosphorous removal obtained from the Engineered National System of the Example section during a 122 day period.

In some embodiments, the MMOB, including alkaline clay and/or bauxite ore removes pollutants through mechanisms including, for example, filtration, predation, adsorption, absorption, nitrification, oxidation, chemical degradation, and free radical reduction. In one embodiment, reactive oxygen species may be formed when dissolved oxygen reacts with metal oxides inherent to the alkaline clay and bauxite ore. Without being tied to one particular mechanism or process, one possible explanation for the disinfection properties of alkaline clay may be attributed to the formation of in-situ reactive oxygen species (or radicals) in presence of metal ions present in alkaline clay (especially iron oxide). FIG. 20 shows one proposed mechanism for disinfection property of the MMOB by generation of reactive oxygen species. Ferrous iron has been known to react with oxygen in presence of a reducing environment resulting in formation of harmful superoxide and hydroxyl radicals which affected all the macromolecules (DNA, lipids and proteins) thereby leading to cell death. The MMOB results in formation of superoxide molecules which affect the cellular metabolism by inhibiting the electron transport chain (FIG. 21), essential for generation of energy and reducing power in the bacterial cell, thereby leading to cell death.

EXAMPLES

Figure 4:
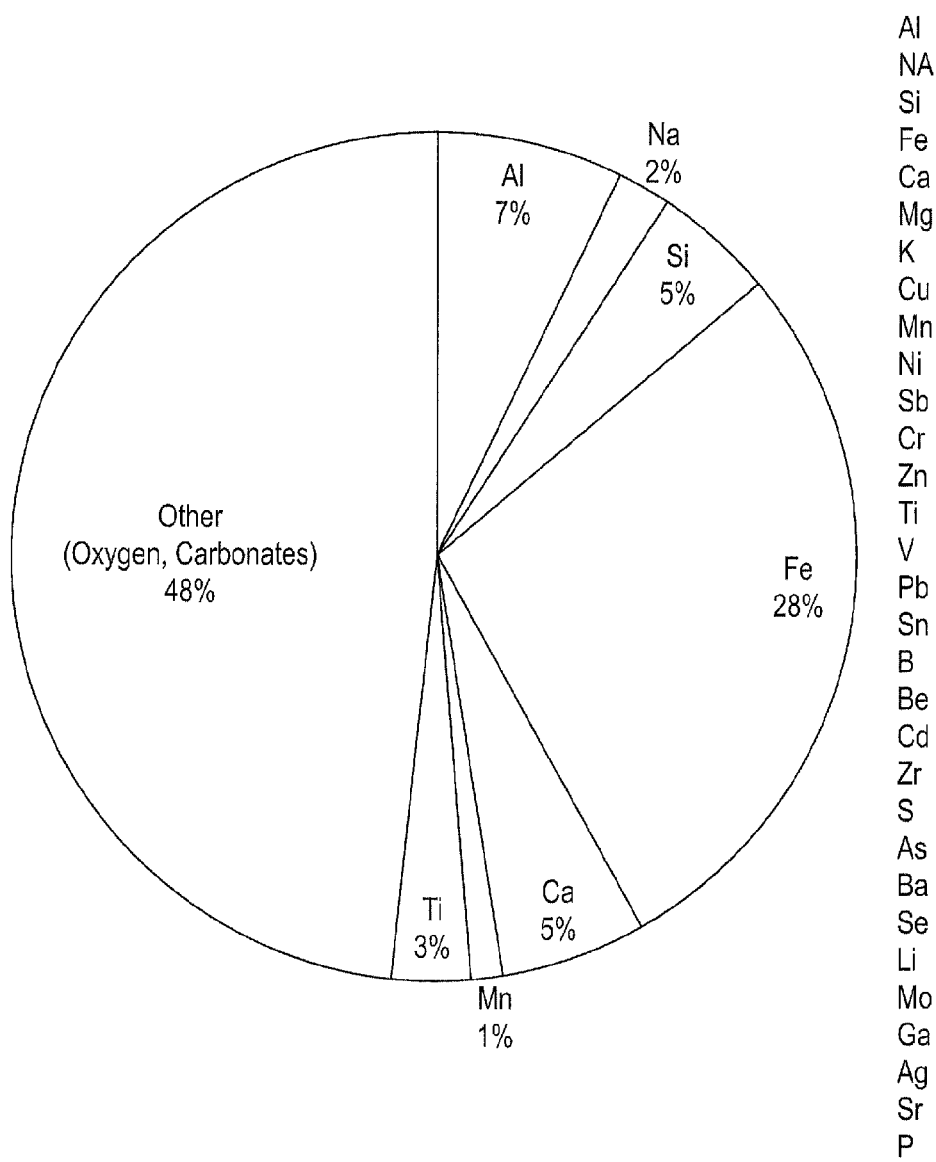
FIG. 4 depicts the elemental make up of a sample of MMOB installed in the wastewater treatment system of the Example section, categorized by weight percent.

Table 1, Table 2, Table 3, and FIG. 4 depict the main metal oxides in alkaline clay are iron, aluminum, silica, calcium, and titanium. Also of note is the high carbonate value, which may distinguish alkaline clay from bauxite residue that has not been weathered. Table 1 shows the components of a sample of Jamaican alkaline clay according to dried solids, slurry, and pore water. FIG. 4 shows the elemental makeup of a sample of alkaline clay that was installed in the full scale ENS disinfection cell in the Examples Section. Table 3 shows the particular oxides that comprise various samples of alkaline clay from two locations.

TABLE 1

Constituents of initial Jamaican alkaline clay and pore water.

| Component | Dried solids concentration[a] (mg/kg solid) | Slurry concentration[b] (g/L pore water) | Slurry[b] (M) | Pore Water[c] (M) | % in Solid |
|---|---|---|---|---|---|
| Chloride | 470 | 0.31 | 0.009 | 0.012 | ~0 |
| Sulfate | 430 | 0.29 | 0.003 | 0.004 | ~0 |
| Carbonate | 4,000[d] | 3.1[d] | 0.55 | 0.12 | 78 |
| Al | 113,000 | 76 | 2.8 | 0.098 | 97 |
| Na | 54,000 | 36 | 1.56 | 0.93 | 58 |
| Si | 26,000 | 18 | 0.63 | 1.4E−03 | 100 |
| Fe | 237,000 | 160 | 2.8 | <1.8E−05 | 100 |
| Ca | 48,000 | 32 | 0.80 | 7E−04 | 100 |
| Mg | 1,200 | 0.8 | 0.033 | <4.2E−06 | 100 |
| Cu | 200 | 0.13 | 0.002 | <1.7E−06 | 100 |
| Mn | 3,800 | 3.9 | 0.071 | <1.8E−06 | 100 |
| Ni | 600 | 0.38 | 0.006 | <1.7E−06 | 100 |

Referring to Table 2 and FIG. 4, additional example constituent compositions of alkaline clay for use in an MMOB are depicted. FIG. 4 depicts the elemental make-up of one embodiment of the MMOB, categorized by weight percent. The MMOB depicted in FIG. 4 is from an embodiment provided in the examples section, in which the MMOB is alkaline clay. The individual elemental composition is provided in the following table, Table 2.

TABLE 2

Composition of MMOB of FIG. 4

| Element | Wt. % |
|---|---|
| Al | 7.3 |
| Na | 2.1 |
| Si | 4.5 |
| Fe | 28 |
| Ca | 5.4 |
| Mg | 0.17 |
| K | 0.17 |
| Cu | 0.02 |
| Mn | 0.79 |
| Ni | 0.06 |
| Sb | 0.05 |

TABLE 2-continued

Composition of MMOB of FIG. 4

| Element | Wt. % |
|---|---|
| Cr | 0.1 |
| Zn | 0.04 |
| Ti | 3.1 |
| V | 0.08 |
| Pb | 0.05 |
| Sn | 0.05 |
| B | 0.00 |
| Be | 0.01 |
| Cd | 0.01 |
| Zr | 0.12 |
| S | 0.00 |
| As | 0.02 |
| Ba | 0.02 |
| Se | 0.02 |
| Li | 0.00 |
| Mo | 0.02 |
| Ga | 0.15 |
| Ag | 0.01 |
| Sr | 0.05 |
| P | 0.00 |

TABLE 3

Major compounds in alkaline clay as determined by X-ray Diffraction (XRD) analysis, different samples.

| Sample Desc. | Fe2O3 | CaCO3 | SiO2 | AlO(OH) | TiO2 | Sodium Na8(AlSiO4)6(CO3) or 3NaAlSi4•Na2CO3 | AlPO4 | CaAl4O7 or Ca3Al2O6 | Al(OH)3 |
|---|---|---|---|---|---|---|---|---|---|
| Ark. I | Major | Major | Major | Minor | Minor | Minor | trace | trace possible | |
| Ark. II | Major | Major | Major | Minor | Very Small | Minor | trace | trace possible | |
| Ark. III | Major | Minor | Major | Minor | Very Small | | Very Small | | |
| Ark. V1 | Major | Major | Major | Minor | Minor | Minor | trace | trace possible | |
| Ark. V2 | Major | Major | Major | Minor | Minor | Minor | trace | trace possible | |
| Ark. V3 | Major | Major | Major | Minor | Minor | Minor | trace | trace possible | |
| Ark. V4 | Major | Major | Major | Minor | Minor | Minor | trace | trace possible | |
| Ark. V5 | Major | Major | Major | Minor | Minor | Minor | trace | trace possible | |
| Ark. V6 | Major | Major | Major | Minor | Minor | Minor | trace | trace possible | |
| PCO | Major | Major | Minor | Minor | Minor | Minor | trace | trace possible | Major |

Referring to Table 3, the x-ray diffraction results are reported based on the most intense diffraction peak, and is assigned 100%. "Major" refers to those compounds which have >10% relative intensities. "Minor" refers to those compounds which are >5% but <10% relative intensities. "Very small" refers to those compounds which are between 3-5% relative intensities. "Trace" refers to those compounds which are <3% relative intensities. In one embodiment, the MMOB has a particle size sufficiently large to remain stationary in the vessel 14 as the wastewater stream 30 travels through it.

TABLE 4

| Sieve Size | mm | % retained per sieve | Cumulative % pass |
|---|---|---|---|
| No. 4, 0.187 inch | 4.76 | 3.68 | 96.32 |
| No. 6 | 3.36 | 7.65 | 88.67 |
| No. 8 | 2.38 | 10.12 | 78.55 |
| No. 10 | 2 | | |
| No. 12 | 1.68 | 11.68 | 66.87 |
| No. 14 | 1.41 | | |
| No. 16 | 1.19 | 12.92 | 53.95 |
| No. 18 | 1 | 5.24 | 48.71 |
| No. 20 | 0.84 | | |
| No. 25 | 0.71 | | |
| No. 30 | 0.59 | 16.28 | 32.43 |
| No. 35 | 0.5 | | |
| No. 40 | 0.42 | | |
| No. 50, 0.0117 inch | 0.3 | 13.23 | 19.2 |
| No. 60 | 0.25 | | |
| No. 80 | 0.177 | 6.73 | 12.47 |
| No. 100, 0.0059 inch | 0.149 | 3.08 | 9.39 |
| No. 140, 0.0041 inch | 0.105 | | |
| No. 200, 0.0029 inch | 0.074 | | |
| Pan | | 9.39 | |
| | | 100 | | shows the particle size distribution typical of alkaline clay, as sieve analysis results of alkaline clay sample.

Referring to Table 4, the majority of the particles are less than about 0.2 inch. In some embodiments, when the particles stick together to form large clumps or chunks, the clumps or chunks may be broken apart and/or removed from the MMOB. In one embodiment, the alkaline clay is dried (<20% moisture content wet basis) prior to screening. In one embodiment, an MMOB may contain more than 100 tons of alkaline clay.

Table 5 summarizes the pH of various alkaline clay samples which may be employed as an MMOB in accordance with the instant disclosure. The table illustrates that in various embodiments, the pH of alkaline clay typically ranges from approximately 6-10. For example, the alkaline clay used in the MMOB of the Examples section was from Bed 4 at 0-18" depth, which corresponds to an initial pH of 9.4. In some embodiments, the pH of the influent to the alkaline clay disinfection cell may generally be between approximately 6 and 8.

TABLE 5 pH of various alkaline clay samples.

| Sample | pH |
|---|---|
| Bed 4: 0" to 18" | 9.4 |
| Bed 4: 18" to 36" | 9.5 |
| Bed 5: 0" to 12" | 7.2 |
| Bed 11: 0" to 12" | 8.9 |
| Bed 16: 0" to 12" | 8.5 |
| Bed 21: 0" to 12" | 6.4 |

Example: Engineered Natural System

The following Examples and experimental data were obtained with a wastewater treatment system in accordance with the instant disclosure, though termed herein the Engineered Natural System. The Engineered Natural System (ENS), its set up, operation, and results are discussed in the following Examples section, and may be generally referenced through FIG. 2, as well as the experimental data depicted in FIGS. 5-19 and 22-25.

Example Preparation of Alkaline Clay Bed

In this section, an example experimental detailing the preparation of the MMOB is provided. In order to prepare the MMOB, raw alkaline clay was filtered for particle size. The alkaline clay was dried to remove residual moisture, screened to exclude certain particle sizes, and was placed in a containment cell with larger diameter particles on the bottom and smaller diameter particles on the top. The screening meshed the particles to two sizes: greater than 0.5 inches and less than 0.5 inches. Chunks of alkaline clay which exceeded a 2 inch diameter were broken up or discarded. Particle size generally ranged from about 0.005 inch to about 2 inch diameter. The majority of particles in the system have an average diameter of less than about 0.2 inch.

The MMOB was constructed into a pit, with its walls and bottom covered with a barrier to enclose and retain the alkaline clay and wastewater stream therein. Two layers of alkaline clay were deposited into the bed. The lower layer included smaller sized particles, while the second layer (upper layer) included larger sized particles. Once the appropriate depth of alkaline clay was reached, aggregate in the form of large rocks was deposited onto the alkaline clay bed.

Overview of Wastewater Treatment System

A full-scale embodiment of a wastewater treatment system was constructed to treat 100% of the sanitary wastewater of a facility. The wastewater treatment system, or Engineered Natural System (ENS), included: (1) three septic tanks in series, (2) a pretreatment system which included two parallel horizontal subsurface flow constructed treatment wetland (CTW also referred to as "DEW") cells, and (3) an MMOB which included a vertical up-flow alkaline clay disinfection cell (ACDC also referred to as "BRITE CELL").

At the design flow of approximately 45,000 gallons/day, the ENS has a total hydraulic retention time (HRT) of approximately five days. The actual average flow rate for the study period was 22,500 gallons/day. Two days through the septic tanks, three days through the pretreatment system, and four hours through the MMOB. Generally, wastewater left the industrial site and traveled to the septic system. From the septic system, the wastewater traveled into piping which directed the wastewater into the pretreatment systems (CTWs). The air blowers of the CTW aerated the wastewater stream prior to its exit from the CTWs. After the wastewater exited the CTW, it was fed into the MMOB. The MMOB included an alkaline clay bed, which may be referred to as an alkaline clay disinfection cell (ACDC).

Figure 27:
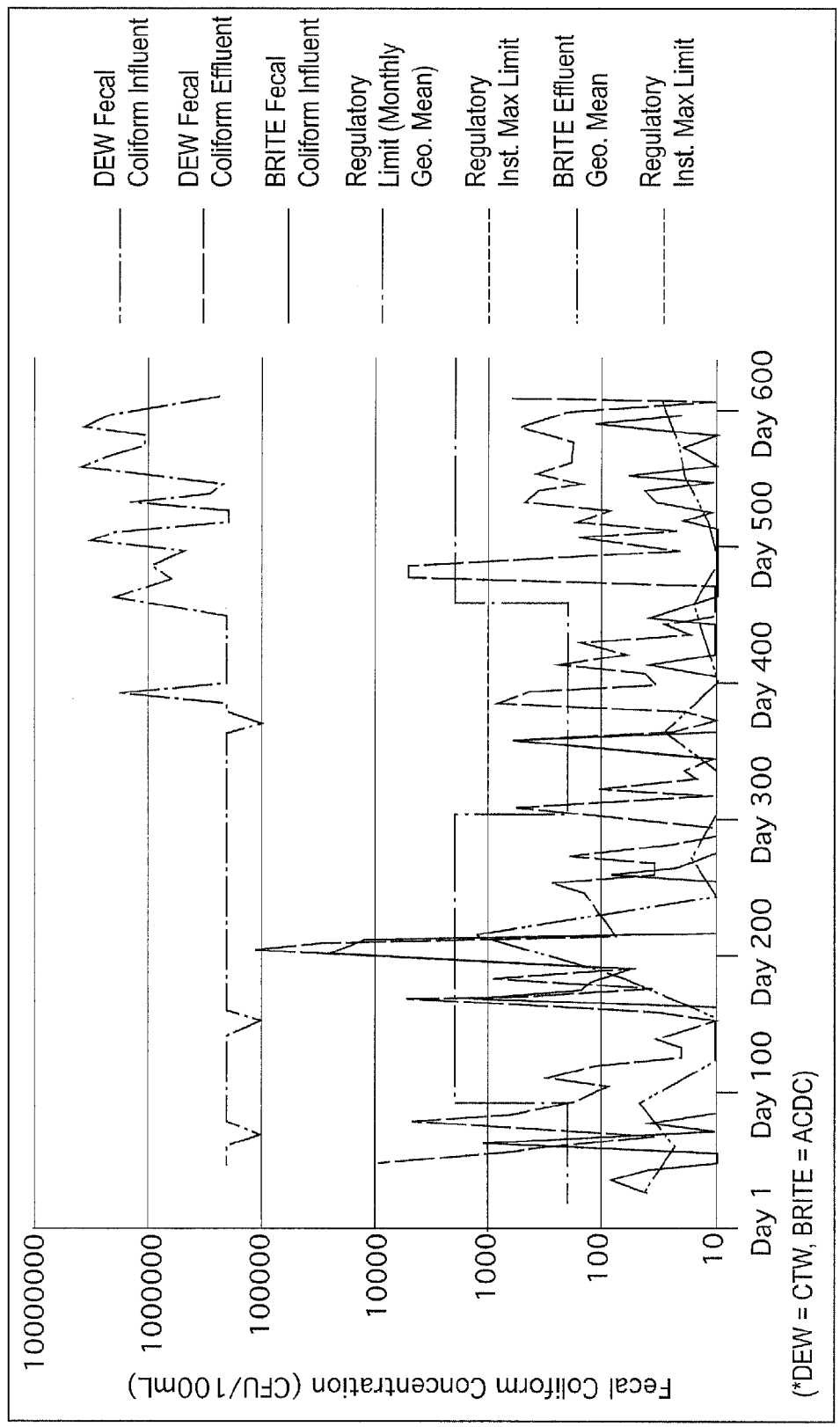
FIG. 27 depicts experimental data of the fecal coliform concentration (measured as CFU/100 mL) as a function of time (in days) for a period of 600 days across the wastewater treatment system.

FIG. 27 depicts the fecal coliform concentration across the wastewater treatment system for a duration of 600 days, including the influent into the wetlands system, the effluent from the wetlands system (same as the influent to the MMOB) and the effluent from the MMOB, and the mean values of the effluent from the MMOB. For illustration purposes, the regulatory values were also plotted.

Pretreatment System

In the wastewater treatment system, the pretreatment step included a wetland system (e.g. cat tails) in gravel, with aeration pipes providing air to the wastewater. The wetland system was two side-by-side cells, where the wastewater exiting the wetlands joined together prior to entering into the MMOB.

Disinfection/Contaminant Removal System:

The wastewater stream is then directed into the MMOB via piping. The aerated wastewater enters the bottom of the MMOB, which was an alkaline clay disinfection cell (ACDC) and flows in the up-flow mode through the alkaline clay (and/or bauxite ore). The hydraulic retention time was approximately 4 hours, or greater. The wastewater included ammonia, phosphate, pathogens, and organic compounds (e.g. PPCPs) present in the wastewater (i.e. as the contaminant profile). The alkaline clay MMOB removed pathogens (e.g. fecal coliform and *E. coli*, viruses, protozoa including *Giardia* and *Cryptosporidium*), organic compounds (e.g. PPCPs), ammonia, and phosphate from the wastewater.

For this experiment, wastewater quality data that was used in the design phase of the wastewater treatment are provided, where the data was obtained from raw influent samples. The samples were used to determine the wastewater contaminant profile and to gauge the initial conditions that would need to be handled by the wastewater treatment system. Another raw influent quality profile was taken at a later date, and was shown to be similar, although not identical to the previous sampling.

TABLE 6

Average initial conditions for the sanitary wastewater

| Parameter | Concentration |
| --- | --- |
| 5-day Biochemical oxygen demand (BOD) | 139 mg/L |
| Total suspended solids (TSS) | 464 mg/L |
| Dissolved oxygen (DO) | 0 mg/L |
| Ammonia (NH3—N) | 60 mg/L |

Contaminant Screening Methods:

BOD, CBOD, metals and fecal coliforms were analyzed off-site by a state certified lab (Microbac Laboratories, Inc.), see Table 7 for methods. Ammonia was measured as ammonia-nitrogen ($NH_3$—N), but referred to simply as ammonia. Orthophosphate ($PO_4$) was tested, but it is referred to only to phosphorus (P) concentration (which was found by dividing the orthophosphate concentration by 3). Ammonia, orthophosphate, and nitrate were all tested at the wastewater treatment system. Dissolved oxygen and pH were tested using a pH probe and a DO meter; also TSS, temperature, COD, and flow rates were measured.

TABLE 7

Parameter Analysis Methods

| Parameter | Analysis Method |
| --- | --- |
| BOD, CBOD | Method SM 5210-B |
| Metals | Method EPA 200.7 |
| Fecal coliforms | Method SM20 9222D |
| Nitrate (NO3) Hach NitraVer 5 (Cadmium Reduction) | Method 8039 |
| Ammonia Hach Salicylate | Method 8155 |
| Orthophosphate (PO4) Hach PhosVer 3 (Ascorbic Acid) | Method 8048 |

Samples were collected each week day from the hydraulic control structures (HCS) of the wastewater treatment system. Data presented in the graphs references HCS 1 which is a hydraulic control structure (e.g. access point to the wastewater) after the septic tanks and prior to the CTW cells. HCS 1 is used as the sampling point to measure CTW influents. Interior samples of the CTW cells were taken along the centerline in each of four zones (where Zone 1 is closest to the influent end and Zone 4 closest to the effluent end) through the cleanout pipes built into the CTW cells. For Zones 1 and 4, additional samples were taken across the width of the cell as well.

Phosphorus (P) content/quantity was used in determining water quality due to its role as a limiting nutrient for plant growth. Similarly the phosphorus reduction by the ACDC cell was initially high, but decreased slightly with time.

Referring to FIGS. 24A-24D, the aluminum, calcium, potassium and zinc levels are depicted. The ACDC uses alkaline clay as the media, which contains high concentration of iron and aluminum oxides. Water samples were taken before and after the ACDC cell to understand the removal or addition of metals by the MMOB (e.g. alkaline clay). The ACDC cell was shown to remove manganese, as well as potassium, barium and zinc, but not iron. It was shown to add small amounts of vanadium, calcium and aluminum to the water. The measured cobalt and nickel were below detection for nearly all influents and effluents.

Figure 23:
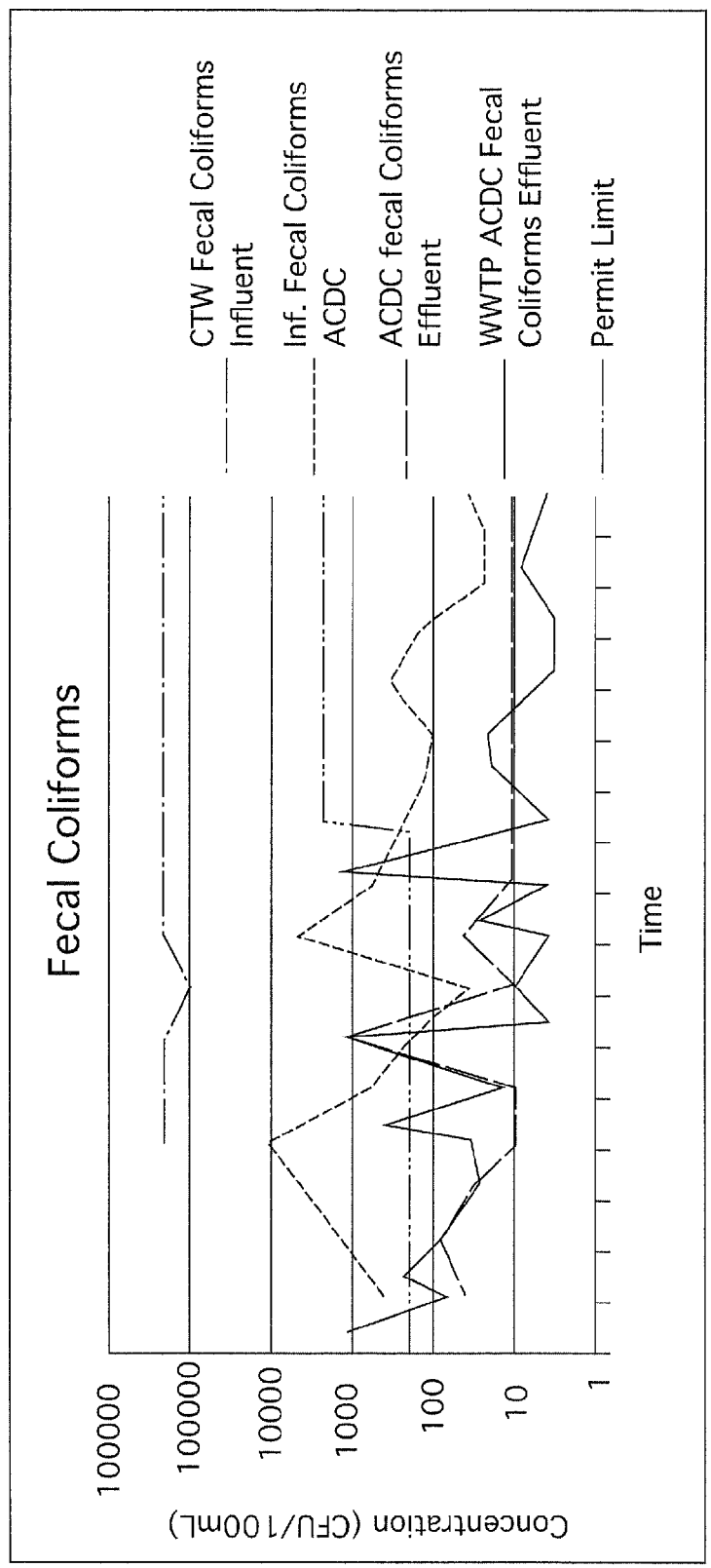
FIG. 23 depicts experimental data of fecal coliforms removal with the Engineered Natural System obtained over a 112 day period.
Figure 24B:
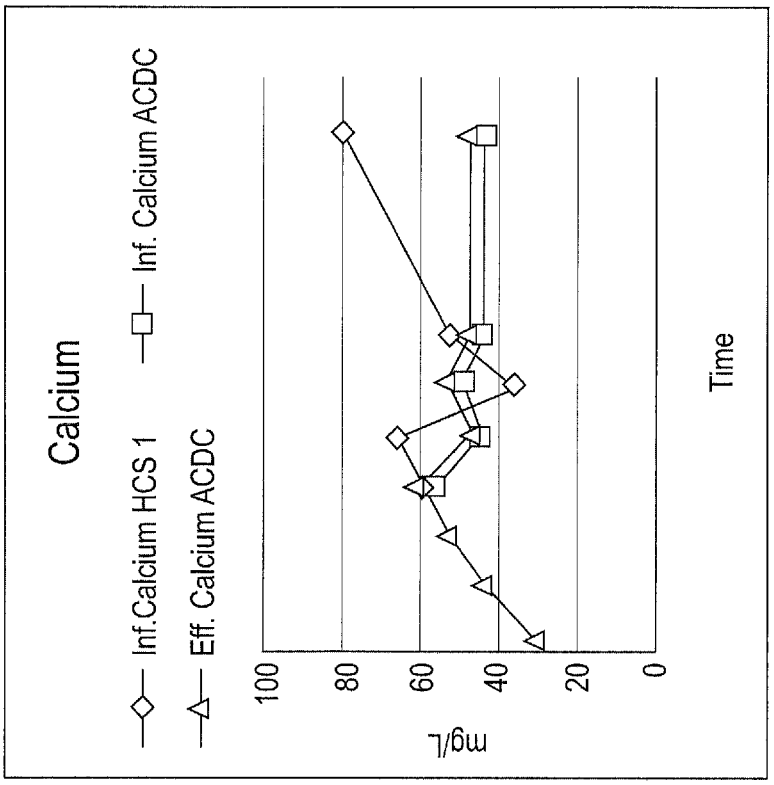
FIG. 24A-24D depicts experimental data of the removal data of metals, including Aluminum, Calcium, Potassium, and Zinc, respectively obtained over time.
Figure 24A:
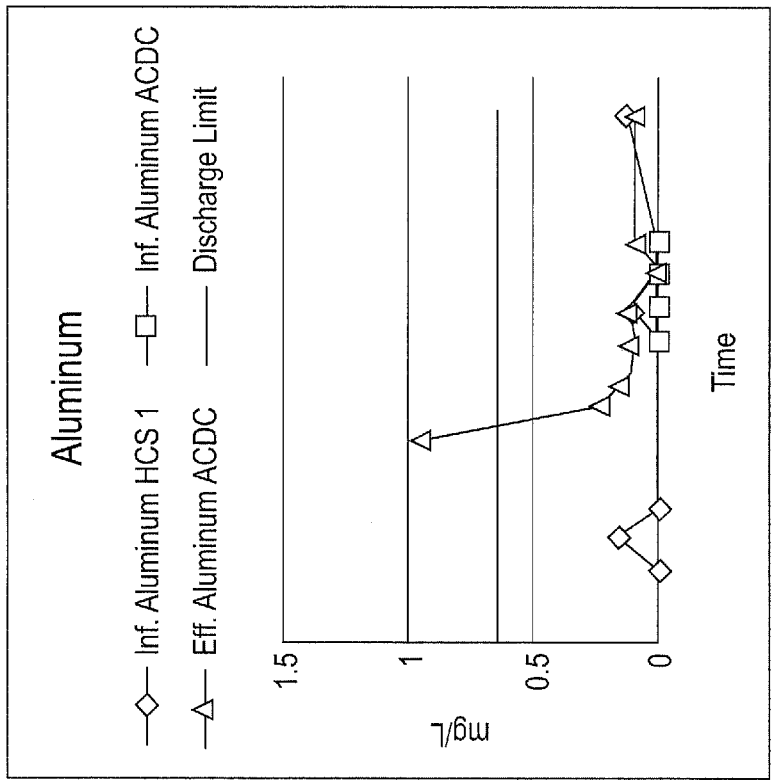
Figure 24D:
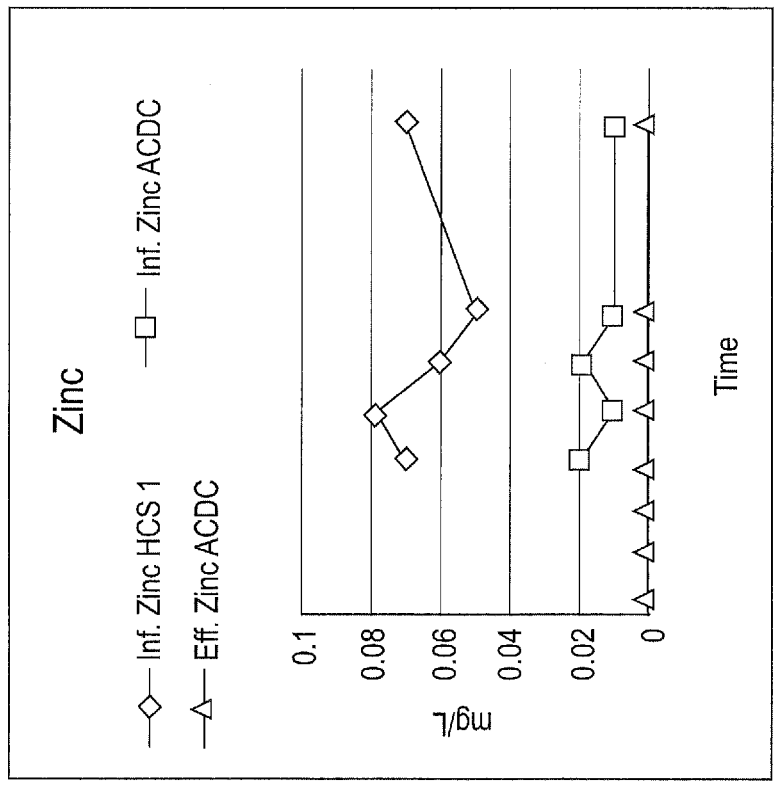
Figure 24C:
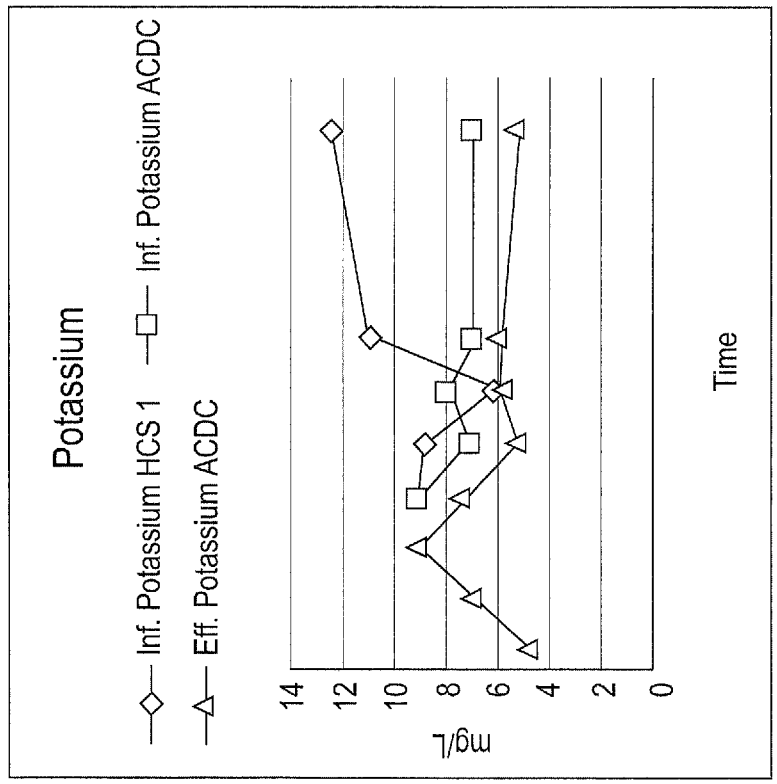

Referring to FIG. 23, the ACDC cell exhibited a fecal coliforms removal rate of greater than 92% on average. Actual fecal coliform removal through the ENS pretreatment and MMOB was as high as 99.99%. Analysis of the ENS over five months showed it performed well and allowed the treatment of sanitary wastewater to below municipal permit operation limits during both warm and cold weather.

Fecal coliform was at about 1450 CFU/100 mL at the exit of the CTW system, and this was brought down to below the detection limit of 10 CFU/100 mL at the exit of the MMOB. For Fecal Coliform analysis, samples were collected directly from the sanitary wastewater treatment system into sterilized 100 ml HDPE bottles containing one thiosulfate pill and analyzed for fecal coliform according to Standard Method 9222D. Samples are sent to the lab and analyzed within 6 hrs.

Figure 25:
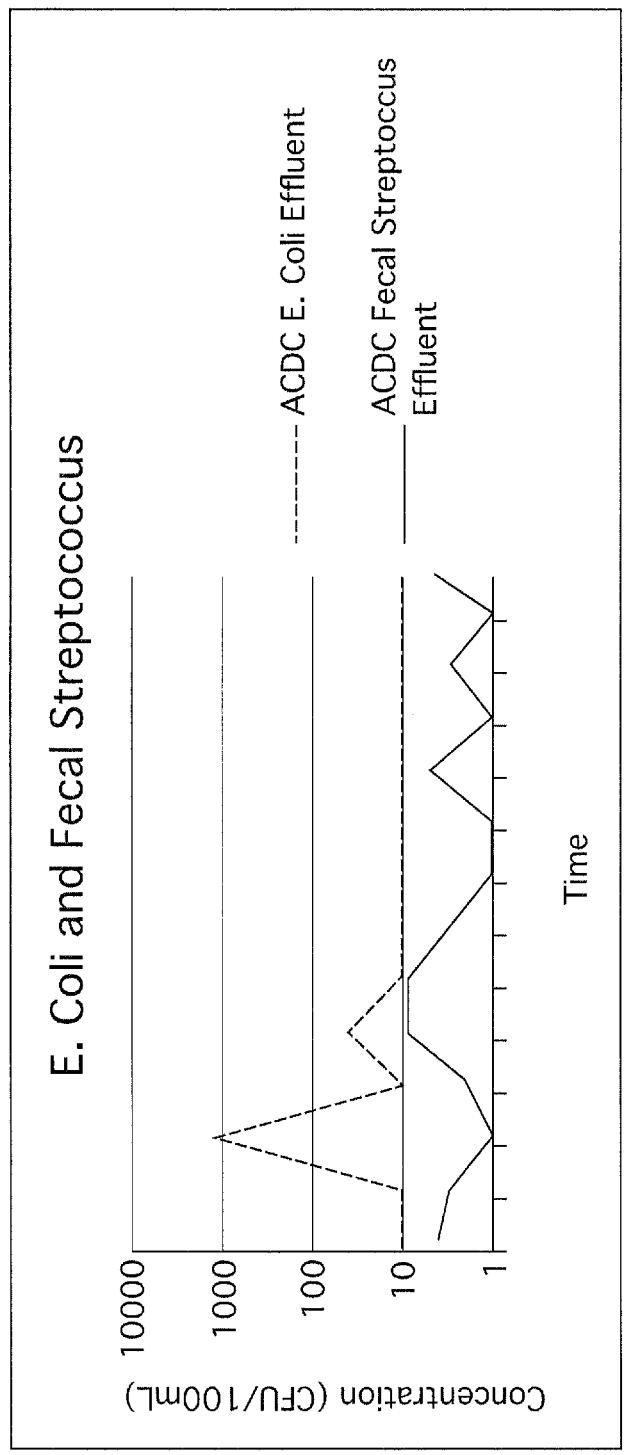
FIG. 25 depicts experimental data of the removal of E. coli and fecal streptococcus data obtained from the Natural Engineered System over an 80 day period.

*Escherichia coli* (*E. coli*) and fecal streptococcus were also monitored in the ACDC effluent as further indication of fecal pollution, as depicted in FIG. 25. These indicator bacteria correlated with fecal coliforms count. The *E. coli* detection limit was 10 CFU/100 mL and the detection limit for fecal streptococcus was 1 CFU/100 mL. Test results that were less than the detection limit were graphed as being at the limit, thus *E. coli* of <10 CFU/100 mL shows up on the graph as 10 CFU/100 mL.

Figure 5:
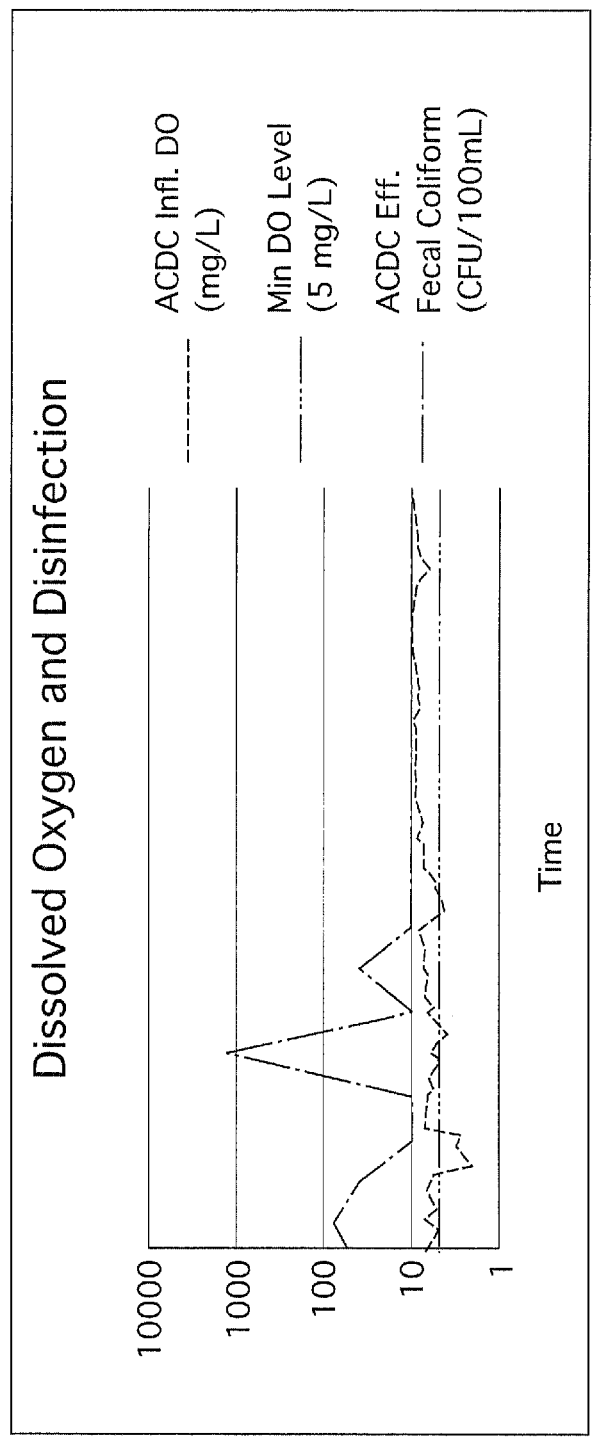
FIG. 5 is a chart depicting the relationship between dissolved oxygen (DO) of the ACDC influent and fecal coliform of ACDC effluent as a function of time. The x-axis spans a period of 120 days. The graph depicts that when the DO falls below 5 mg/L, the fecal coliform increases. The delay between the DO and fecal coliform correlation may be due to the time the water takes to travel through the wastewater treatment system (e.g. retention time).

FIG. 5 illustrates when the dissolved oxygen in the influent to the MMOB falls below 5 mg/L, such as on the fecal coliform count in the MMOB effluent increases. The lag in time between the drop in DO and the increase in fecal coliform may be due to the time water takes to travel through the ACDC. When the DO of the influent remains above 5 mg/L, the ACDC recovers, disinfecting the water to provide an effluent fecal coliform count below 200 cfu/100 mL.

Figure 6:
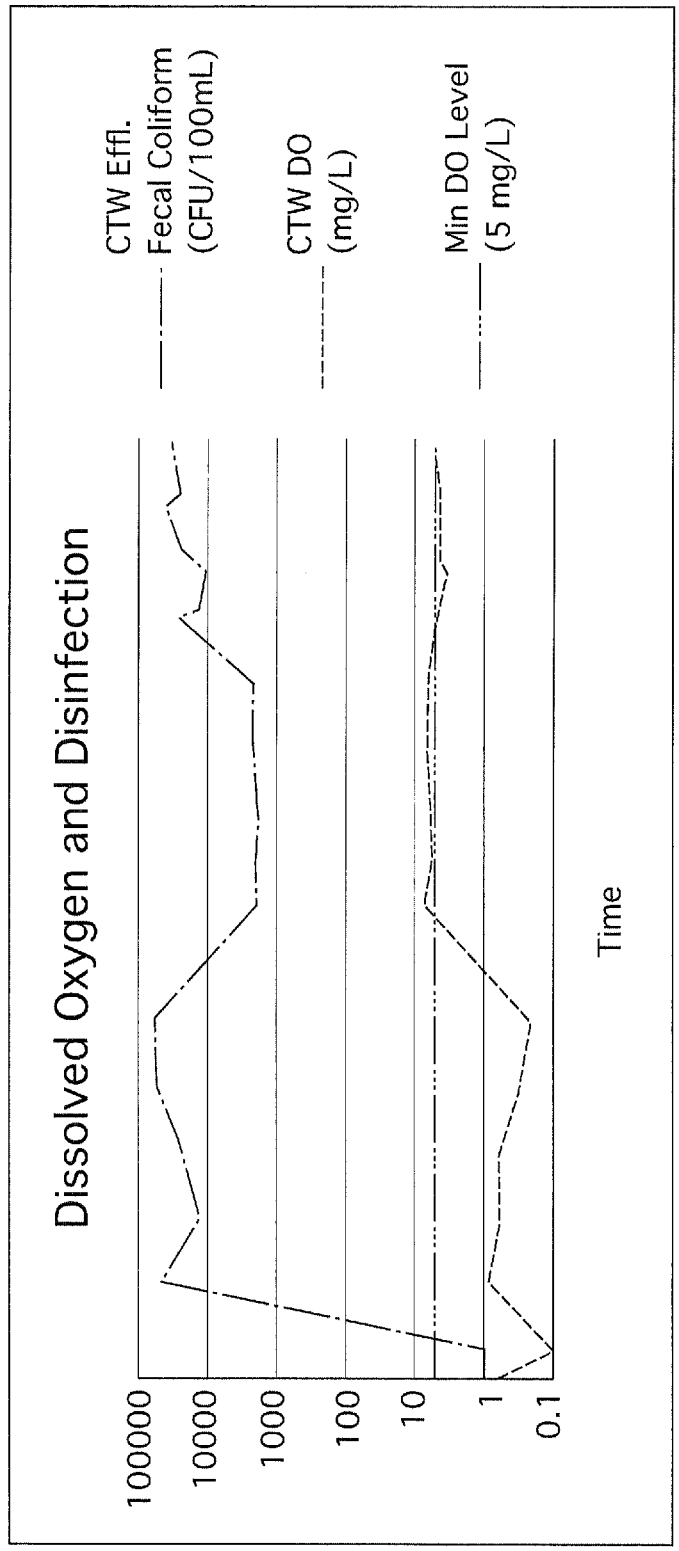
FIG. 6 is a chart depicting the relationship between dissolved oxygen (DO) of Constructed Treatment Wetland (CTW) and fecal coliform counts as a function of time. The x-axis spans a period of 100 days.
Figure 7:
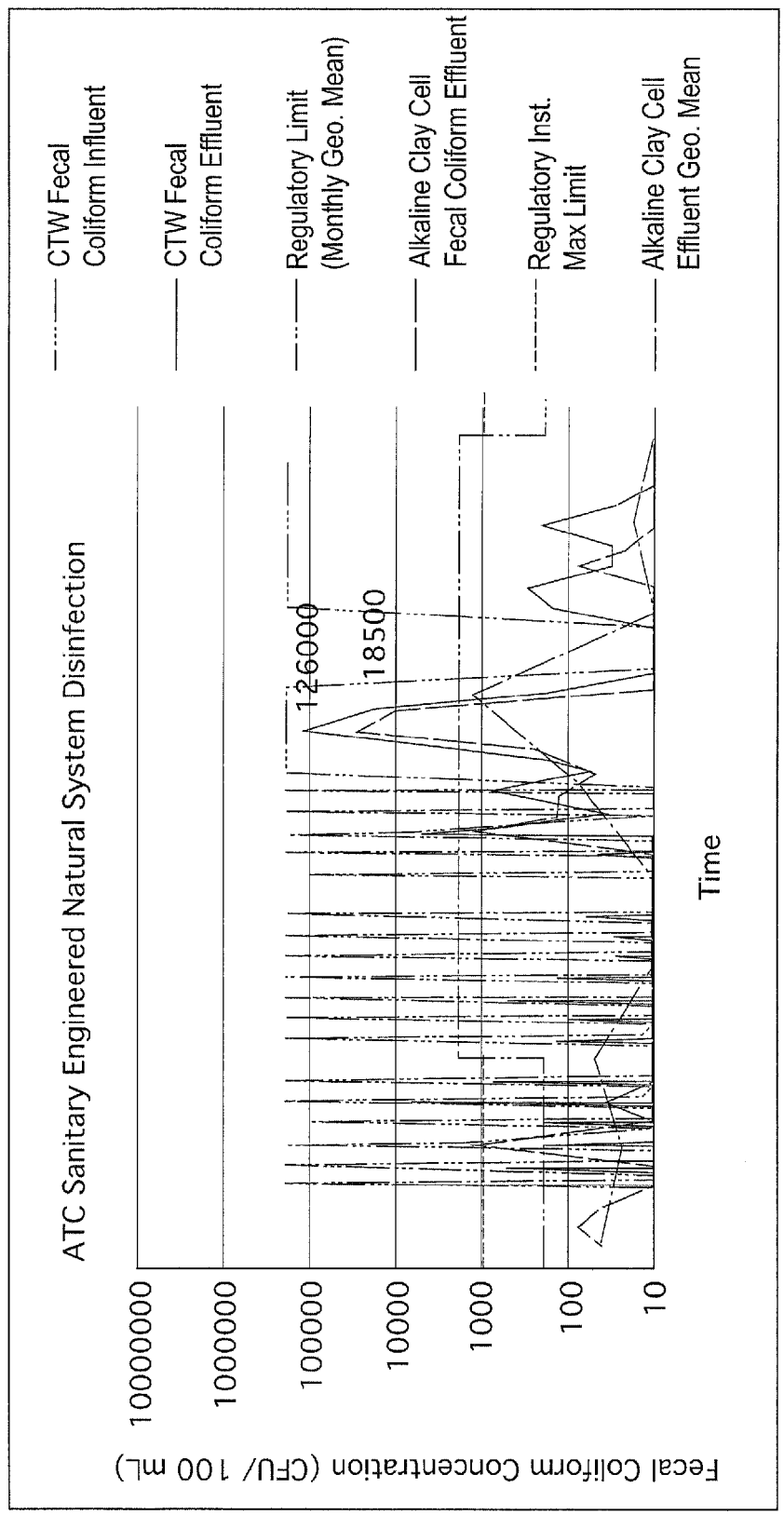
FIG. 7 is a chart of experimental results (i.e. both the CTW and MMOB, an alkaline clay cell) depicting the removal of fecal coliform through the Engineered Natural System, over time, to meet regulatory compliance standards. The x-axis (time) spans a period of 250 days. The highest level of fecal coliform entering the ACDC was 126,000 cfu/100 mL, which corresponded to an effluent value of 18,500 cfu/100 mL. These values correspond to a reduction of approximately 85%. The design hydraulic loading rate of the system of this example is 0.024 gpm/sf.
Figure 8:
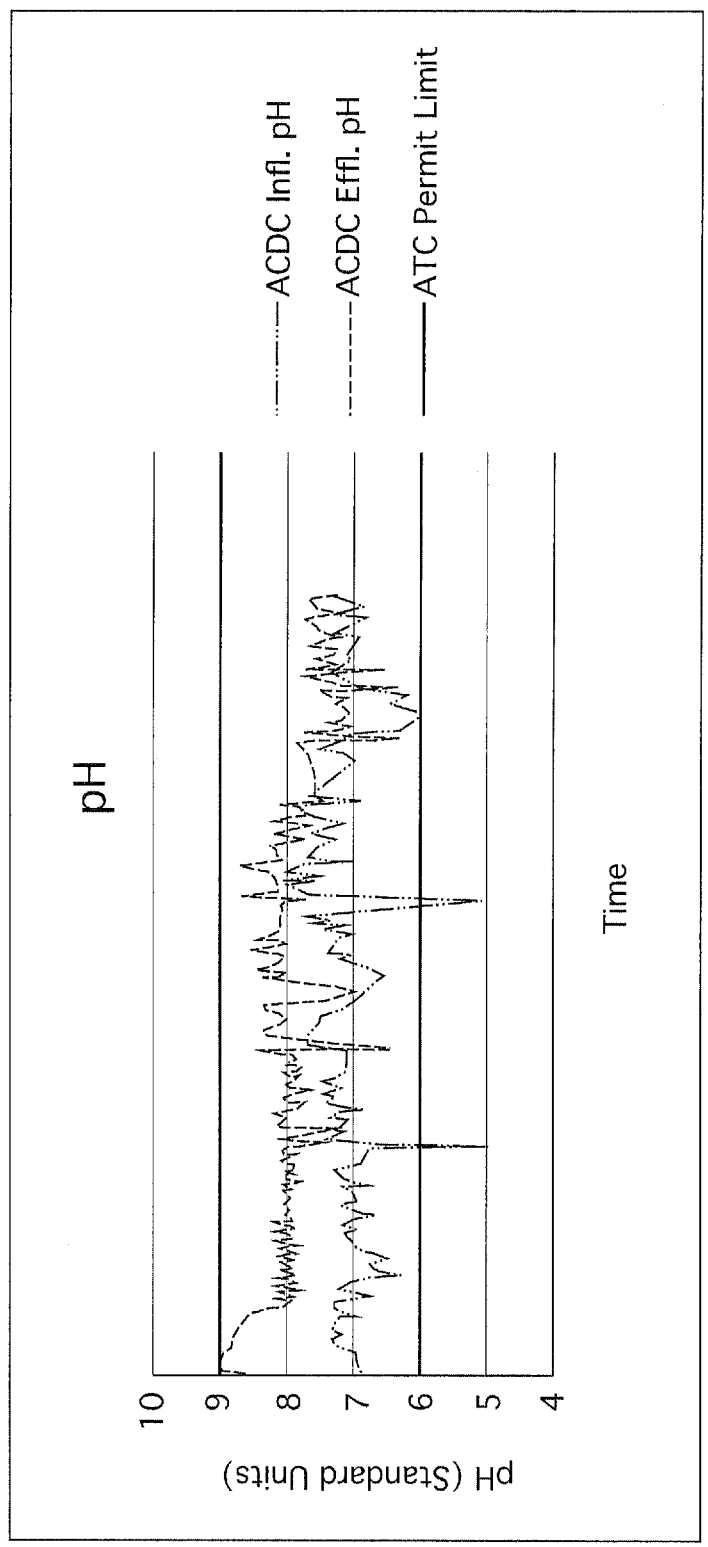
FIG. 8 is a chart depicting experimental results. The chart depicts the pH increase across the ACDC as a function of time. The x-axis time spans a period of 300 days. The chart depicts that in this embodiment, the ACDC will increase the pH of the water by approximately 1 standard unit.

FIG. 6 does not represent treatment via ACDC, but rather via subsurface constructed treatment wetland, it also illustrates how effluent fecal coliform counts increase when the DO level falls below 5 mg/L.

Figure 9:
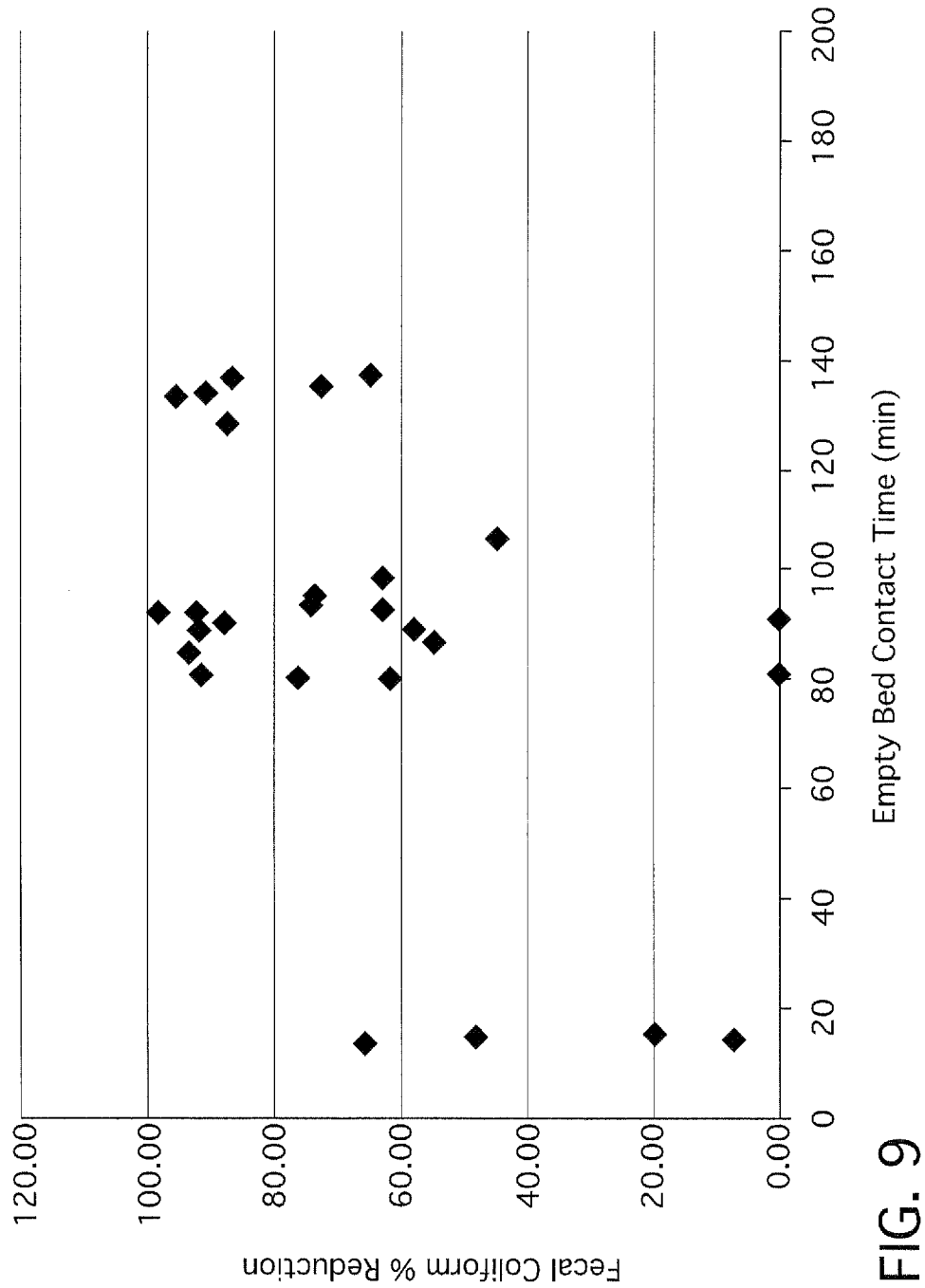
FIG. 9 is a chart depicting experimental results. The chart depicts the Empty Bed Contact Time (min) for corresponding removal rates of fecal coliform from wastewater streams. For example, the minimum Empty Bed Contact Time (EBCT) with a corresponding fecal coliform removal of at least 90% is 81 minutes. The porosity of alkaline clay has been estimated in the field as approximately 60%. Therefore the minimum hydraulic residence time (HRT) to produce a 90% removal rate is approximately 33 minutes. In this embodiment, an HRT greater than 33 minutes may provide for even greater removal.
Figure 10:
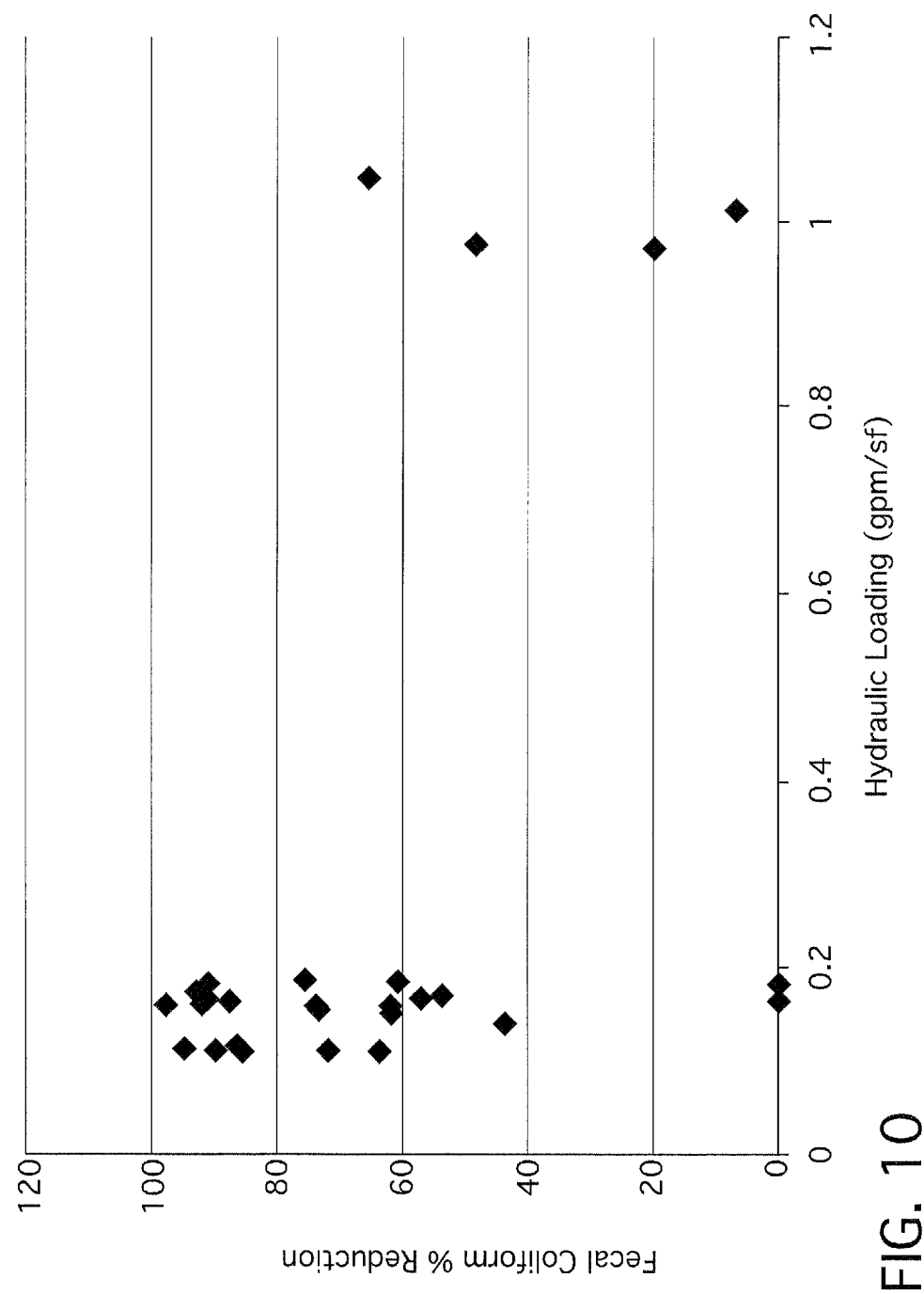
FIG. 10 is a chart depicting experimental results. The chart depicts the alkaline clay column fecal coliform removal relationship with hydraulic loading.

FIG. 9 and FIG. 10 illustrate that at surface loading rates of 0.1 to 0.15 gpm/ft$^2$ corresponding to an empty bed contact time (EBCT) of about 100-150 minutes for a 2-foot deep alkaline clay disinfection cell, alkaline clay can fairly consistently achieve a 90% fecal coliform reduction. For example, at surface loading rate of 1 gpm/ft$^2$ corresponding to an EBCT of about 15 minutes, fecal coliform removal deteriorates to 50% or less. In this experiment, the lowest EBCT was 81 minutes (e.g. shown on FIG. 9) with a corresponding fecal coliform removal of at least 90%. The porosity of alkaline clay has been estimated in the field as approximately 60%. Therefore the minimum hydraulic residence time (HRT) to produce a 90% removal rate is approximately 33 minutes.

Removal of Pharmaceuticals and Personal Care Products

Various drugs, referred to herein as pharmaceuticals and personal care products were screened for removal with the CTW and ACDC of the instant disclosure. There are several classes of pharmaceuticals and personal care products which were administered to the system. The drugs, along with their related class(es)/category are depicted in Table 8, below.

TABLE 8

PPCPs

| Name | Example Category | Exemplary Chemical Structure | Description |
|---|---|---|---|
| Gemfibrozil | antihyperlipidemic, anti-cholesterol | 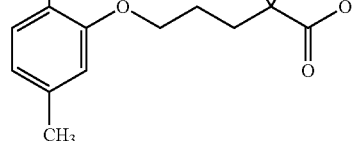 | $C_{15}H_{22}O_3$<br>MW = 250.33 g/mol |
| Erythromycin-H2O | antibiotic | 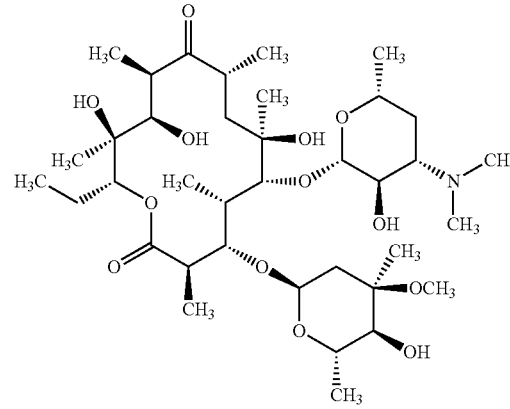 | Concentration 1 mg/mL in H2O<br>$C_{37}H_{67}NO_{13}$<br>MW = 733.93 g/mol |
| Glyburide | antidiabetic | 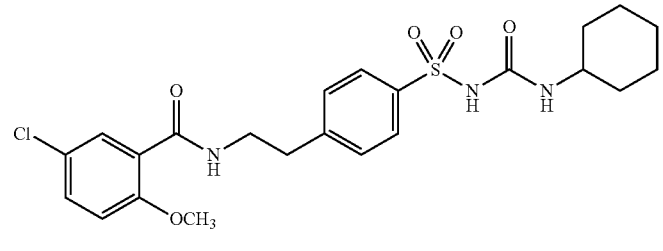 [SMILES: COc1ccc(Cl)cc1C(=O)NCCc1ccc(S(=O)(=O)NC(=O)NC2CCCCC2)cc1] | $C_{23}H_{28}ClN_3O_5S$<br>MW = 494.00 g/mol |
| Hydrochloro-thiazide | diuretic | 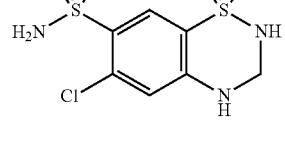 | $C_7H_8ClN_3O_4S_2$<br>MW = 297.74 g/mol |
| 2-Hydroxy-ibuprofen | anti-inflammatory, analgesic | | |
| ibuprofen | anti-inflammatory, analgesic | 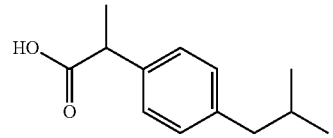 | $C_{13}H_{18}O_2$<br>MW = 206.28 g/mol |
| Naproxen | anti-inflammatory, analgesic, antipyretic | 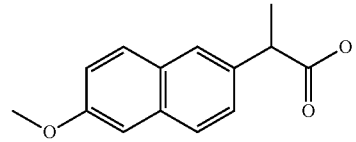 [SMILES: COc1ccc2cc(C(C)C(=O)O)ccc2c1] | $C_{14}H_{14}O_3$<br>MW = 230.26 g/mol |

TABLE 8-continued

PPCPs

| Name | Example Category | Exemplary Chemical Structure | Description |
|---|---|---|---|
| Triclocarban | disinfectant, antibacterial | | $C_{13}H_9C_{13}N_2O$<br>MW = 315.58 g/mol |
| Triclosan | antimicrobial disinfectant, antibiotic | | $C_{12}H_7C_{13}O_2$<br>MW = 289.53 g/mol |
| Acetaminophen | analgesic, antipyretic | | $C_8H_9NO_2$<br>MW = 151.17 g/mol |
| Azithromycin | semi-synthetic macrolide antibiotic, antibacterial | | $C_{38}H_{72}N_2O_{12} \cdot xH_2O$<br>MW = 749.00 g/mol |
| Caffeine | stimulant | | $C_8H_{10}N_4O_2H_2O$<br>MW = 194.19 g/mol |
| Carbamazepine | Human Drug, analgesic, anticonvulsant | | $C_{15}H_{12}N_2O$<br>MW = 236 g/mol |
| Ciprofloxacin | fluoroquinolone antibiotic, fluorinated quinolone antibacterial | | $C_{17}H_{18}FN_3O_3$<br>MW = 331.4 g/mol |

TABLE 8-continued

| | | PPCPs | |
|---|---|---|---|
| Name | Example Category | Exemplary Chemical Structure | Description |
| Clarithromycin | industrial or household product, antibacterial | | $C_{38}H_{69}NO_{13}$<br>MW = 747.953 g/mol |
| Cloxacillin | antibacterial | | $C_{19}H_{18}ClN_3O_5S$<br>MW = 435 g/mol |
| Dehydro-nifedipine | nifedipine (anti-anginal) metabolite | | $C_{17}H_{16}N_2O_6$<br>MW = 344.32 g/mol |
| Diphen-hydramine | anti-histamine | | $C_{17}H_{21}NO$<br>MW = 255.355 g/mol |

TABLE 8-continued

| | | PPCPs | |
|---|---|---|---|
| Name | Example Category | Exemplary Chemical Structure | Description |
| Diltazem | anti-anginal | 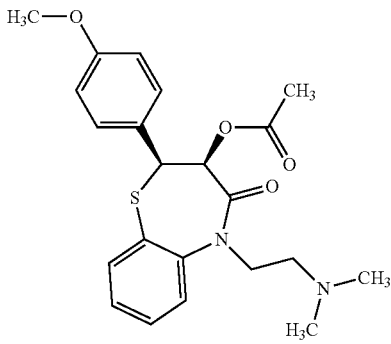 | $C_{22}H_{26}N_2O_4S$<br>MW = 414.519 g/mol |
| Fluoxetine | antidepressant (also 6), serotonin uptake inhibitor | 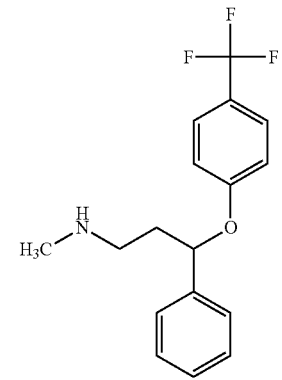 [SMILES: CNCCC(Oc1ccc(C(F)(F)F)cc1)c1ccccc1] | $C_{17}H_{18}F_3NO$<br>MW = 309.33 g/mol |
| Miconazole | topical antifungal | 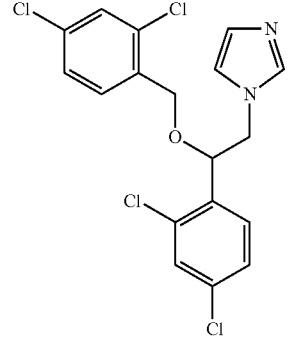 [SMILES: Clc1ccc(COC(Cn2ccnc2)c2ccc(Cl)cc2Cl)c(Cl)c1] | $C_{18}H_{14}C_{14}N_2O$<br>MW = 416 g/mol |
| Norfloxacin | fluoroquinolone antibiotic, fluorinated quinolone antibacterial | 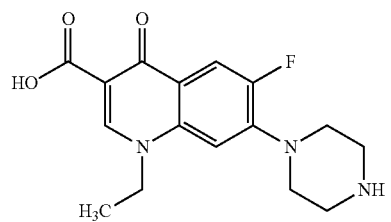 [SMILES: CCn1cc(C(=O)O)c(=O)c2cc(F)c(N3CCNCC3)cc21] | $C_{16}H_{18}FN_3O_3$<br>MW = 319 g/mol |

TABLE 8-continued

PPCPs

| Name | Example Category | Exemplary Chemical Structure | Description |
|---|---|---|---|
| Ofloxacin | broad spectrum, fluorinated quinolone antibacterial | | $C_{18}H_{20}FN_3O_4$ MW = 361 g/mol |
| Penicillin V | antibiotic, antibacterial | | $C_{16}H_{18}N_2O_5S$ MW = 350 g/mol |
| Sulfadiazine | sulfonamide antibiotic, antibacterial | | $C_{10}H_{10}N_4O_2S$ MW = 250 g/mol |
| Sulfamethizole | antibiotic, antibacterial | | $C_9H_{10}N_4O_2S_2$ MW = 270.33 g/mol |
| sulfamethoxazole | sulfonamide antibiotic, antibacterial, antipneumocystis | | $C_{10}H_{11}N_3O_3S$ MW = 253.28 g/mol |
| Thiabendazole | fungicide, anthelmintic (nematodes) | | $C_{10}H_7N_3S$ MW = 201.26 g/mol |

TABLE 8-continued

| | | PPCPs | |
|---|---|---|---|
| Name | Example Category | Exemplary Chemical Structure | Description |
| Trimethoprim | antibiotic | 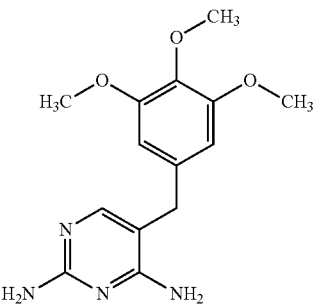 [SMILES: COc1cc(Cc2cnc(N)nc2N)cc(OC)c1OC] | $C_{14}H_{18}N_4O_3$<br>MW = 290.26 g/mol |
| 1,7-dimethyl-xanthine | caffeine metabolite | 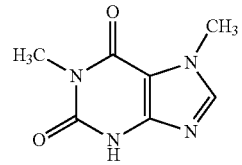 | $C_7H_8N_4O_2$<br>MW = 180.16 g/mol |
| Cholesterol | hormone, pharmaceutic aid (emulsifying agent) | 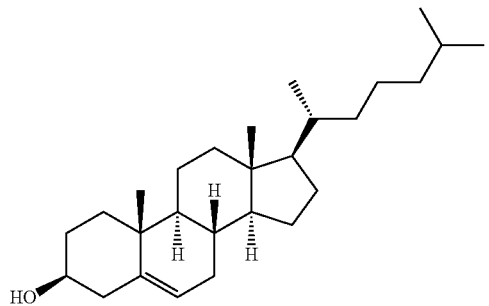 | $C_{27}H_{46}O$<br>MW = 386.65 g/mol |

Three sampling events occurred to track the removal of PPCPs from wastewater by the ENS. For PPCPs, the samples are collected directly from the sanitary wastewater treatment system into 1-L HDPE bottles. The samples are kept at a temperature of 4° C., shipped to the lab for PPCP analysis in a cooler with ice packs, and analyzed within one week via EPA Method 1694, utilizing LC/MS/MS (liquid chromatography-mass spectrometry).

At each sampling event, the dissolved oxygen of the influent wastewater to the ACDC on all three PPCP sampling days was greater than 8 mg/L. Specifically, the dissolved oxygen at each sampling was as follows:

First sample: 8.49 mg/L;
Second Sample: 8.68 mg/L; and
Third sample: 8.77 mg/L.

As depicted in FIGS. 11-14 and 17-18, two PPCP compounds appear to have better removal through the ACDC than through the CTW: Gemfibrozil (antihyperlipidemic, anti-cholesterol drug) and Erythromycin-H2O (antibiotic). For the analysis in the Figures, the detection limits for fecal coliform were 10-200,000 CFU/100 mL. Detection limits for the PPCP materials vary for each compound. Many of the PPCPs which were screened for removal in accordance with the instant disclosure were removed with the system and/or methods of the instant disclosure to near or below detection levels (i.e. 10-100 ppt range). As depicted for the PPCP removal plots, the total treatment time for the MMOB is lower than for the pretreatment step.

The sampling data is depicted in Table 9, below, where the ACDC removal for the first sampling, second sampling, and third sampling is given in the fractional percent (multiply values by 100 to get percentage of removal). Where concentration levels for a material were below the detection limit for that material, data is omitted.

TABLE 9

PPCP at Three Sampling Events

| PPCP-Chemical/Commercial Name | First Sampling ACDC removal | Second Sampling ACDC removal | Third Sampling ACDC removal | All Data AVG ACDC removal (%) |
|---|---|---|---|---|
| Gemfibrozil | 0.98 | 0.97 | 0.49 | 81.03 |
| Hydrochlorothiazide | 0.13 | −0.10 | 0.17 | 6.70 |
| 2-Hydroxy-ibuprofen | 0.86 | 0.83 | 0.64 | 77.57 |
| Ibuprofen | 0.90 | 0.64 | 0.92 | 82.14 |
| Naproxen | 0.98 | 0.97 | 0.74 | 89.56 |
| Triclocarban | 0.49 | 0.47 | 0.47 | 47.22 |
| Triclosan | | 0.47 | 0.46 | 46.52 |
| Acetaminophen p-acetylaminophenol | 0.49 | 0.47 | 0.46 | 47.25 |
| Azithromycin | 0.49 | 0.47 | 0.50 | 48.34 |
| Caffeine | −0.14 | 0.59 | 0.41 | 28.67 |
| Ciprofloxacin | 0.58 | 0.38 | 0.65 | 53.88 |
| Clarithromycin | 0.96 | 0.84 | | 90.18 |
| Cloxacillin | 0.47 | | | 47.30 |
| Diphenhydramine | 0.68 | 0.65 | 0.71 | 68.25 |
| Diltiazem | 0.80 | 0.65 | 0.58 | 67.74 |

TABLE 9-continued

PPCP at Three Sampling Events

| PPCP-Chemical/Commercial Name | First Sampling ACDC removal | Second Sampling ACDC removal | Third Sampling ACDC removal | All Data AVG ACDC removal (%) |
|---|---|---|---|---|
| Erythromycin-H2O | 0.41 | 0.47 | 0.36 | 41.53 |
| Fluoxetine | 0.49 | 0.41 | 0.47 | 45.51 |
| Miconazole | 0.49 | 0.47 | | 47.68 |
| Norfloxacin | 0.49 | | | 48.62 |
| Ofloxacin | 0.49 | 0.47 | | 47.68 |
| Penicillin V | | 0.47 | | 46.51 |
| Sulfadiazine | 0.49 | | | 48.62 |
| Sulfamethizole | | | | |
| Sulfamethoxazole | −0.11 | 0.25 | | 6.88 |
| Thiabendazole | | 0.47 | | 46.74 |
| Trimethoprim | 0.76 | 0.71 | −0.25 | 40.80 |
| 1,7-Dimethylxanthine | 0.49 | 0.47 | −0.90 | 1.93 |
| Cholesterol | 0.69 | | | 68.81 |

Figure 2:
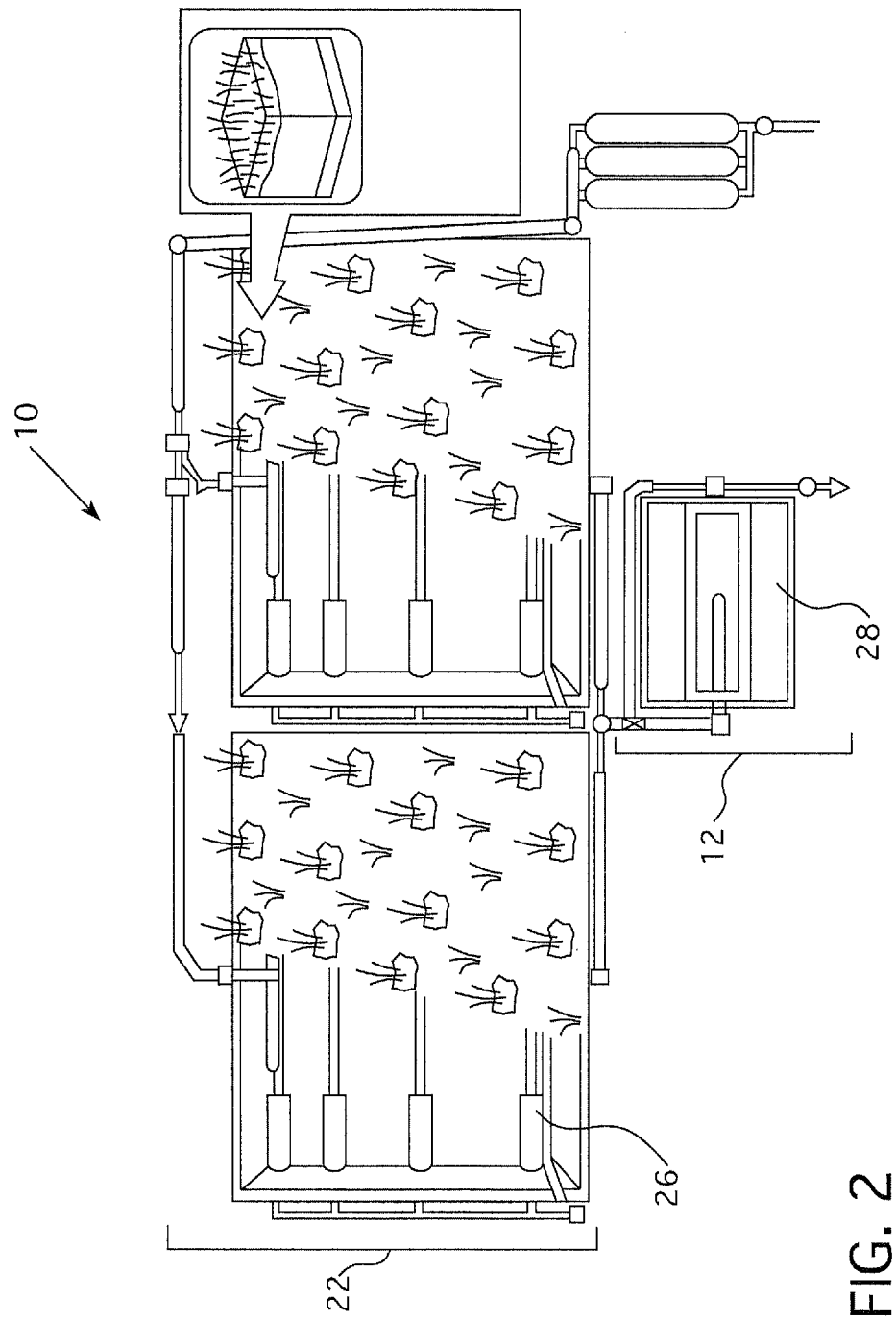
FIG. 2 depicts an example of a wastewater treatment system in accordance with the instant disclosure.

Across the system depicted in FIG. 2, the average removal at different points is as follows, depicted in Table 10, below:

| PPCP-Chemical/Commercial Name | All Data AVG CTW Inf. | All Data AVG CTW Effl./ACDC Inf. | All Data AVG ACDC Effl. | Removal % by ACDC |
|---|---|---|---|---|
| Gemfibrozil | 1560.00 | 762.67 | 183.00 | 76.01 |
| Hydrochlorothiazide | 930.83 | 852.33 | 777.33 | 8.80 |
| 2-Hydroxy-ibuprofen | 34216.67 | 1319.67 | 406.00 | 69.23 |
| Ibuprofen | 14621.67 | 354.87 | 33.37 | 90.60 |
| Naproxen | 9361.67 | 323.73 | 65.64 | 79.72 |
| Triclocarban | 177.25 | 5.64 | 2.98 | 47.16 |
| Triclosan | 621.25 | 111.25 | 59.50 | 46.52 |
| Acetaminophen | 63033.33 | 112.83 | 59.50 | 47.27 |
| Azithromycin | 1590.05 | 2.88 | 1.49 | 48.26 |
| Caffeine | 50233.33 | 494.10 | 303.23 | 38.63 |
| Ciprofloxacin | 376.93 | 16.55 | 7.72 | 53.35 |
| Clarithromycin | 557.63 | 25.64 | 1.48 | 94.23 |
| Cloxacillin | 8.16 | 2.32 | 1.22 | 47.41 |
| Diphenhydramine | 505.17 | 1.96 | 0.62 | 68.37 |
| Diltiazem | 133.53 | 13.86 | 4.94 | 64.36 |
| Erythromycin-H2O | 5.21 | 23.55 | 14.06 | 40.30 |
| Fluoxetine | 28.83 | 2.82 | 1.54 | 45.39 |
| Miconazole | 12.56 | 2.83 | 1.48 | 47.70 |
| Norfloxacin | 138.65 | 29.00 | 14.90 | 48.62 |
| Ofloxacin | 531.25 | 28.30 | 14.80 | 47.70 |
| Penicillin V | 33.10 | 5.52 | 2.95 | 46.56 |
| Sulfadiazine | 6.54 | 2.90 | 1.49 | 48.62 |
| Sulfamethoxazole | 692.25 | 661.15 | 512.33 | 22.51 |
| Thiabendazole | 8.26 | 2.76 | 1.47 | 46.74 |
| Trimethoprim | 253.08 | 20.45 | 12.65 | 38.14 |
| Caffeine | 1530.00 | 1.00 | 1.00 | 0.00 |
| Cholesterol | 15400.00 | 64.13 | 20.00 | 68.81 |

Caffeine and Cholesterol Sampling

Figure 11:
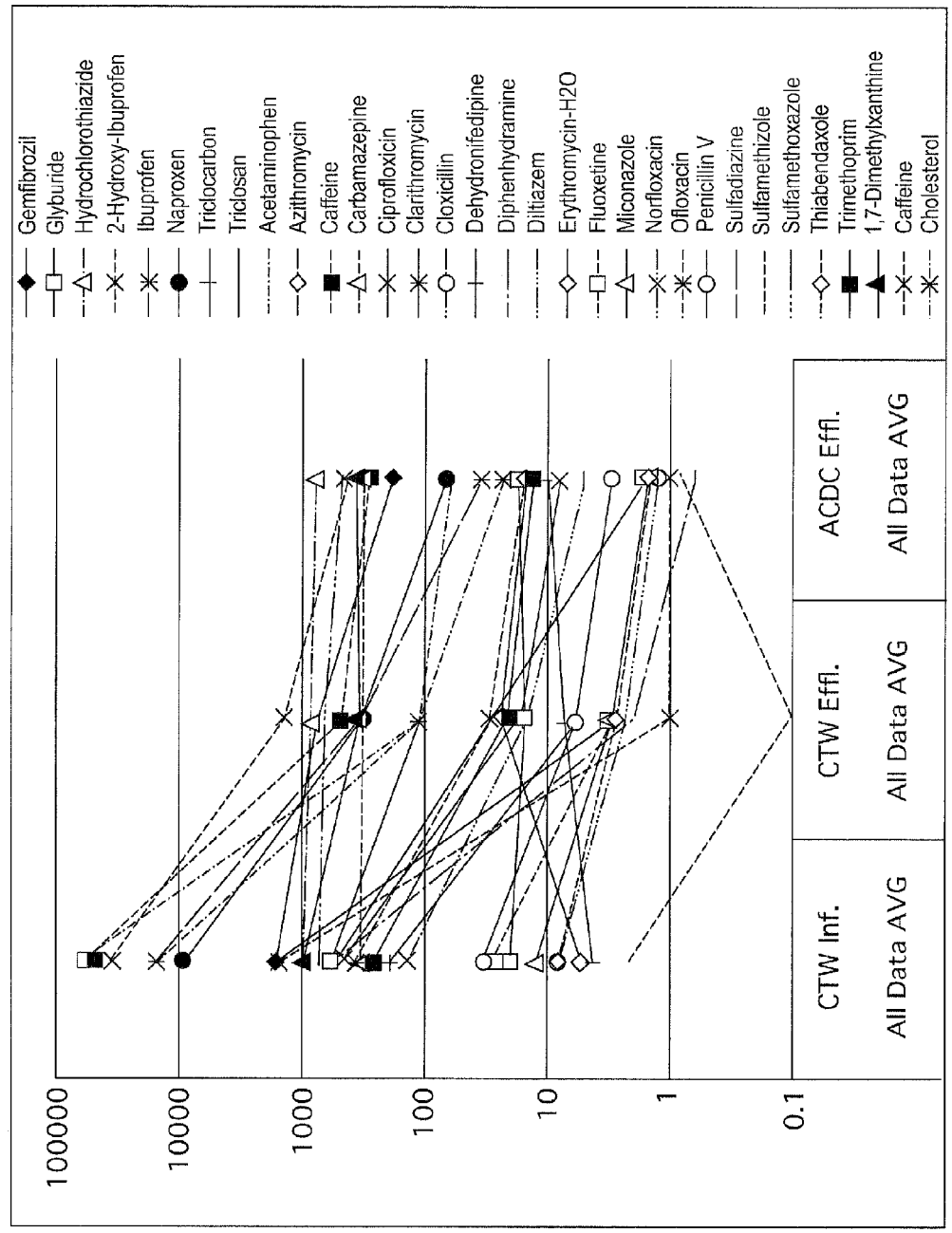
FIG. 11 is a chart depicting experimental results. The chart depicts the removal of various pharmaceuticals and personal care products through an engineered natural system, which includes both CTW and ACDC.
Figure 12:
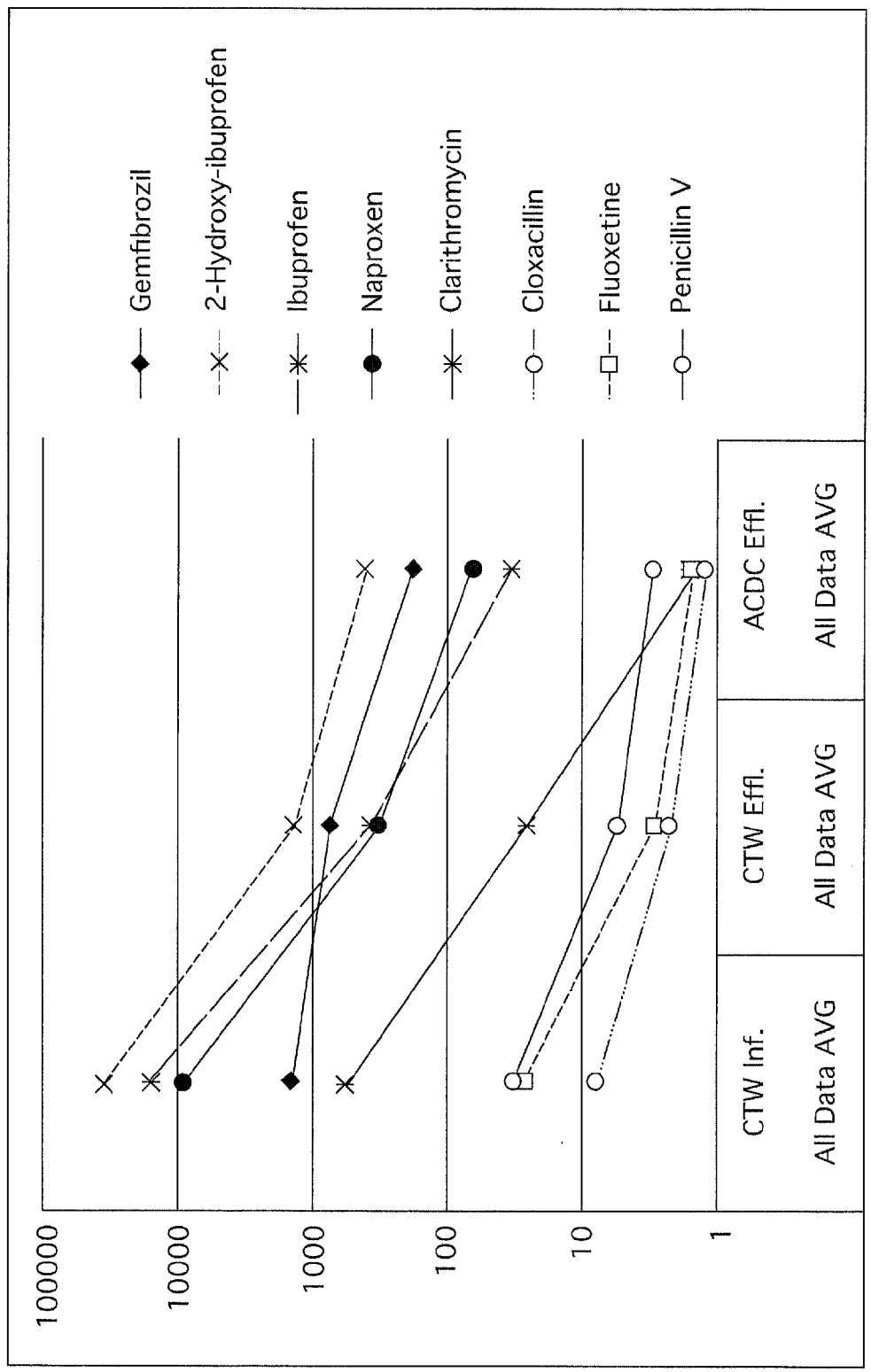
FIG. 12 is a chart depicting experimental results. The chart depicts the removal of select PPCPs through the Engineered Natural System, which includes both CTW and an ACDC.
Figure 13:
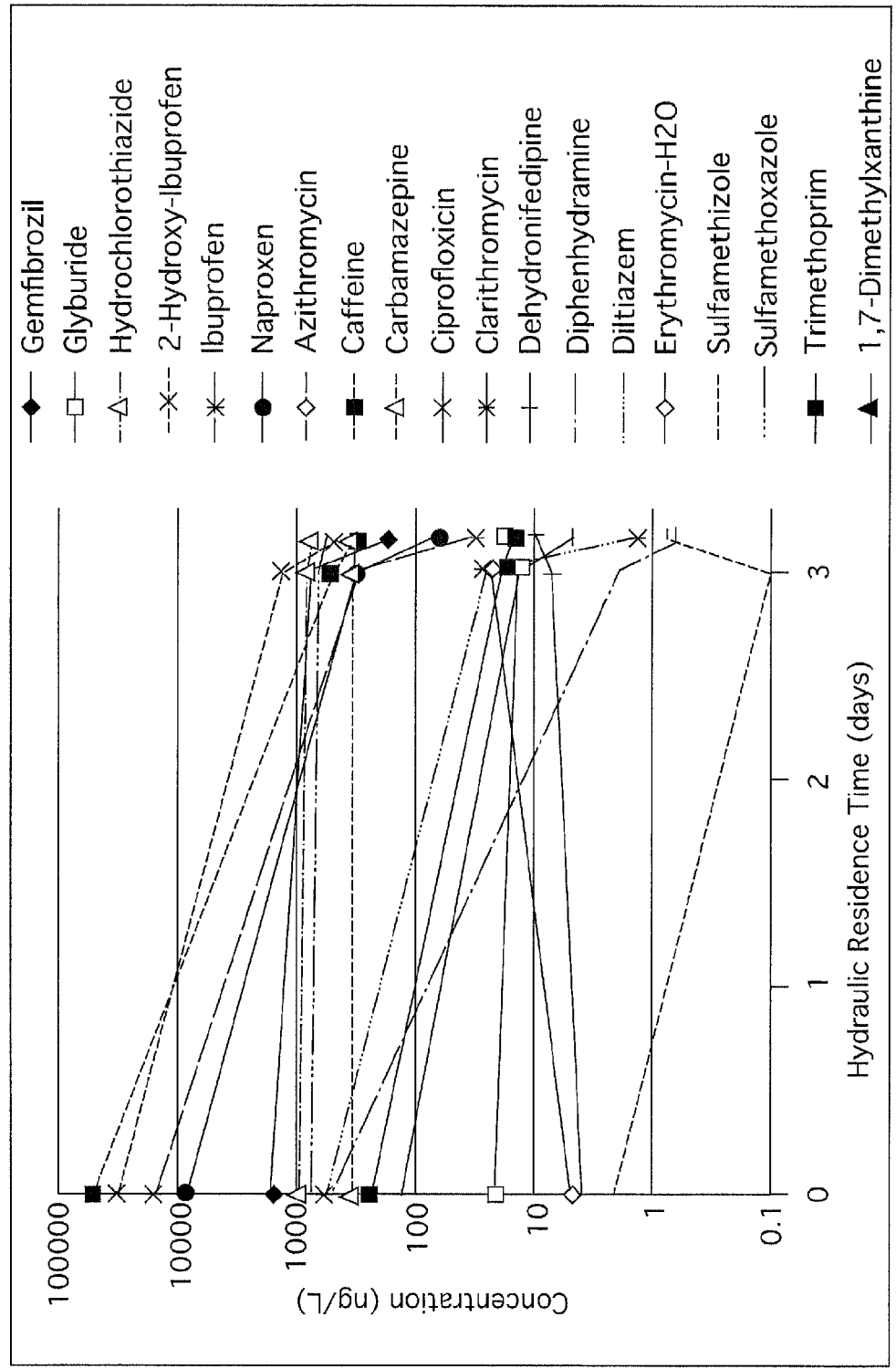
FIG. 13 is a chart depicting experimental results. The chart depicts the removal of PPCPs, shown as concentration of contaminant versus hydraulic residence time (in days). Note the design HRT for the constructed treatment wetlands (CTW) is 3 days and the design HRT for the ACDC is 4 hours.
Figure 14:
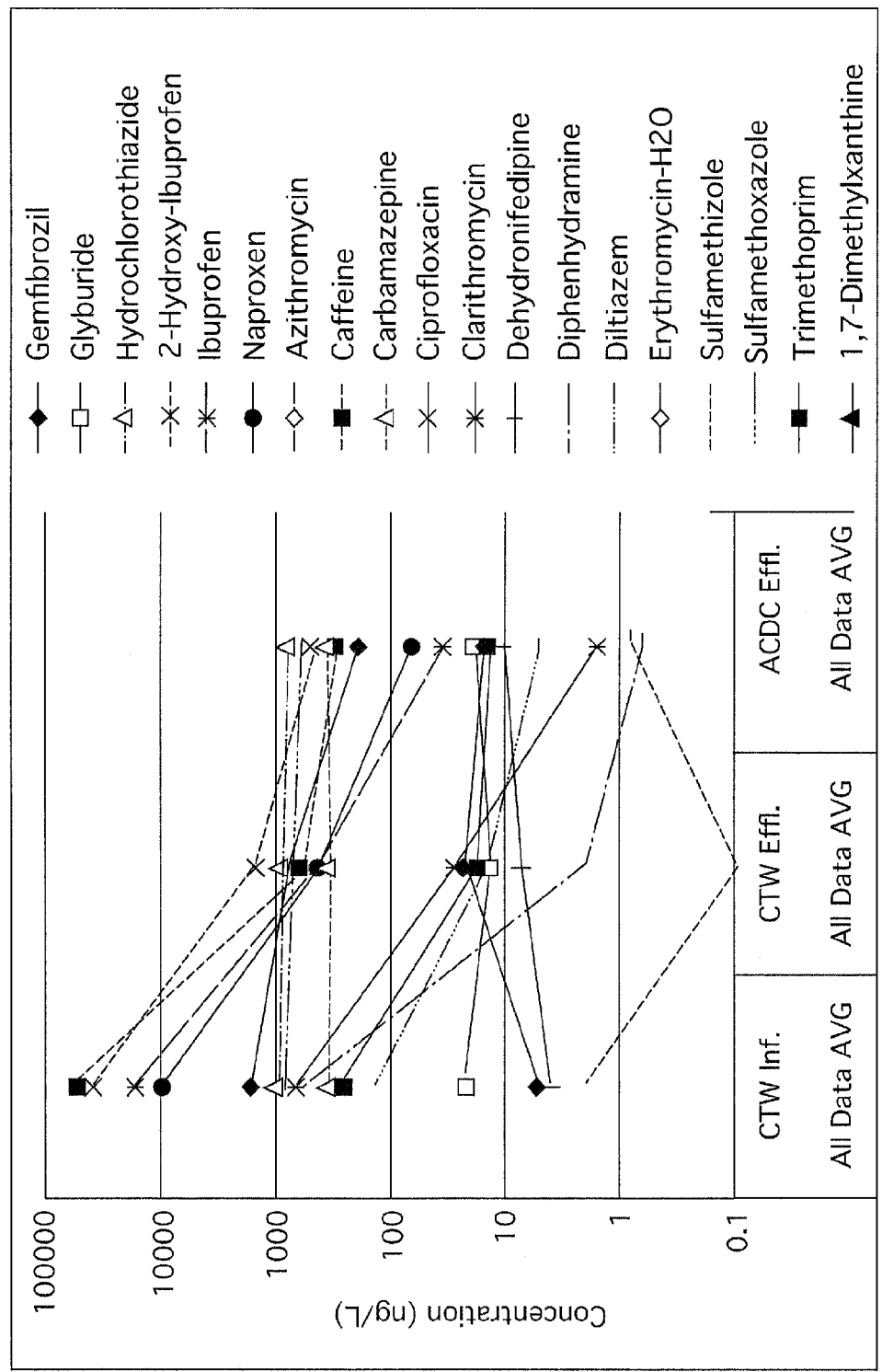
FIG. 14 is a chart depicting experimental results. The chart depicts the PPCP removal for only those compounds where the influent to the ACDC is greater than non-detection limits (total 19 compounds).
Figure 15:
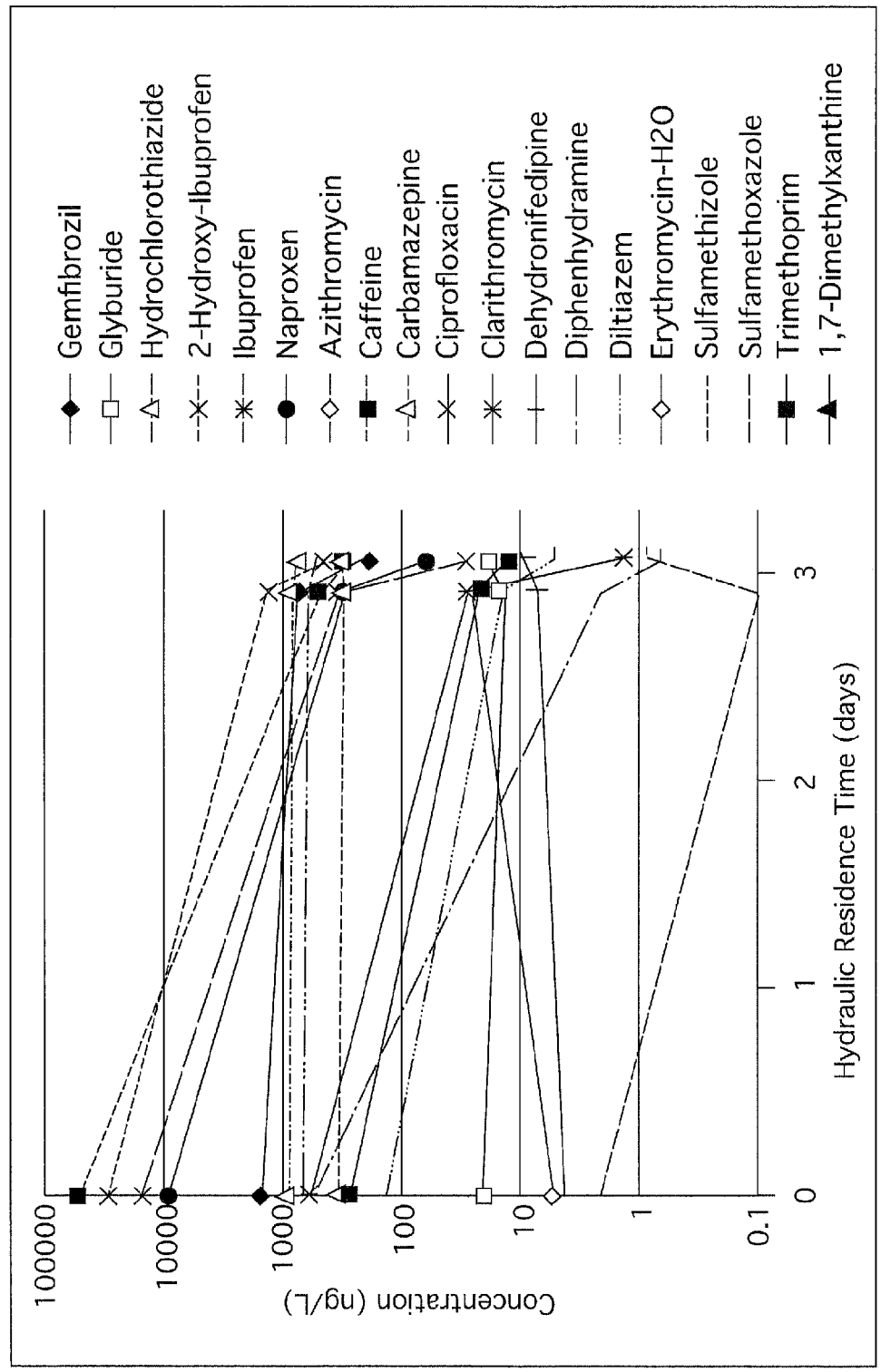
FIG. 15 is a chart depicting experimental results. The chart depicts the removal of PPCPs via ATC Engineered Natural System according to Hydraulic Residence Time. Note the design HRT for the constructed treatment wetlands (CTW) is 3 days and the design HRT for the ACDC is 4 hours. Note that only compounds where the influent to the ACDC was greater than non-detect are shown.
Figure 16:
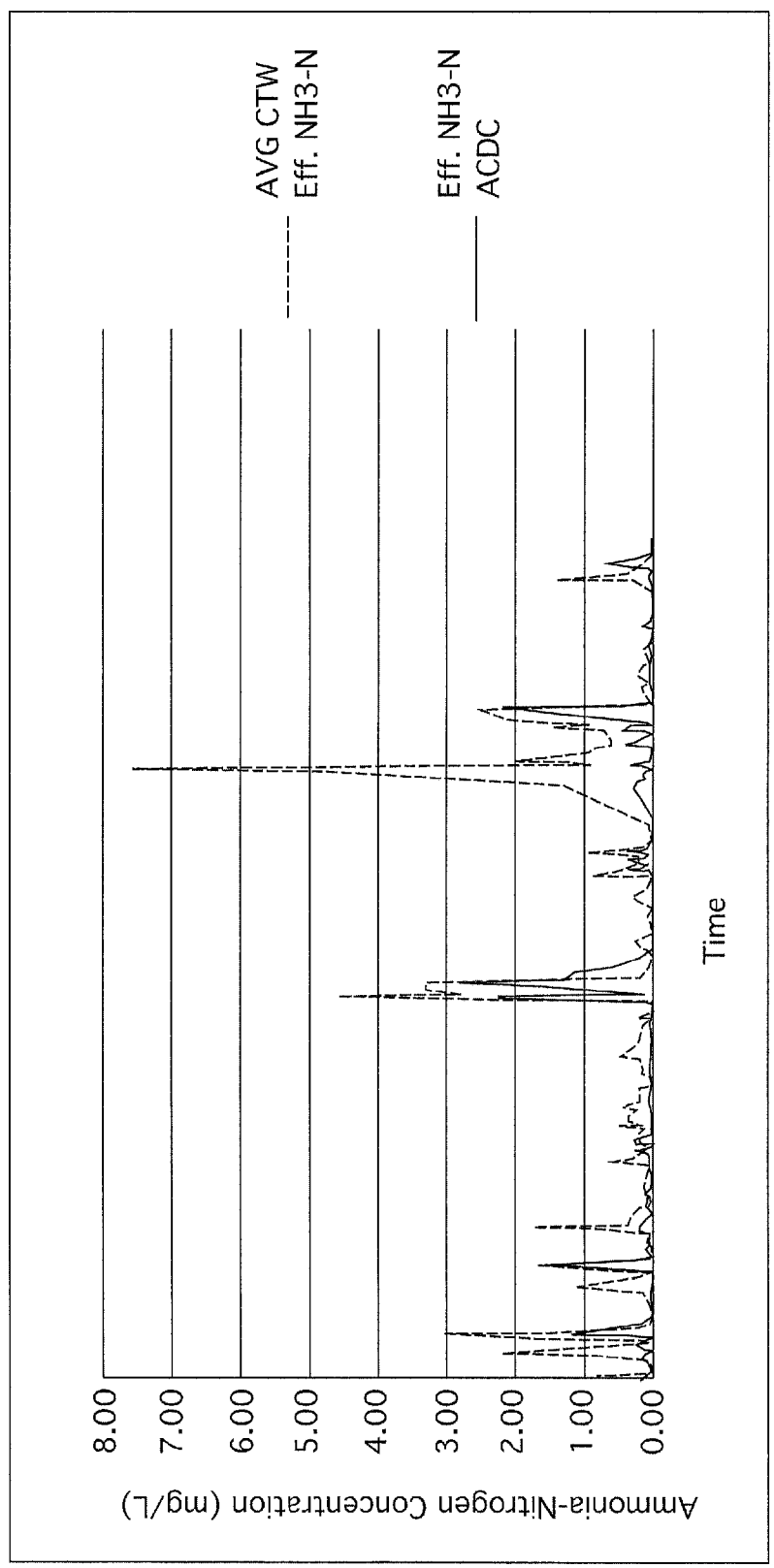
FIG. 16 is a chart depicting experimental results. The chart depicts the ammonia removal via ACDC, including the influent and effluent ammonia-nitrogen levels for the ACDC as a function of time. The x-axis (time) spans a period of approximately 288 days.
Figure 17:
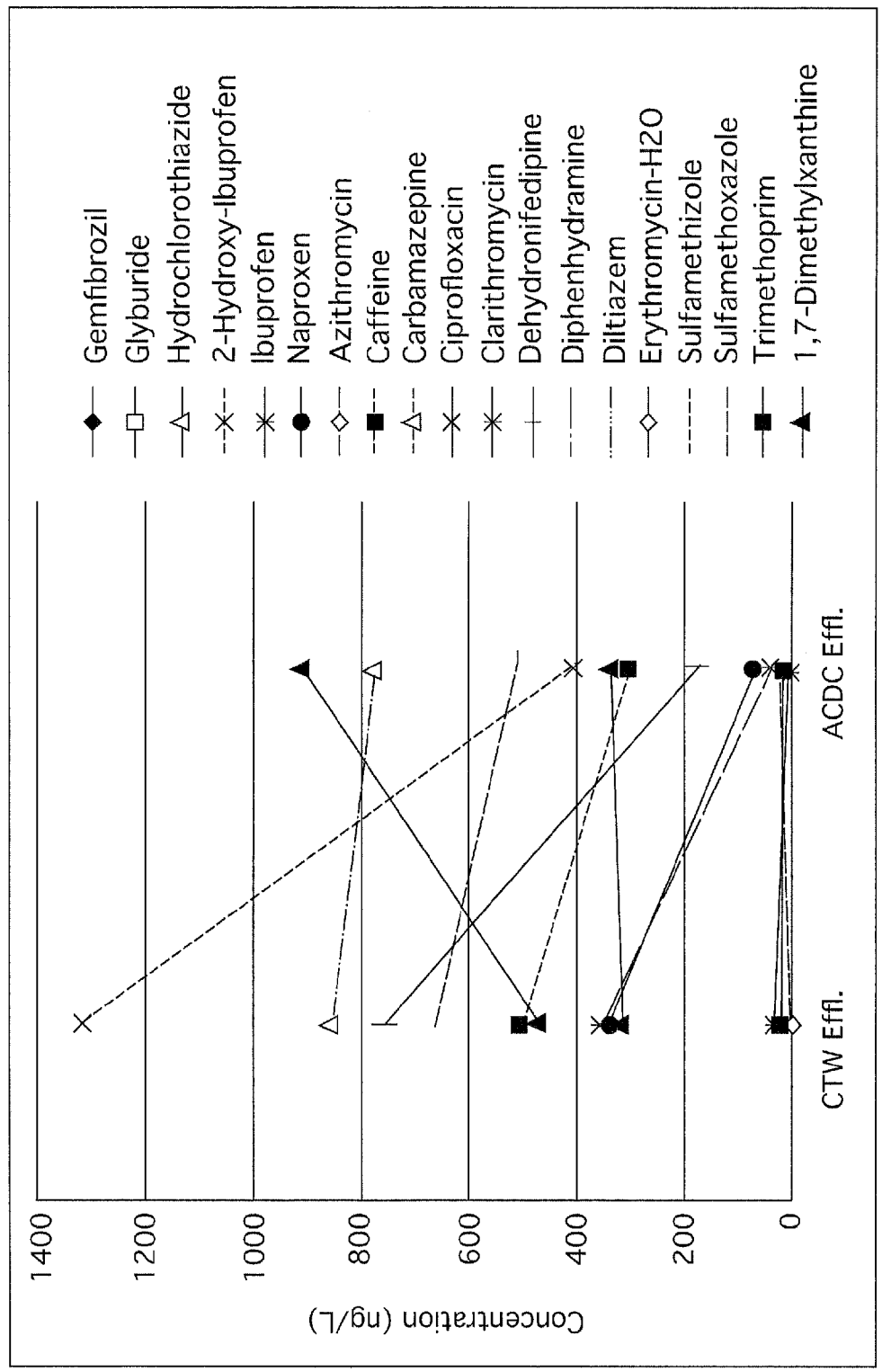
FIG. 17 is a chart depicting experimental results. The chart depicts the various PPCP materials and their respective concentration at the ACDC influent and the ACDC effluent, where the y-axis is scaled from 0-1400 ng/L.
Figure 18:
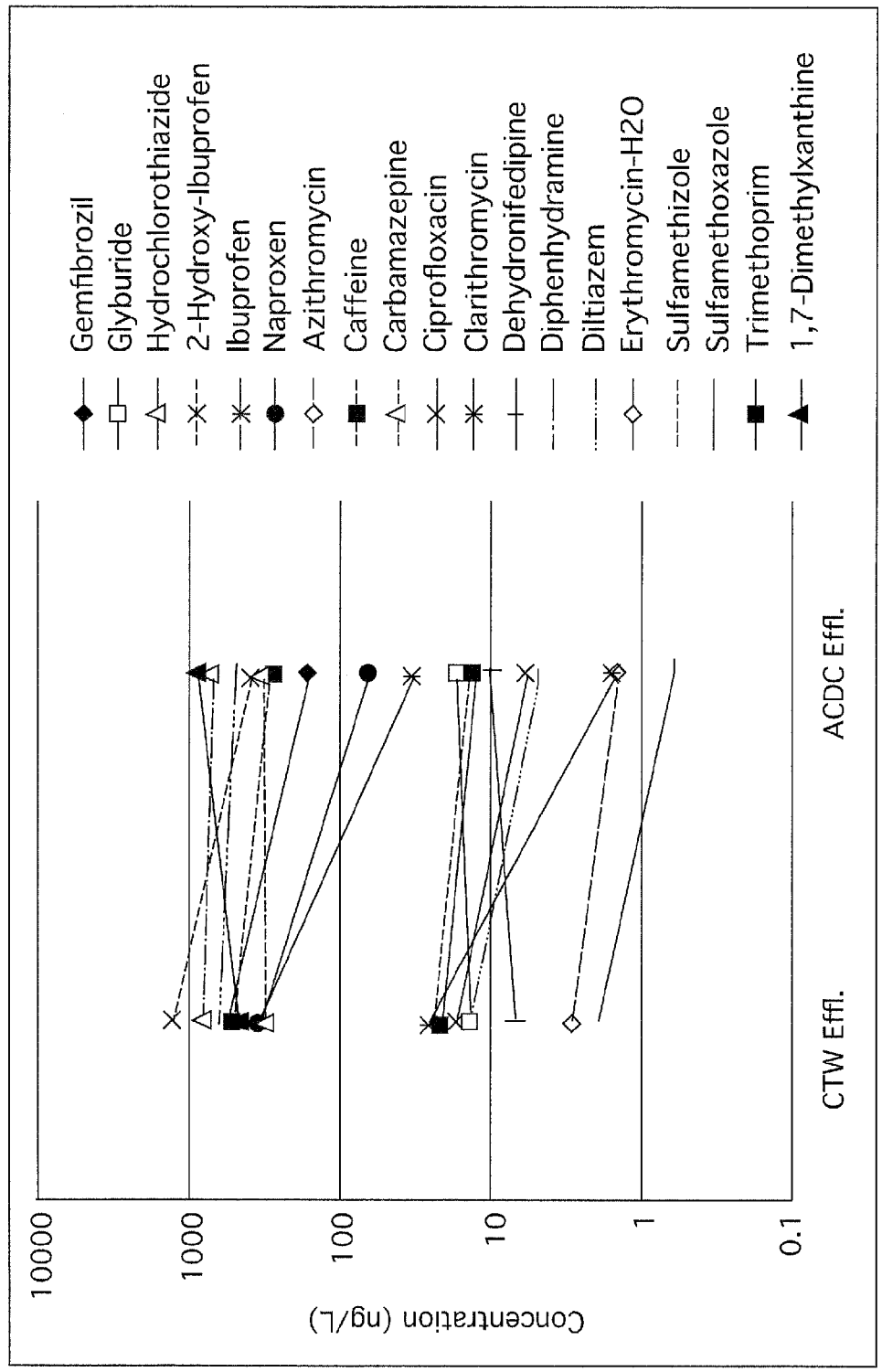
FIG. 18 is a chart depicting experimental results. The chart depicts the various PPCP materials and their respective concentration at the ACDC influent and ACDC effluent, where the y-axis is scaled from 0-10,000 ng/L.
Figure 19:
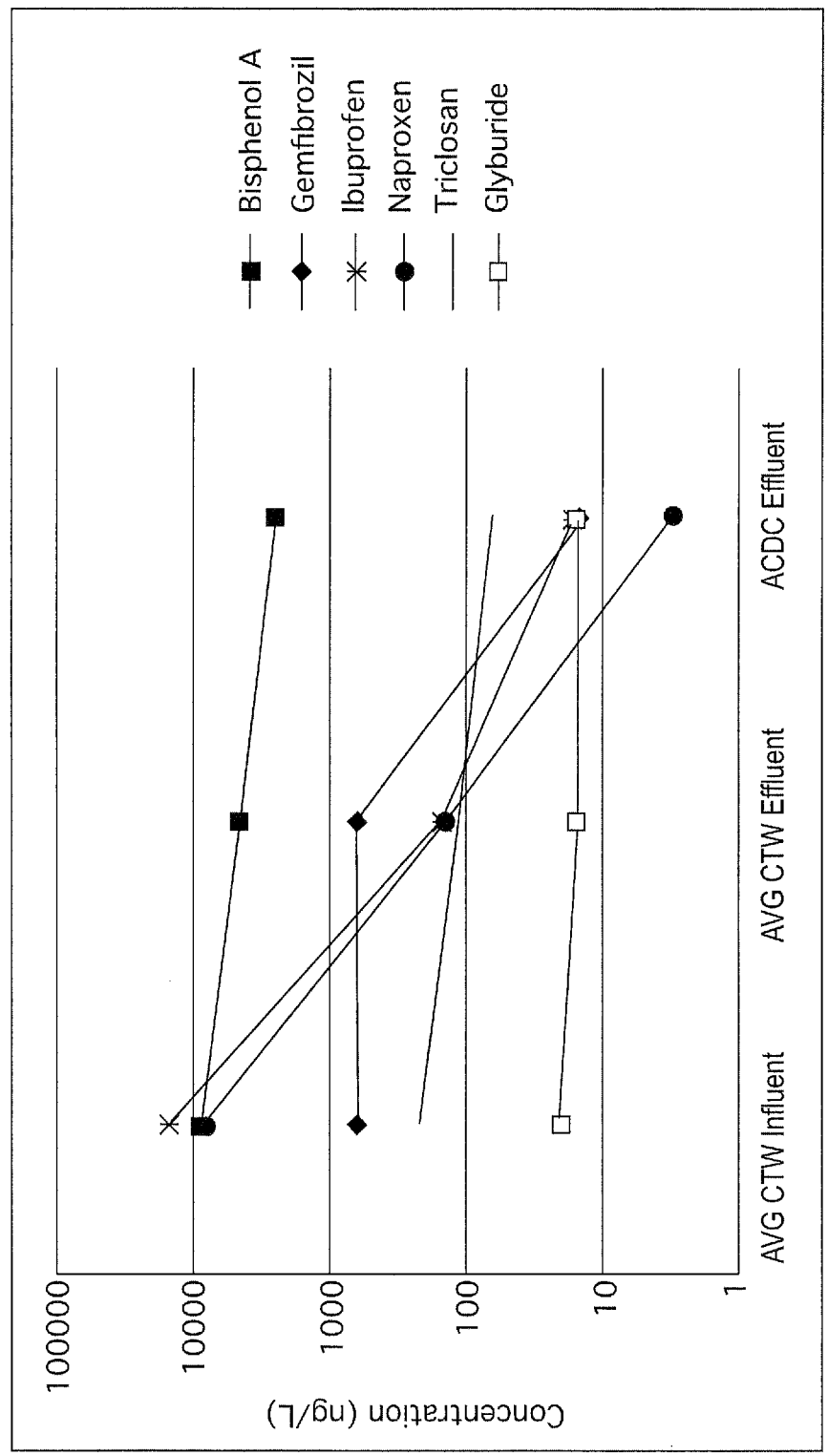
FIG. 19 is a chart depicting experimental results. The chart depicts a chart of PPCP removal of some PPCPs, including Bisphenol A, Gemfibrozil, Ibuprofen, Naproxen, Triclosan and Glyburide.

The caffeine and the cholesterol numbers depicted on FIG. 11 were obtained the same sampling previously described. However, rather than being analyzed via EPA Method 1694, utilizing LC/MS/MS (liquid chromatography-tandem mass spectrometry), cholesterol and the samples were analyzed with GC/MS (gas chromatography-mass spectrometry).

Example: Ammonia Adsorption by Alkaline Clay and Clinoptilolite

The following experiments were performed in order to determine the level of ammonia adsorption from alkaline clay, as compared to other materials. Ammonia batch sorption isotherms were conducted to determine the capacity of alkaline clay to sorb ammonia from water and how the alkaline clay compares to other media. Sorption by alkaline clay (Sherwin, Tex. and Bauxite, Ark. alkaline clay) was compared to clinoptilolite (a zeolite commercially sold for ammonia removal, composed of pure zeolite material of the formula $(Na, K, Ca)_{2-3}Al_3(Al, Si)_2Si_{13}O_{36} \cdot 12H_2O)$), sand, and bauxite ore. Sand was chosen as a control and was expected to have low ammonia removal.

A fixed dose of each media (Sherwin alkaline clay (AC), Arkansas alkaline clay (Ar AC), sand, bauxite ore and clinoptilolite (Cl) was weighed into separate plastic bottles. A stock solution of tap water mixed with ammonium sulfate $((NH_4)_2SO_4)$ was mixed to a fixed concentration of ammonia-N and then 100 ml of the solution was added to each bottle. The 100 ml bottles were shaken on a wrist arm shaker for 20 hours during both Tests. Each bottle's contents were then filtered and the filtered water measured for its ammonia concentration using a Thermo Scientific Orion ammonia combination electrode. The two tests are summarized in the Table 11, below, and in FIGS. 27-28.

| Test | Media | Solution Concentration, ammonia as nitrogen (NH3—N) | Shake time |
|---|---|---|---|
| 1 | Sand, Sherwin AC | 10 mg/l | 20 hrs |
| 2 | Sherwin AC, Clinoptilolite | 25 mg/l | 20 hrs |

Figure 28:
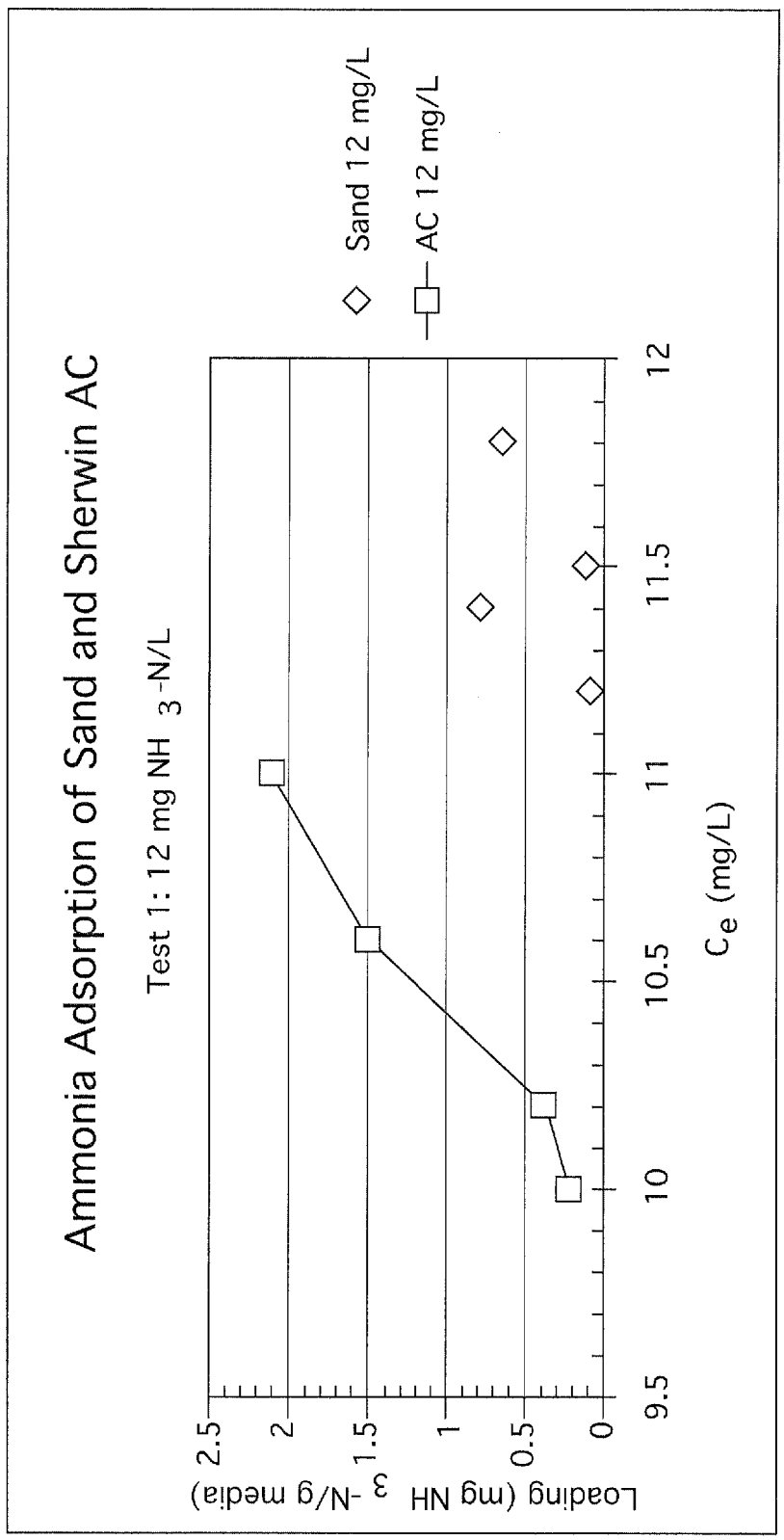
FIG. 28 depicts experimental data of comparative ammonia adsorption onto two media: sand and alkaline clay, plotted as loading (mg NH3-N/g media) as a function of Ce (mg/L).

Test 1: The first test compared the batch sorption capacity of Sherwin AC with sand using 10 mg/L ammonia as nitrogen ($NH_3$—N) solution. FIG. 28 illustrates that the Sherwin AC outperformed the sand, as expected. The average loading for all doses of AC was 1.05 mg $NH_3$—N/g AC, compared to an average of 0.42 mg $NH_3$—N/g for the sand. The AC's sorption capacity ranged between 0.22-2.1 mg $NH_3$—N/g AC. The x-axis label is "$C_e$, (mg/L)", which is the equilibrium concentration of dissolved $NH_3$—N in the 100 ml bottles at the completion of the sorption test.

Figure 29:
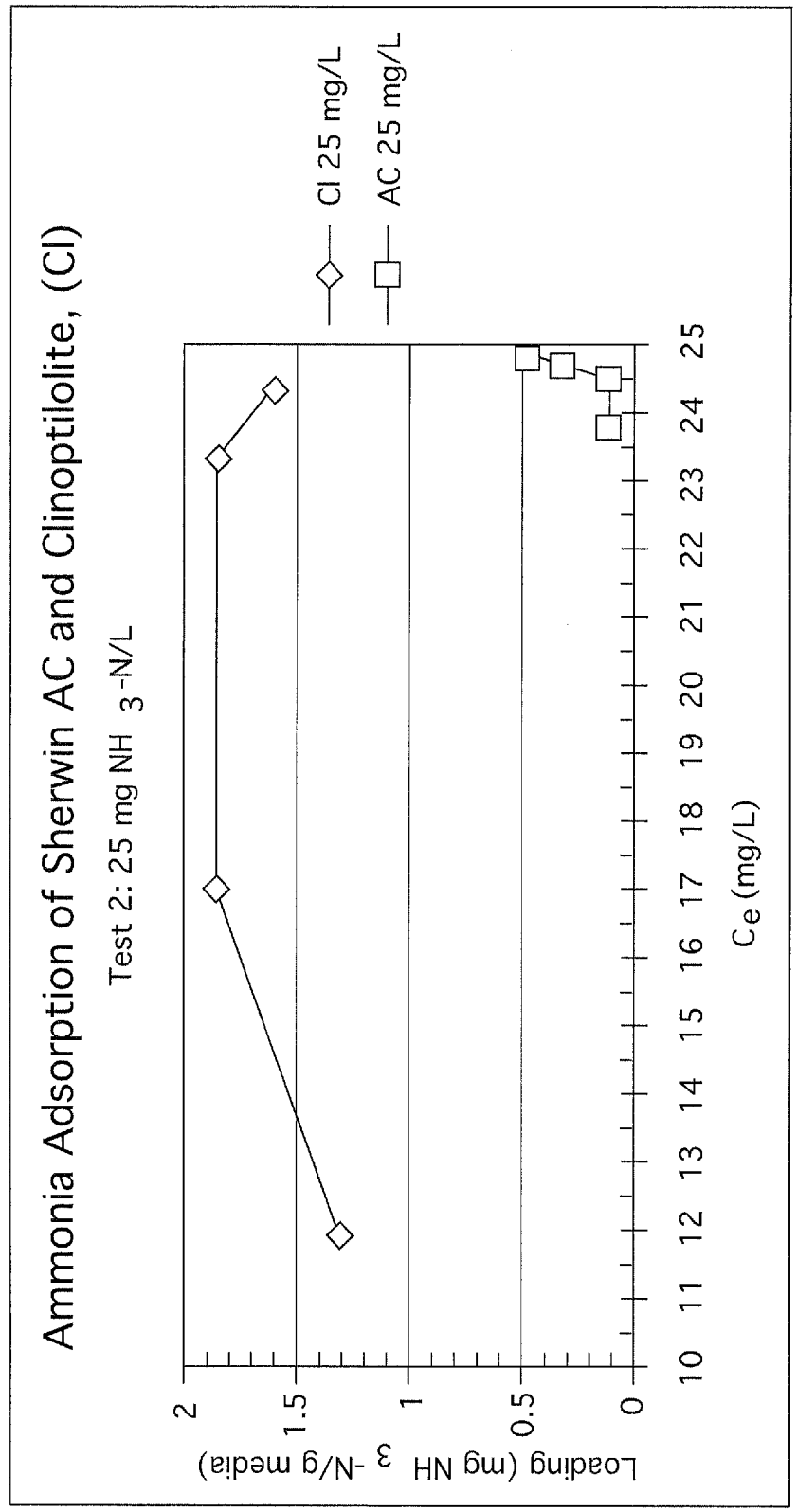
FIG. 29 depicts experimental data of ammonia adsorption onto two media: clinoptilolite and alkaline clay, plotted as amount of ammonia loading (mg NH3-N/g media) as a function of Ce (mg/L).

Test 2: The second test used a higher ammonia concentration (25 mg $NH_3$—N/L) and compared Sherwin AC with clinoptilolite. FIG. 29 illustrates that the clinoptilolite had higher ammonia removal capacity for all doses of media. However, clinoptilolite is a pure, natural zeolite known for its ammonia adsorption capacity. X-ray diffraction analysis confirmed the presence of two zeolites in the alkaline clay samples for this experiment: Sodalite ($Na_8Al_6Si_6O_{24}(OH)_2 \cdot 2H_2O$) and Cancrinite ($Na_8(AlSiO_4)_6(CO_3) \cdot 2H_2O$). Referring to FIG. 29, the average loading for clinoptilolite was 1.66 mg $NH_3$—N/g, while the average for alkaline clay was 0.26 mg/$NH_3$—N g AC. The clinoptilolite's sorption capacity ranged between 1.3-1.9 mg $NH_3$—N/g media. Comparing the results for Sherwin AC in Test 2 to Test 1, the Sherwin AC performed better in Test 1. Test 1 had a lower concentration of ammonia in the solution, but otherwise was identical to Test 2.

Example: Phosphate Sorption on Alkaline Clay

Phosphate batch sorption isotherms were conducted with alkaline clay (i.e. weathered bauxite residue), marble white, pea gravel, and limestone, at doses of: 0, 1, 5, 10, 20, 40 g/L. The $PO_4$ concentration was varied at: 5 ppm; 10 ppm; and 20 ppm. Alkaline clay (AC) for the isotherm tests was obtained from Sherwin, Tex., and is the same batch as in the full scale cell discussed in the other examples. Pea gravel of approximately ¼ inch diameter was used (The Home Depot) and limestone was in pieces approximately ¼-1½ inches in diameter (Winfield Lime & Stone Co Inc. Quarry in Cabot, Pa.).

For each media (alkaline clay, marble white, pea gravel, limestone), a dose (0, 1, 5, 10, 20 or 40 g/L) was weighed and added to a separate plastic 100 mL bottle. At the same time, a stock solution of 5 ppm as $PO_4$ was made using tap water and sodium phosphate ($NaH_2PO_4$—$H_2O$). Next, 100 ml of the stock solution was added to each of the plastic bottles and the bottles were shaken in a wrist arm shaker for 6 hours. This same process was used for 10 and 20 ppm stock solution concentrations to obtain all of the isotherms. Additionally, duplicates of the 0, 10 and 20 g/L doses with 20 ppm stock solution were made and shaken for 24 hours. Pea gravel and limestone were not used for 1 or 5 g/L doses. After shaking, the samples were filtered and split measured for phosphate with ion chromatography and calcium with Inductively Coupled Plasma (ICP).

Referring to the isotherm tests (e.g. FIGS. 30-31), alkaline clay removed more phosphate than marble white, pea gravel, or limestone. Alkaline clay outperformed all other media tested for phosphate sorption, and there was a higher loading of phosphate measured for Sherwin AC as compared to Arkansas AC.

Figure 30:
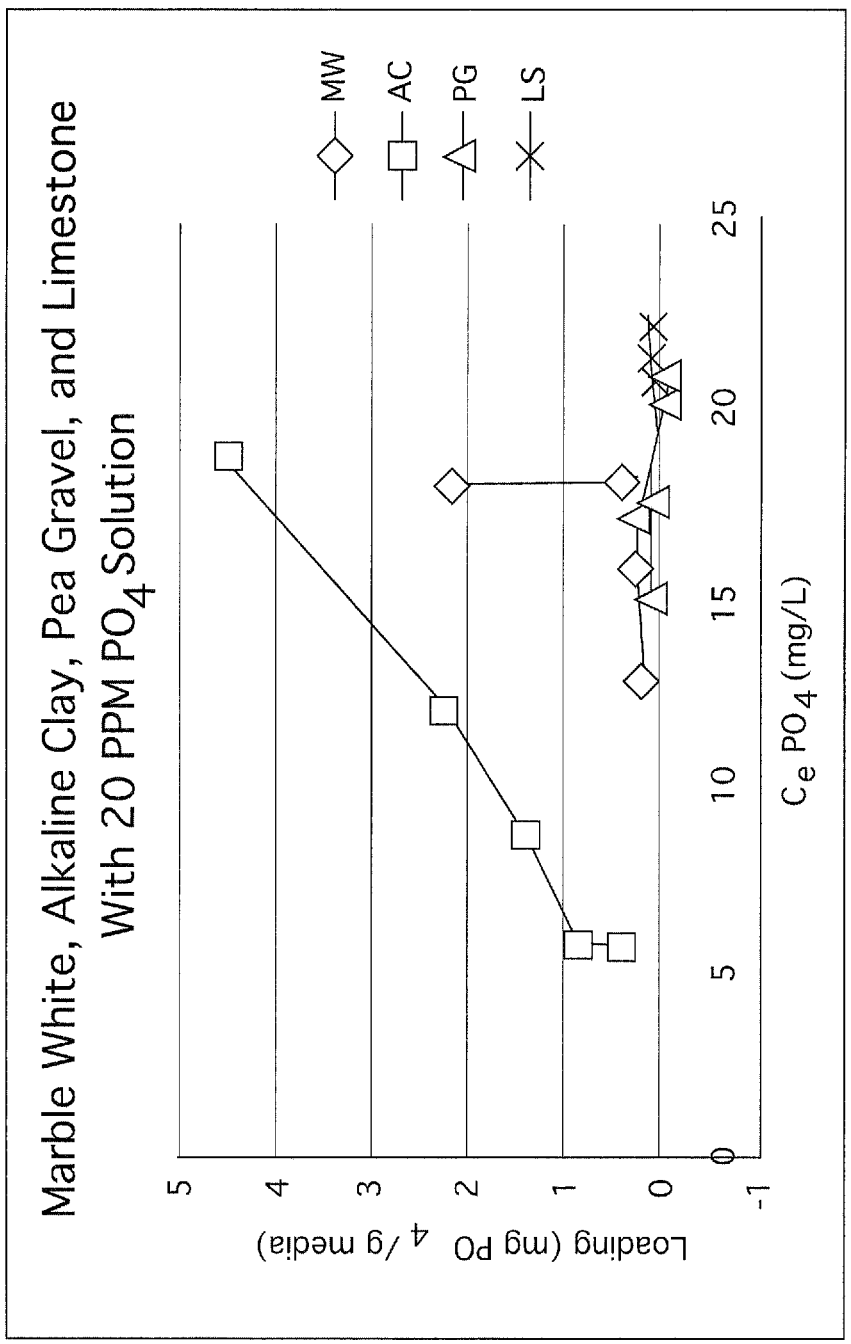
FIG. 30 depicts experimental data of the amount of phosphate sorption from a 20 ppm $PO_4$ solution, as a function of Ce (mg/L) for: marble white, alkaline clay, pea gravel, and limestone.

Referring to FIG. 30, in the 20 ppm $PO_4$ isotherm, alkaline clay performed better than marble white, limestone, and pea gravel. FIG. 30 depicts the final loading (the difference between the initial and final concentrations of $PO_4$ divided by the dose) vs. final equilibrium concentration of $PO_4$ in the sample bottle. A much larger amount of pea gravel, limestone, or marble white would be needed to approach the effectiveness of alkaline clay for phosphate removal.

The surface area was measured for each media (Brunauer, Emmett and Teller) (BET) $N_2$ surface area analysis (activated alumina and zeolites included for comparison purposes). As seen in Table 12, the surface area of Sherwin alkaline clay is more than 5 times higher than pea gravel, marble white and limestone.

TABLE 12

Media Surface Area:

| Media | BET N2 Surface Area, (m2/gram of media) |
|---|---|
| Activated Alumina, BASF | 349 |
| Alkaline Clay, Arkansas | 44.3 |
| Alkaline Clay, Sherwin, TX | 30.7 |
| Clinoptilolite, (Zeolite removes ammonia) | 23.6 |
| Pea Gravel | 5.16 |
| Marble White (ground CaCO3 rock) | 0.65 |
| Limestone (rock pieces) | 0.24 |
| Sand, "Fisher Scientific - Ottawa" | 0.04 |

Figure 31:
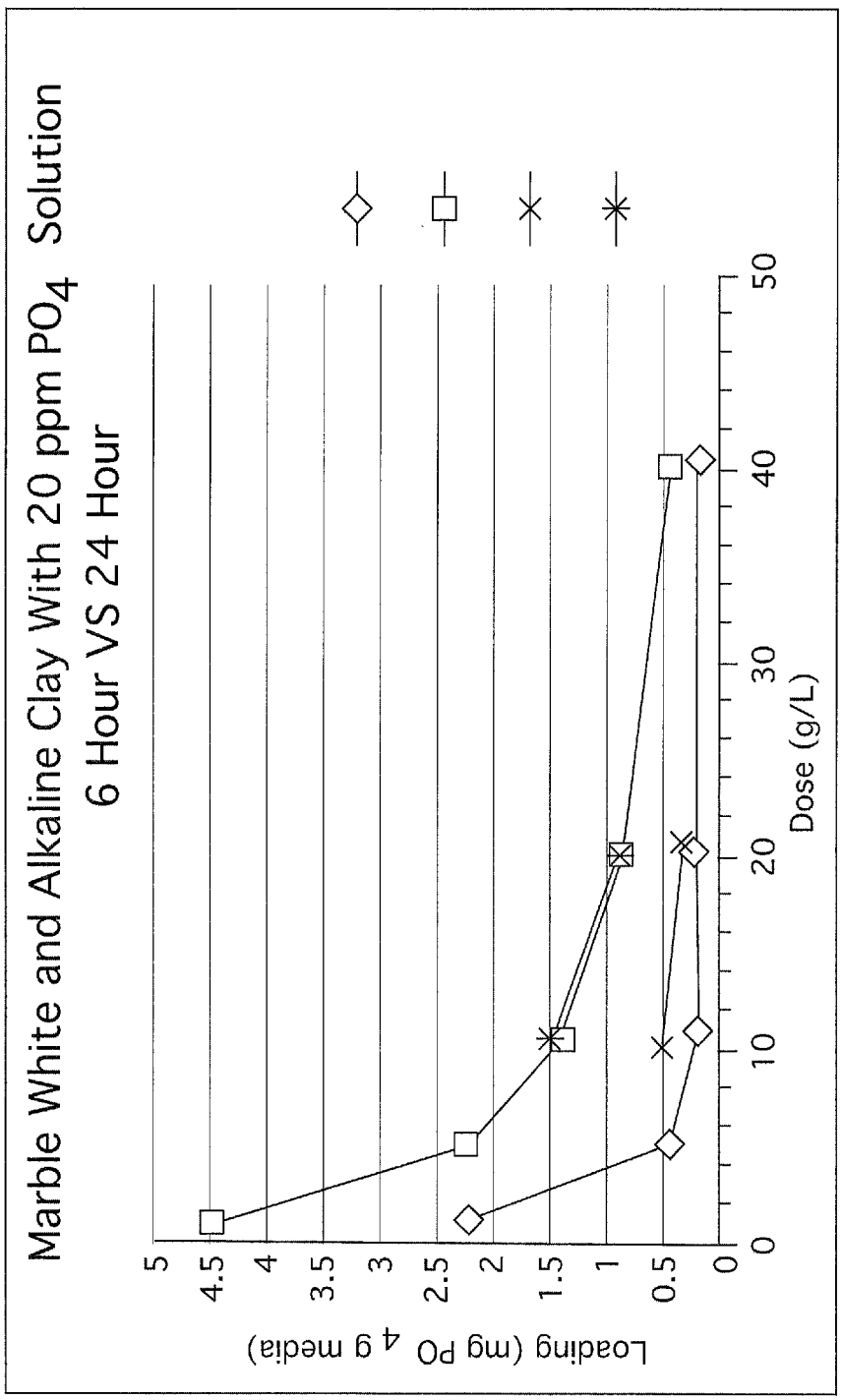
FIG. 31 depicts experimental data of $PO_4$ loading vs. dose (g/L) of marble white and alkaline clay, at two different time durations (6 hrs and 24 hrs).

Referring to FIG. 31, identical samples were made for the 10 and 20 g/L doses, with two different shake times (24 hrs vs. 6 hrs) to depict the time needed for sufficient sorption. The resulting data points are very similar for marble white at 6 and 24 hrs and alkaline clay at 6 and 24 hours support that most, if not all, sorption has taken place after 6 hours of shaking.

Figure 32:
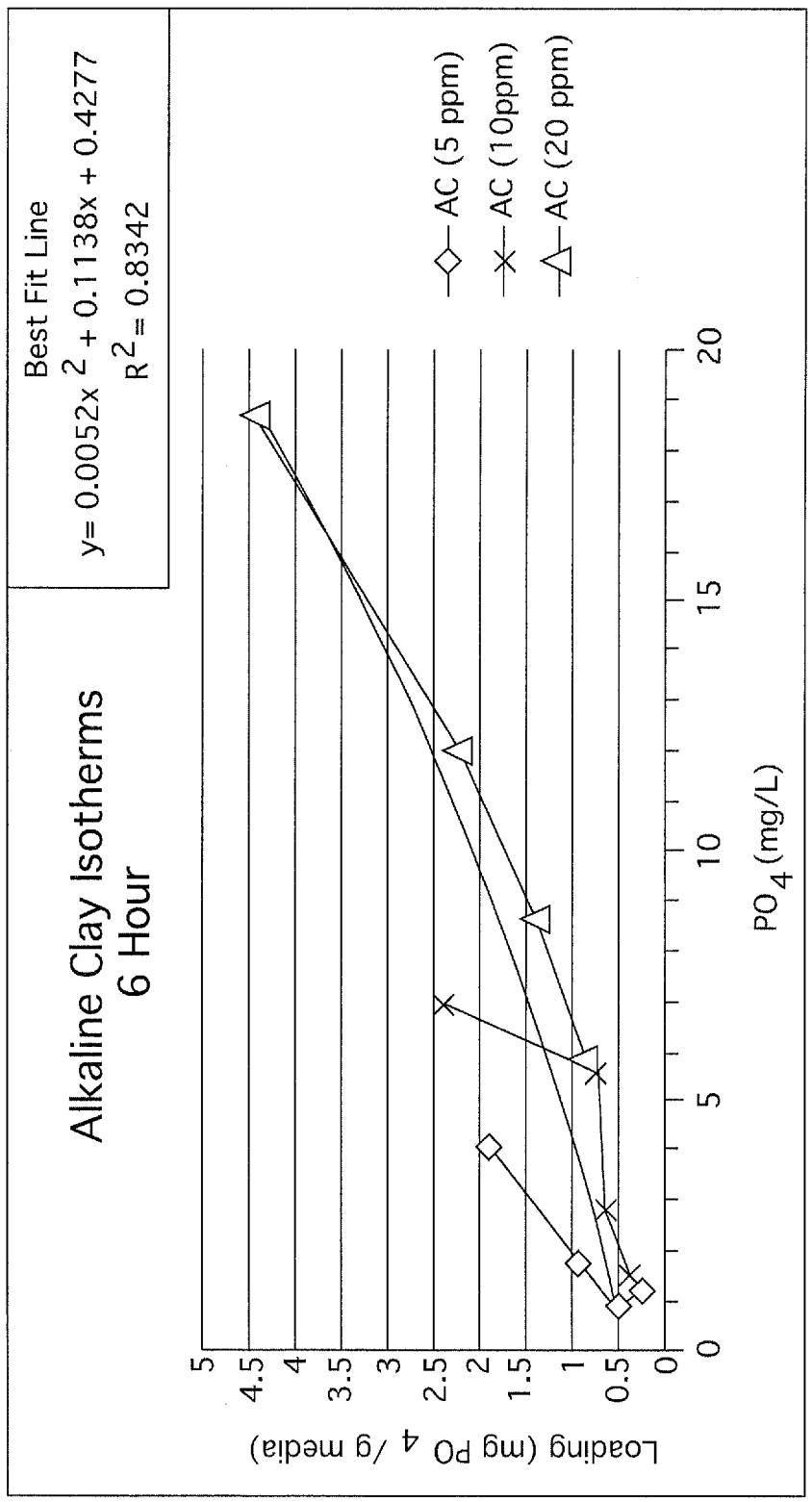
FIG. 32 depicts experimental data of alkaline clay isotherms at 5 ppm solution, 10 ppm solution, and 20 ppm solution, as a function of $PO_4$ (mg/L).

The three isotherms for alkaline clay are shown in FIG. 32. The best fit line is a polynomial and was used to find the approximate loading at various equilibrium concentrations. The full-scale alkaline clay mixed metal oxide bed, has an average influent $PO_4$ concentration of approximately 5 mg/L. At this concentration the loading is 1.1 (mg/g of AC). The wastewater treatment cell has continued to reduce phosphate in the water to around 1 mg/L at the system effluent.

Based on the isotherm data, calculations were made for the full-scale ACDC (alkaline clay disinfecting cell). Based on the 5 ppm isotherm, it is estimated that the average time to breakthrough of phosphate was: Average $q_e$=1.03 mg $PO_4$/g AC. The average alkaline clay mass was 1.32E+08 grams AC, with a $PO_4$ capacity of 1.71E+08 mg $PO_4$. The average flow was 15 gpm, with an average $PO_4$ ACDC Influent of 5 mg/L and an average $PO_4$ ACDC Effluent of 1.2 mg/L. The average $PO_4$ removed in ACDC=3.8 mg/L.

Figure 33:
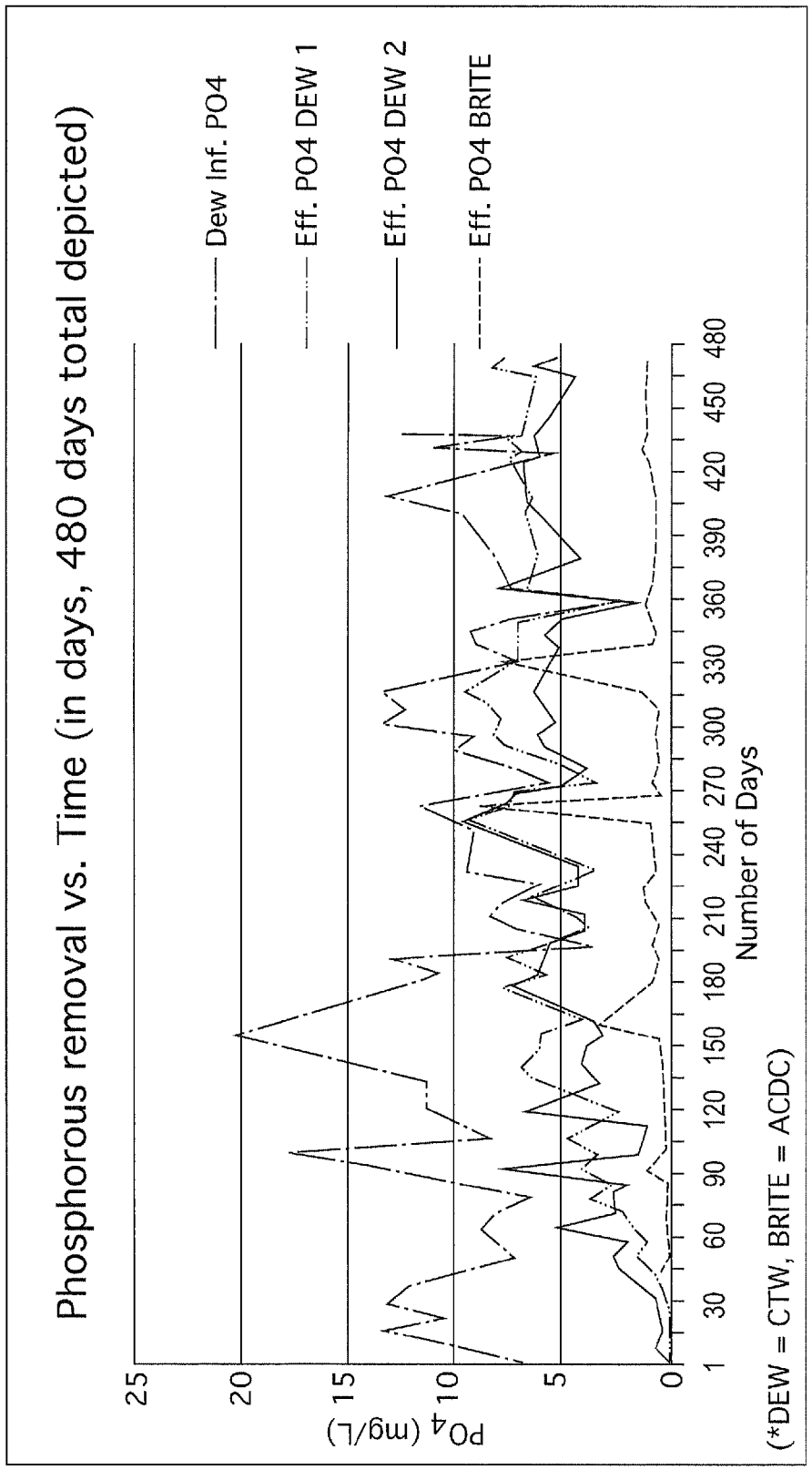
FIG. 33 depicts experimental data of phosphorous removal of $PO_4$ as a function of time (in days, 480 days depicted) through the engineered wetlands system, (e.g. CTW or ("DEW" and ACDC or "BRITE")).

As depicted in FIG. 33, there have been four spikes in the phosphate measurements at the MMOB effluent. At no point did the spikes reach or exceed 10 ppm phosphates. For the vast majority of the 600 days of duration of running, the phosphate was much lower than 2 ppm, and only exceeded 5 ppm for two time periods.

While various embodiments of the instant disclosure have been described in detail, it is apparent that modifications and adaptations of those embodiments will occur to those skilled in the art. However, it is to be expressly understood that such modifications and adaptations are within the spirit and scope of the instant disclosure.

What is claimed is:

1. A method comprising:
    (a) dissolving at least 5 ppm oxygen into a wastewater stream, wherein the wastewater stream comprises a contaminant profile including at least one drug at an initial drug concentration, wherein said at least one drug is selected from the group consisting of gemfibrozil, hydrochlorothiazide, 2-hydroxy-ibuprofen, ibuprofen, naproxen, triclocarban, triclosan, acetaminophen, azithromycin, caffeine, ciprofloxacin, clarithromycin, cloxacillin, diphenhydramine, diltiazem, erythromycin-$H_2O$, fluoxetine, miconazole, norfloxacin, ofloxacin, penicillin V, sulfadiazine, sulfamethoxazole, thiabendazole, trimethoprim, 1,7-dimethlxanthine, cholesterol, and combinations thereof;
    (b) flowing the wastewater stream having at least about 5 ppm oxygen dissolved therein into a particulate bed comprising neutralized bauxite residue particles, the bauxite residue particles having an average particle size of less than about 2 inches;
    (d) removing at least some of said at least one drug from the wastewater stream to produce a cleaned water stream, wherein the cleaned water stream comprises a final drug concentration less than the initial drug concentration.

2. The method of claim 1, wherein the removing step comprises removing at least about 40% of said at least one drug from the initial contaminant concentration.

3. The method of claim 1, further comprising maintaining the pH of the wastewater stream within the range of from about 3 to about 9.

4. The method of claim 1, wherein the bed comprises a hydraulic loading rate of the wastewater stream onto the bed of not greater than about 0.5 gal/min/ft.

5. The system of claim 1, wherein the bed comprises a hydraulic conductivity of the wastewater stream through the bed of not greater than about 0.19 cm/s.

6. The method of claim 1, wherein the particulate bed of neutralized bauxite residue comprises a hydraulic residence time of the wastewater stream in the particulate bed of neutralized bauxite residue of not less than about 33 minutes.

7. The method of claim 1, wherein the particulate bed of neutralized bauxite residue comprises a field capacity of at least about 50%.

* * * * *